United States Patent
Kurokawa

(10) Patent No.: US 8,928,053 B2
(45) Date of Patent: Jan. 6, 2015

(54) INPUT/OUTPUT DEVICE

(75) Inventor: Yoshiyuki Kurokawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 520 days.

(21) Appl. No.: 13/217,553

(22) Filed: Aug. 25, 2011

(65) Prior Publication Data

US 2012/0050196 A1   Mar. 1, 2012

(30) Foreign Application Priority Data

Aug. 27, 2010 (JP) .................................. 2010-190239
May 13, 2011 (JP) .................................. 2011-107813

(51) Int. Cl.
*H04N 3/14* (2006.01)
*G06F 3/041* (2006.01)
*G09G 3/36* (2006.01)

(52) U.S. Cl.
CPC . *G06F 3/041* (2013.01); *G09G 3/36* (2013.01)
USPC ............... 257/292; 257/59; 257/72; 257/291; 257/E27.132; 257/E31.073; 345/173; 345/174; 345/175; 345/207

(58) Field of Classification Search
CPC ............ H01L 27/146; H01L 27/14601; H01L 27/14609; H01L 27/14612; H01L 27/14614; H01L 27/14643
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 5,955,753 A | 9/1999 | Takahashi |
| 6,294,274 B1 | 9/2001 | Kawazoe et al. |
| 6,563,174 B2 | 5/2003 | Kawasaki et al. |

(Continued)

FOREIGN PATENT DOCUMENTS

| | | |
|---|---|---|
| EP | 1 737 044 A1 | 12/2006 |
| EP | 2 226 847 A2 | 9/2010 |

(Continued)

OTHER PUBLICATIONS

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

(Continued)

*Primary Examiner* — Minh-Loan Tran
*Assistant Examiner* — Fazli Erdem
(74) *Attorney, Agent, or Firm* — Fish & Richardson P.C.

(57) ABSTRACT

An input/output device includes a display circuit which changes its display state in accordance with a display data signal; a plurality of photodetector circuits which generate optical data in accordance with illuminance of light entering the photodetector circuits; wherein the photodetector circuits each include X (a natural number of 2 or more) photoelectric conversion elements; X charge accumulation control transistors in which one of a source and a drain is electrically connected to a second current terminal of one photoelectric conversion element of the X photoelectric conversion elements, and one charge accumulation control signal of X charge accumulation control signals from the photodetector circuit control section is input to the gate; and an amplifying transistor in which a gate is electrically connected to one of the source and the drain of each of the X charge accumulation control transistors.

20 Claims, 34 Drawing Sheets

(56) References Cited

U.S. PATENT DOCUMENTS

| | | | |
|---|---|---|---|
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 * | 6/2010 | Akimoto et al. | 257/72 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0180558 A1 | 7/2008 | Watanabe | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2011/0108836 A1 * | 5/2011 | Koyama et al. | 257/43 |
| 2012/0068173 A1 * | 3/2012 | Umezaki | 257/43 |
| 2013/0016035 A1 * | 1/2013 | Ikeda | 345/92 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2008-177706 A | 7/2008 |
| JP | 2010-182064 A | 8/2010 |
| WO | 2004/114391 A1 | 12/2004 |

OTHER PUBLICATIONS

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

(56) References Cited

OTHER PUBLICATIONS

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZNO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YbFe2O4, and Yb2Fe3O7 Types of Structures for Compounds in the In2O3 and Sc2O3-A2O3-BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World'S Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium—Oxide—Based Thin-Film Transistors by DC Sputtering," SID Digest '09 : SID International Symposium Digest of Technical Papers, May 31, 2009, pp. 191-193.

Li, C et al "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTs With a Novel Passivation Layer," SID

(56) References Cited

OTHER PUBLICATIONS

Digest '09 : SID International Symposium Digest of Technical Papers, May 31, 2009, pp. 284-287.

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3-In2O3-ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

\* cited by examiner

● In
☾ Sn
☾ Zn
● O

INPUT/OUTPUT DEVICE

BACKGROUND OF THE INVENTION

1. Field of the Invention

One embodiment of the present invention relates to an input/output device.

2. Description of the Related Art

In recent years, technological development of a device having a function of outputting data and inputting data by using incident light (such a device is also referred to as an input/output device) has been promoted.

An example of the input/output device is an input/output device that includes a plurality of display circuits and a plurality of photodetector circuits (photosensors) arranged in a matrix (column×row directions) and provided in a pixel portion and has a function of sensing the coordinates of an object overlapping with the pixel portion by sensing the illuminance of light entering the photosensors (coordinates-detecting function) and a function of generating image data of the object (capturing function) (see Patent Document 1, for example). In the input/output device disclosed in Patent Document 1, a photodetector circuit is constituted by a photodiode, an amplifying transistor, an initializing (reset) transistor and a selection transistor.

REFERENCE

[Patent Document 1] Japanese Published Patent Application No. 2010-182064

SUMMARY OF THE INVENTION

In a conventional input/output device, an amplifying transistor, an initializing (photodetection reset) transistor, and a selection transistor are provided for each photodiode that is a photoelectric conversion element, which leads to the increase of the number of transistors per photoelectric conversion element unfortunately. When the number of transistors is large, for example, it is difficult to reduce the size of a pixel and the influence of leakage current of a transistor is large.

An object of one embodiment of the present invention is at least one of decreasing the number of transistor per photoelectric conversion element (also referred to as a photoelectric transducer) and reducing the influence of leakage current of a transistor.

One embodiment of the present invention is that a photodetector circuit including a photoelectric conversion element, a charge accumulation control transistor, and an amplifying transistor is provided, and the photodetector circuit is configured in such a manner that at least the amplifying transistor is shared with a plurality of photoelectric conversion elements. Thus, the number of transistors in a pixel portion can be reduced.

Another embodiment of the present invention is that a photodetector circuit including a photoelectric conversion element, a charge accumulation control transistor, an amplifying transistor, and an output selection transistor is provided, and the photodetector circuit is configured in such a manner that at least the amplifying transistor and the output selection transistor are shared with a plurality of photoelectric conversion elements. Thus, the number of transistors in a pixel portion can be reduced.

Another embodiment of the present invention is that a photodetector circuit including a photoelectric conversion element, a charge accumulation control transistor, an amplifying transistor, an output selection transistor, and a photodetection reset transistor is provided, and the photodetector circuit is configured in such a manner that at least the amplifying transistor, the output selection transistor, and the photodetection reset transistor are shared with a plurality of photoelectric conversion elements. Thus, the number of transistors in a pixel portion can be reduced.

In addition, another embodiment of the present invention is that a charge accumulation transistor having small off-state current is provided for each photoelectric conversion element, and electric charge in the amount corresponding to the illuminance of light entering the photoelectric conversion element is held for a certain period. Thus, the influence of leakage current of a transistor can be reduced.

According to any of embodiments of the present invention, the number of transistors with respect to the number of photoelectric conversion elements can be reduced, whereby the number of transistors in a pixel portion can be reduced.

DETAILED DESCRIPTION OF THE INVENTION

Examples of embodiments for describing the present invention will be described with reference to the drawings below. Note that the invention is not limited to the following description, and it will be easily understood by those skilled in the art that various changes and modifications can be made without departing from the spirit and scope of the invention. Thus, the present invention should not be interpreted as being limited to the following description of the embodiments.

Note that the contents in different embodiments can be combined with one another as appropriate. In addition, the contents in different embodiments can be interchanged one another.

Note that ordinal numbers such as "first" and "second" are used to prevent confusion between components and each component is not limited to the number expressed by the ordinal numbers.

(Embodiment 1)

In this embodiment, an example of an input/output device that can output data by displaying an image and can input data by using incident light is described.

Figure 1A:
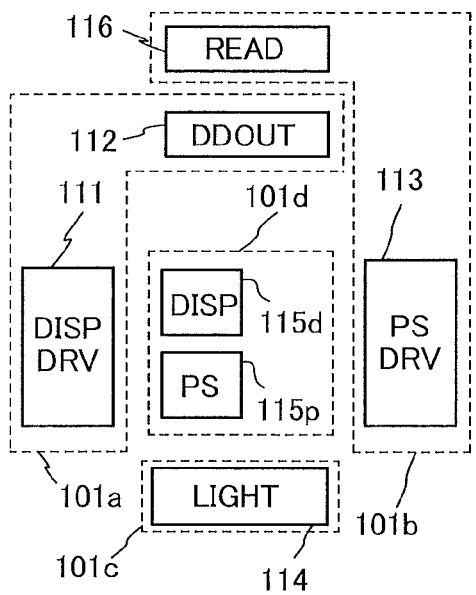
FIGS. 1A to 1C are diagrams illustrating an input/output device in Embodiment 1.
Figure 1B:
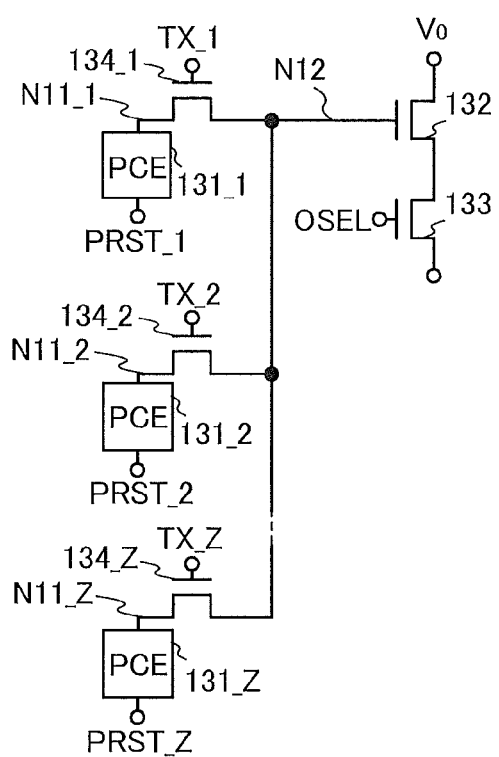
Figure 1C:
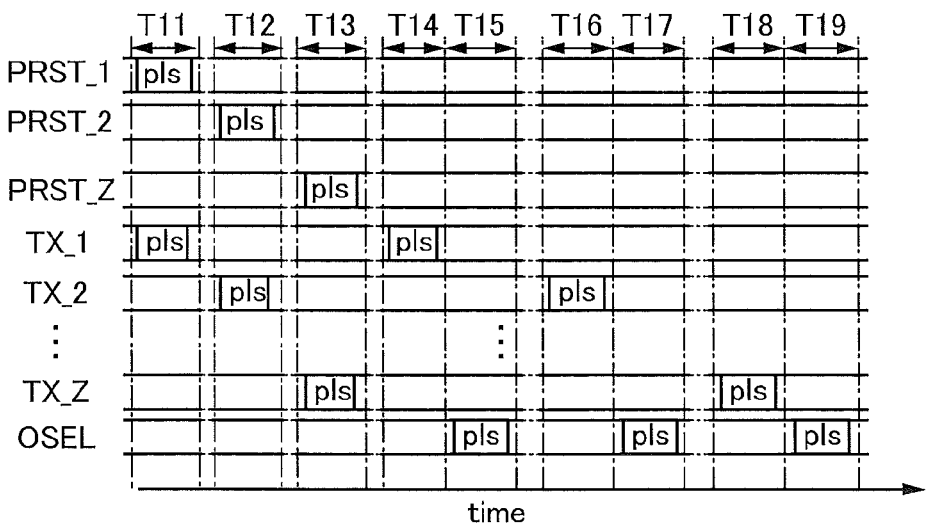

An example of the input/output device of this embodiment will be described with reference to FIGS. 1A to 1C. FIGS. 1A to 1C are diagrams for describing an example of the input/output device of this embodiment.

First, a structural example of the input/output device of this embodiment will be described with reference to FIG. 1A. FIG. 1A is a schematic diagram illustrating a structural example of the input/output device of this embodiment.

The input/output device illustrated in FIG. 1A includes a display circuit control section 101a, a photodetector circuit control section 101b, a light source section 101c, and a pixel portion 101d.

The display circuit control section 101a includes a display driver circuit (also referred to as DISPDRV) 111 and a display data signal output circuit (also referred to as DDOUT) 112.

The photodetector circuit control section 101b includes a detection driver circuit (also referred to as PSDRV) 113 and a reading circuit 116.

The light source section 101c includes a light unit (also referred to as LIGHT) 114.

The pixel portion 101d includes a plurality of display circuits (also referred to as DISP) 115d and a plurality of photodetector circuits (also referred to as PS) 115p. Note that one or more display circuits 115d constitute(s) a pixel. Further, a pixel may include one or more photodetector circuits 115p. In addition, the plurality of display circuits 115d are arranged in matrix in the pixel portion 101d. Further, the plurality of photodetector circuit 115p arranged in matrix in the pixel portion 101d.

The display driver circuit 111 has a function of outputting a plurality of display selection signals (also referred to as signals DSEL) that are pulse signals.

The display driver circuit 111 includes, for example, a shift register. The display driver circuit 111 can an output display selection signal by outputting a pulse signal from the shift register.

A video signal is input to the display data signal output circuit 112. The display data signal output circuit 112 has a function of generating a display data signal (a signal DD) that is a voltage signal on the basis of the input video signal and outputting the generated display data signal.

The display data signal output circuit 112 includes a switching transistor, for example.

Note that in the input/output device, a transistor includes two terminals and a current control terminal for controlling current flowing between the two terminals by applied voltage. Note that without limitation to the transistor, in an element, terminals between which flowing current is controlled are also referred to as current terminals. Two current terminals are also referred to as a first current terminal and a second current terminal.

Further, in the input/output device, a field-effect transistor can be used as the transistor, for example. In a field-effect transistor, a first current terminal, a second current terminal, and a current control terminal are one of a source and a drain, the other of the source and the drain, and a gate, respectively.

Voltage generally refers to a difference between potentials at two points (also referred to as a potential difference). However, values of both a voltage and a potential are represented using volt (V) in a circuit diagram or the like in some cases, so that it is difficult to discriminate between them. This is why in this specification, a potential difference between a potential at one point and a potential to be the reference (also referred to as a reference potential) is used as a voltage at the point in some cases.

The display data signal output circuit 112 can output data of a video signal as a display data signal when the switching transistor is on. The switching transistor can be controlled by inputting a control signal, which is a pulse signal, to the current control terminal. Note that in the case where the number of display circuits 115d is plural, a plurality of switching transistors may be selectively turned on or off so that data of video signals is output as a plurality of display data signals.

The photodetection driver circuit 113 has a function of outputting a photodetection reset signal (also referred to as a signal PRST), which is a pulse signal, and an accumulation control signal (also referred to as a signal TX), which is a pulse signal. Note that the photodetection driver circuit 113 may have a function of outputting an output selection signal (also referred to as a signal OSEL) which is a pulse signal, as necessary.

The photodetection driver circuit 113 includes a shift register, for example. In this case, the photodetection driver circuit 113 can output a photodetection reset signal and an accumulation control signal or a photodetection reset signal, an accumulation control signal, and an output selection signal by outputting a pulse signal from the shift register.

The light unit 114 is a light-emitting unit including a light source.

As a light source, a cold cathode tube or an LED (light emitting diode) can be used for example. The light-emitting diode emits light of wavelengths in the visible region (e.g., wavelengths in the range of 360 to 830 nm). As the light-emitting diode, a white light-emitting diode can be used, for example. Note that the number of light-emitting diodes emitting different colors of light may be plural. A red light-emitting diode, a green light-emitting diode, and a blue light-emitting diode can be used as the light-emitting diode. When a red light-emitting diode, a green light-emitting diode, and a blue light-emitting diode are used, a driving method (a field sequential driving method) can be adopted in which a full-color image can be displayed by, for example, sequentially making one or more of the red light-emitting diode, the green light-emitting diode, and the blue light-emitting diode emit light in one frame period in accordance with the display selection signal and full-color detection of an object to be detected can be performed.

Note that, for example, it is also acceptable that a control circuit that controls light emission of a light-emitting diode is provided and light emission of the light-emitting diode is controlled in accordance with a control signal, which is a pulse signal, input to the control circuit.

The display circuit 115*d* overlaps with the light unit 114. Light from the light unit 114 enters the display circuit 115*d*. To the display circuit 115*d*, a display selection signal, which is a pulse signal, is input, and a display data signal is input in accordance with the input display selection signal. The display circuit 115*d* changes its display state in accordance with data of the input display data signal.

The display circuit 115*d* includes a display selection transistor and a display element, for example.

The display selection transistor has a function of selecting whether or not data of a display data signal is input to the display element.

The display element changes its display state when the data of the display data signal is input to the display element in response to the behavior of the display selection transistor.

As the display element, a liquid crystal element or the like can be used, for example.

As a display mode of the input/output device including a liquid crystal element, a TN (twisted nematic) mode, an IPS (in-plane-switching) mode, an STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV (advanced super view) mode, a FFS (fringe field switching) mode, or the like may be used.

The photodetector circuit 115*p* overlaps with the light unit 114. For example, when an object is placed above the pixel portion 101*d*, light emitted from the light unit 114 is reflected on the object and the reflected light enters the photodetector circuit 115*p*. A photodetection reset signal and a charge accumulation control signal are input to the photodetector circuit 115*p*. Further, photodetector circuits 115*p* for detecting red light, green light, and blue light can also be provided. For example, by providing red, green, and blue color filters, full-color image data can be generated by generating optical data with the photodetector circuits 115*p* for detecting light of these colors with the use of the red, green, and blue color filters and by generating image data by combining a plurality of pieces of generated optical data.

The photodetector circuit 115*p* includes at least X (X is a natural number of 2 or more) photoelectric conversion elements (also referred to as PCE), X charge accumulation control transistors, and an amplifying transistor.

The X photoelectric conversion elements each include a first current terminal and a second current terminal, and the first current terminal of each of the X photoelectric conversion elements is supplied with a unit voltage or respective photodetection reset signals of the X photodetection reset signals, which are different from each other. The photoelectric conversion element is supplied with current (also referred to as photocurrent) by incidence of first light on the photoelectric conversion element in accordance with the illuminance of the incident light. Note that when a unit voltage is input into the first current terminals of the photoelectric conversion elements, the value of the unit voltage input into the first current terminals of the photoelectric conversion elements is set as appropriate.

Each of the second current terminals of the X photoelectric conversion elements is electrically connected to the first current terminal of another X charge accumulation control transistor, and the current control terminals of the X charge accumulation control transistors are supplied with respective charge accumulation control signals of the X charge accumulation control signals, which are different from each other.

A unit voltage is supplied to one of a first current terminal and a second current terminal of the amplifying transistor and optical data is output as an optical data signal through the other of the first current terminal and the second current terminal of the amplifying transistor, and the current control terminal of the amplifying transistor is electrically connected to each of the second current terminals of the X charge accumulation control transistors. In other words, one amplifying transistor is shared with the X charge accumulation control transistors. Note that the value of the unit voltage is set as appropriate.

Note that the photodetector circuit 115*p* outputs optical data as an optical data signal through the first current terminal or the second current terminal of the amplifying transistor.

The reading circuit 116 has a function of selecting the photodetector circuit 115*p* used to read optical data and reading the optical data from the selected photodetector circuit 115*p*.

The reading circuit 116 includes a selection circuit, for example. For example, the selection circuit includes a switching transistor, and can read optical data by inputting an optical data signal from the photodetector circuit 115*p* in response to the behavior of the switching transistor.

Further, an example of a structure of the photodetector circuit 115*p* will be described with reference to FIG. 1B. FIG.

1B is a circuit diagram illustrating an example of a structure of the photodetector circuit in the input/output device illustrated in FIG. 1A.

The photodetector circuit illustrated in FIG. 1B includes Z photoelectric conversion elements, 131_1 to 131_Z (Z is a natural number of 3 or more), a transistor 132, a transistor 133, and Z transistors 134, a transistor 134_1 to a transistor 134Z.

A photodetection reset signal PRST_K (K is a natural number of from 1 to Z) is input into a first current terminal of a photoelectric conversion element 131_K.

For each of the photoelectric conversion element 131_1 to the photoelectric conversion element 131_Z, a photodiode, a phototransistor, or the like can be used. In the case of using a photodiode, one of an anode and a cathode of a photodiode corresponds to the first current terminal of the photoelectric conversion element, and the other thereof corresponds to the second current terminal of the photoelectric conversion element. In addition, in the case of using a phototransistor, one of a source and a drain of a phototransistor corresponds to the first current terminal of the photoelectric conversion element, and the other thereof corresponds to the second current terminal of the photoelectric conversion element.

One of a source and a drain of the transistor 134_K is connected to the second current terminal of the photoelectric conversion element 131_K, and a charge accumulation control signal TX_K is input to a gate of the transistor 134_K. Note that a connection point at which one of the source and the drain of the transistor 134_K is connected to the photoelectric conversion element 131_K is also referred to as a node N11_K.

Each of the transistor 134_1 to the transistor 134_Z has a function of a charge accumulation control transistor.

For each of the transistor 134_1 to the transistor 134_Z, a transistor including an oxide semiconductor layer in its channel formation region can be used. The oxide semiconductor layer is an intrinsic (an i-type) or substantially intrinsic semiconductor layer having an extremely small amount of carriers whose concentration is lower than $1 \times 10^{14}/cm^3$, preferably lower than $1 \times 10^{12}/cm^3$, further preferably lower than $1 \times 10^{11}/cm^3$.

The off-state current per micrometer of the channel width of the transistor including an oxide semiconductor layer is less than or equal to 10 aA ($1 \times 10^{-17}$ A), preferably less than or equal to 1 aA ($1 \times 10^{-18}$ A), further preferably less than or equal to 10 zA ($1 \times 10^{-20}$ A), further preferably less than or equal to 1 zA ($1 \times 10^{-21}$ A), much further preferably less than or equal to 100 yA ($1 \times 10^{-22}$ A).

Since the oxide semiconductor layer has low carrier concentration, the off-state current of the transistor including an oxide semiconductor layer is small even when temperature changes. For example, when the temperature of the transistor is 150° C., the off-state current is preferably 100 zA/μm or less.

Voltage $V_0$ is input to one of a source and a drain of the transistor 132. A gate of the transistor 132 is connected to the other of a source and a drain of each of the transistor 134_1 to the transistor 134_Z. Note that the connection point in which the gate of the transistor 132 is connected to the other of the source and the drain of each of the transistor 134_1 to the transistor 134Z is also referred to as node N12. In addition, the value of the voltage $V_0$ is set as appropriate.

The transistor 132 functions as an amplifying transistor.

One of a source and a drain of the transistor 133 is electrically connected to one of a source and a drain of the transistor 132. A signal OSEL is input to a gate of the transistor 133.

As the transistors 132 and 133, it is possible to use a transistor including a semiconductor layer containing a semiconductor belonging to Group 14 of the periodic table (e.g., silicon) or a transistor including an oxide semiconductor layer in which a channel is formed. As the transistor including an oxide semiconductor layer, a transistor using an oxide semiconductor layer, which can be applied to the transistor 134_1 to the transistor 1344 can be used.

In addition, for example, for the transistor 134_1 to the transistor 134_Z and the transistor 133, an oxide semiconductor layer in which a channel is to be formed can be used, whereas as the transistor 132, a semiconductor layer containing a semiconductor (e.g., silicon) of Group 14 in the periodic table, in which a channel is to be formed, can be used.

Next, an example of a driving method of the photodetector circuit illustrated in FIG. 1B is described with reference to FIG. 1C. FIG. 1C is a timing chart for explanation of the example of the driving method of the photodetector circuit illustrated in FIG. 1B, and shows states of signal a PRST_1 to a signal PRST_Z, a signal TX_1 to a signal TX_Z and a signal OSEL. Note that an example is described, in which the photoelectric conversion element 131_1 to the photoelectric conversion element 131_Z are each a photodiode and the value of voltage $V_0$ is equal to a reference potential.

In the example of the driving method of the photodetector circuit illustrated in FIG. 1B, in a period T11, a pulse (pls) of a signal PRST_1 and a pulse of signal TX_1 are input, and in a period T12, a pulse of a signal PRST_2 and a pulse of a signal TX_2 are input. After that, in each period, a pulse of a different signal PRST and a pulse of a different signal TX are sequentially input, and in a period T13, a pulse of a signal PRST_Z and a pulse of a signal TX_Z are input.

While the pulses of the signal PRST_K and the signal TX_K are input, current flows in a forward direction through the photoelectric conversion element 131_K and the transistor 134_K is turned on. In this manner, the voltages of the node N11_K and the node N12 are reset to a given value. Thus, the voltages of the node N11_1 to the node N11_Z are sequentially reset, and the voltage of the node N12 is also reset.

Note that in the period T11 to the period T13, the pulse width of the signal PRST_K is preferably larger than the pulse width of the signal TX_K, and when input of the pulse of the signal TX_K is finished, the input of the pulse of the signal PRST_K is preferably still continued.

Further, during the period T11 to the period T13, after the pulse of the signal PRST_K is input and before the pulse of the signal TX_K is input again, the photoelectric conversion element 131_K is in a state that voltage is applied in a direction opposite to the forward direction between the first current terminal and the second current terminal. At this time, in accordance with the illuminance of incident light, current flows through the photoelectric conversion element 131_K and the value of the voltage of the node N11_K varies depending on the current flowing through the photoelectric conversion element 131_K. Note that in the period T11 to the period T13, the period after the pulse of the signal PRST_K is input and before the pulse of the signal TX_K is input again is also referred to as an accumulation period.

Further, in a period T14, a pulse of the signal TX_1 is input and in a period T15, a pulse of the signal OSEL is input. In addition, in a period T16, a pulse of the signal TX_2 is input and in a period T17, a pulse of the signal OSEL is input. After that, pulses of different signal PRSTs are sequentially input, in periods after the pulses of signal PRSTs are input, pulses of the signal OSEL are input, in a period T18, a pulse of the signal TX_Z is input, and in a period T19, a pulse of the signal OSEL is input.

In the period T14 to the period T19, while the pulse of the signal TX_K is input, the transistor 134_K is turned on, and the voltage of the node N11_K and the voltage of the node N12 vary. At this time, the voltage of the node N11_K and the voltage of the node N12 vary depending on the ratio of capacitance added thereto. When the voltage of the node N12 varies, the value of the channel resistance between the source and the drain of the transistor 132 is changed.

In addition, while the pulse of the signal OSEL is input, the transistor 133 is turned on, and current flows through the source and the drain of the transistor 132 and the source and the drain of the transistor 133. The amount of the current flowing through the source and the drain of the transistor 132 and the source and the drain of the transistor 133 depends on, the voltage of the node N12, i.e., the voltage value of the gate of the transistor 132. Therefore, the amount of the current flowing through the source and the drain of the transistor 132 and the source and the drain of the transistor 133 depends on the illuminance of light entering the photoelectric conversion element 131_K in an accumulation period. For example, as the illuminance of light entering the photoelectric conversion element 131_K is higher, the voltage representing the optical data can be further lowered. However, without limitation to this example, the voltage representing the optical data can be increased as the illuminance of light is higher. The photodetector circuit illustrated in FIG. 1B outputs optical data from the other of the source and the drain of the transistor 133 as an optical data signal.

In addition, in the period T14 to the period T19, after the pulse of the signal OSEL is input and before the pulse of the next signal TX_M (M is a natural number of from 2 to Z) is input, pulses of the signal TX_M−1 and the signal PRST_M−1 may be input so that the node N12 can be reset again. In this manner, because it is not necessary that pulses of the signal TX_M−1 and the signal PRST_M−1 are input for another reset operation in the period T14 to the period T19, after the pulse of the signal OSEL is input and before a pulse of the next signal TX_M (M is a natural number of 2 to Z) is input, the cycle of reading (also referred to imaging) can be shortened. This is the example of the method for driving the photodetector circuit illustrated in FIG. 1B.

Next, as an example of a method for driving the input/output device in this embodiment, an example of a method for driving the input/output device illustrated in FIG. 1A will be described.

In the example of the driving method of the input/output device illustrated in FIG. 1A, in accordance with the pulse of a display selection signal, a display data signal is input to the display circuit 115d and the display circuit 115d changes its display state in response to the input display data signal, and thereby a pixel portion 101d displays an image.

In the example of the driving method of the input/output device illustrated in FIG. 1A, by the driving method of the photodetector circuit described with reference to FIG. 1C, a plurality of pieces of optical data are generated in accordance with the illuminance of light entering each of the photodetector circuits 115p and are output sequentially as an optical data signal.

In addition, the reading circuit 116 sequentially reads optical data output from the plurality of photodetector circuits 115p. The read optical data is used for a predetermined processing e.g., detection of the coordinates of an object to be detected or generation of image data.

In addition, it is also possible that a video signal is generated from the generated optical data, and a display data signal is generated with use of the video signal. In this manner, a display image can be changed in response to optical data.

As described with reference to FIGS. 1A to 1C, the example of input/output device in this embodiment is a structure in which one amplifying transistor and one output selection transistor are shared with the plurality of charge accumulation control transistors and the plurality of photoelectric conversion elements in the photodetector circuit. By this structure, the number of the transistors in a pixel portion can be decreased. By the decrease of the number of the transistors in the pixel portion, the size of one pixel can be reduced or the size of the photoelectric conversion element can be increased. For example, as the size of the photoelectric conversion element is increased, the sensitivity to incident light can be improved.

In addition, the example of the input/output device in this embodiment is a structure in which a transistor including an oxide semiconductor layer in which a channel is formed and having small off-state current is used as at least the charge accumulation control transistor. By this structure, variation of the optical data due to leakage current of the charge accumulation control transistor can be suppressed, so that an SN ratio can be enhanced. In addition, in conventional art, when the other of a source and a drain of each of a plurality of charge accumulation control transistors is connected to a gate of one amplifying transistor, variation of a gate voltage of the amplifying transistor is large due to leakage current of the charge accumulation control transistors. In contrast, by employing the above structure, because variation of the optical data due to leakage current of the charge accumulation control transistor can be suppressed, even in the structure in which the other of a source and a drain of each of a plurality of charge accumulation control transistors is connected to a gate of one amplifying transistor, variation of gate voltage of the amplifying transistor can be suppressed. Accordingly, in the structure in which one amplifying transistor is shared with a plurality of charge accumulation control transistors and the photoelectric conversion elements, it is preferred that a transistor having small off-state current and including an oxide semiconductor layer where a channel is formed is used as a charge accumulation control transistor.

(Embodiment 2)

In this embodiment, another example of the photodetector circuit in the input/output device of the above embodiment is described. Note that the same portions in the example of the photodetector circuit to be described in this embodiment as the photodetector circuit of the input/output device in Embodiment 1 are referred to for the description the photodetector circuit of the input/output device in Embodiment 1.

Figure 2A:
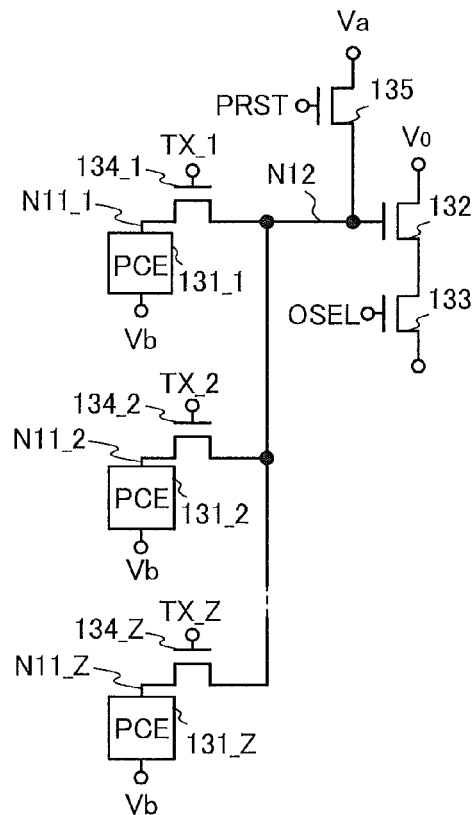
FIGS. 2A and 2B are diagrams showing an example of a photodetector circuit in Embodiment 2.
Figure 2B:
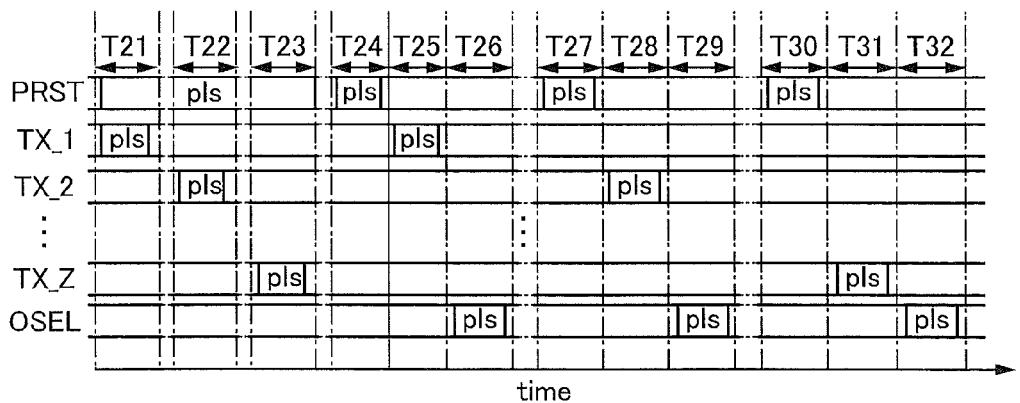

The example of the photodetector circuit in this embodiment will be described with reference to FIGS. 2A and 2B. FIGS. 2A and 2B illustrate the photodetector circuit of this embodiment.

First, a structure example of the photodetector in this embodiment is described with reference to FIG. 2A. FIG. 2A is a circuit diagram illustrating the structure example of the photodetector in this embodiment.

The photodetector circuit illustrated in FIG. 2A includes the Z photoelectric conversion elements, 131_1 131_Z, the transistor 132, the transistor 133, the Z transistors 134, 134_1 to 134_Z, similarly to the photodetector circuit illustrated in FIG. 1B. The photodetector circuit illustrated in FIG. 2A further includes a transistor 135.

In the photodetector circuit illustrated in FIG. 2A, a voltage Vb is input to a first current terminal of the photoelectric conversion element 131_K.

One of a source and a drain of the transistor 134_K is connected to a second current terminal of the photoelectric conversion element 131_K and a charge accumulation control signal TX_K is input to a gate of the transistor 134_K.

A voltage $V_0$ is input to one of a source and a drain of the transistor 132. A gate of the transistor 132 is connected to the other of the source and the drain of each of the transistor 134_1 to transistor 134_Z.

One of a source and a drain of the transistor 133 is electrically connected to the other of the source and the drain of the transistor 132. A signal OSEL is input to a gate of the transistor 133.

A voltage Va is input to one of a source and a drain of the transistor 135, the other of the source and the drain of the transistor 135 is connected to the gate of the transistor 132, and a photodetection reset signal PRST is input to a gate of the transistor 135.

The transistor 135 has a function of a photodetection reset transistor that resets the voltage of the gate of the transistor 132 (node N12).

Note that one of the voltage $V_a$ and the voltage $V_b$ is a high power supply voltage Vdd, and the other is a low power supply voltage Vss. The value of the voltage $V_a$ and the value of the voltage $V_b$ might interchange depending, for example, on the conductivity type of the transistor.

Next, an example of a driving method of the photodetector circuit illustrated in FIG. 2A is described with reference to FIG. 2B. FIG. 2B is a timing chart for explaining the example of the driving method of the photodetector circuit illustrated in FIG. 2A, and shows states of a signal PRST, a signal TX_1 to a signal TX_Z and a signal OSEL. In addition, in this embodiment, an example is described, in which each of the photoelectric conversion elements 131_1 to 131_Z is a photodiode, the voltage $V_a$ is a high power voltage and the voltage Vb is a low power voltage, and the value of the voltage $V_0$ is equal to that of a reference potential.

In the example of the driving method of the photodetector circuit illustrated in FIG. 2A, in a period T21, a pulse of a signal TX_1 is input and in a period T22, a pulse of a signal TX_2 is input. After that, in each period, a pulse of a different signal TX is sequentially input, and in a period T23, a pulse of a signal TX_Z is input. In addition, one pulse of a signal PRST is input in a period T21 to a period T23.

While pulses of a signal PRST and a signal TX_K are input, the transistor 135 is turned on, current flows in a forward direction through the photoelectric conversion element 131_K, and the transistor 134_K is turned on. In this manner, voltages of the node N11_K and the node N12 are reset to a given value. Thus, voltages of the node N11_1 to the node N11_Z are sequentially reset.

Further, in the period T21 to the period T23, after a pulse of a signal TX_K is input and before the pulse of the signal TX_K is input, a voltage is applied between the first current terminal and the second current terminal of the photoelectric conversion element 131_K in a direction opposite to the forward direction. At this time, current flows in the photoelectric conversion element 131_K in accordance with the illuminance of incident light, and the value of the voltage of the node N11_K varies depending on current flowing in photoelectric conversion element 131_K. Note that in the period T21 to the period T23, the period after the pulse of the signal TX_K is input and before the pulse of the signal TX_K is input again is also referred to an accumulation period.

Further, in a period T24, a pulse of the signal PRST is input, in a period T25, a pulse of the signal TX_1 is input, and in a period T26, a pulse of the signal OSEL is input. In addition, in a period T27, a pulse of the signal PRST is input, in a period T28, a pulse of the signal TX_2 is input, and in a period T29, a pulse of the signal OSEL is input. After that, a pulse of the signal PRST are input plural times, in a period after every time the pulse of the signal PRST is input, a pulse of a different signal TX is input, and in the period after the pulse of the signal TX is input, a pulse of the signal OSEL is input. In a period T30, a pulse of the signal PRST is input, in a period T31, a pulse of the signal TX_Z is input, and in a period T32, a pulse of the signal OSEL is input.

In the period T24 to a period T32, while the pulse of the signal PRST is input, the voltage of the node N12 is reset.

In addition, in the period T24 to the period T32, while a pulse of the signal TX_K is input, the transistor 134_K is turned on, and thereby the voltage of the node N11_K and the voltage of the node N12 vary. At this time, the voltage of the node N11_K and the voltage of the node N12 vary depending on the ratio of a capacitance added to each of the nodes. At this time, when the voltage of the node N12 varies, the value of the channel resistance between the source and the drain of the transistor 132 is changed.

In addition, in the period T24 to the period T32, while a pulse of the signal OSEL is input, the transistor 133 is in on state, and current flows through the source and the drain of the transistor 132 and the source and the drain of the transistor 133. The amount of the current flowing through the source and the drain of the transistor 132 and the source and the drain of the transistor 133 depends on the voltage of the node N12, i.e., the voltage value of the gate of the transistor 132. Thus, the amount of the current flowing through the source and the drain of the transistor 132 and the source and the drain of the transistor 133 depends on the illuminance of light entering the photoelectric conversion element 131_K in the accumulation period. For example, it is also possible that as the illuminance of light entering the photoelectric conversion element 131_K is higher, the voltage representing optical data can be lowered. Alternatively, without limitations to this example, it is also possible that as the illuminance of light entering the photoelectric conversion element 131_K is higher, the voltage representing optical data can be increased. In addition, the photodetector circuit illustrated in FIG. 2A outputs optical data from the other of the source and the drain of the transistor 133 as an optical data signal.

In addition, in the period T24 to the period T32, after the pulse of the signal OSEL is input and before a pulse of the next signal TX_M (M is a natural number of from 2 to Z) is input, pulses of the signal TX_M−1 and the signal PRST_M−1 may be input so that the node N12 is reset again. In this manner, in the period T24 to the period T32, after the pulse of the signal OSEL is input and before a pulse of the next signal TX_M (M is a natural number of from 2 to Z) is input, pulses of the signal TX_M−1 and the signal PRST_M−1 are input, so that another reset operation is not needed. Therefore, a cycle for reading (imaging) can be shortened. This is the example of the method for driving the photodetector circuit illustrated in FIG. 2A.

As described with reference to FIGS. 2A and 2B, the example of the photodetector circuit in this embodiment is a structure in which one amplifying transistor and one output selection transistor are shared with a plurality of charge accumulation control transistors and a plurality of photoelectric conversion elements. In this structure, the number of the transistors used in the pixel portion can be decreased. By the decrease of the pixel portion number of the transistors used in the pixel portion, the size of one pixel can be reduced or the size of the photoelectric conversion element can be increased. For example, as the size of the photoelectric conversion element is increased, the sensitivity to incident light can be enhanced.

Further, the example of the photodetector circuit in this embodiment is a structure in which the photodetection reset transistor capable of selecting either reset or non-reset of the voltage of the gate of the amplifying transistor is provided. By this structure, the accuracy of optical data can be increased in accordance with the illuminance of light entering the photodetector circuit.

(Embodiment 3)

In this embodiment, another example of the photodetector circuit in the input/output device of Embodiment 1 is described. Note that the same portions in the example of the photodetector circuit to be described in this embodiment as the photodetector circuit of the input/output device in Embodiment 1 are referred to for the description the photodetector circuit of the input/output device in Embodiment 1.

Figure 3A:
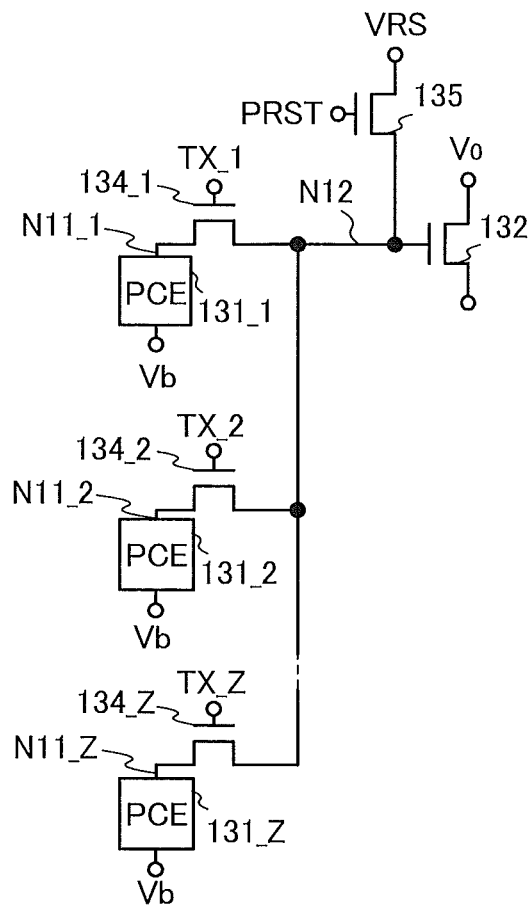
FIGS. 3A and 3B are diagrams showing an example of a photodetector circuit in Embodiment 3.
Figure 3B:
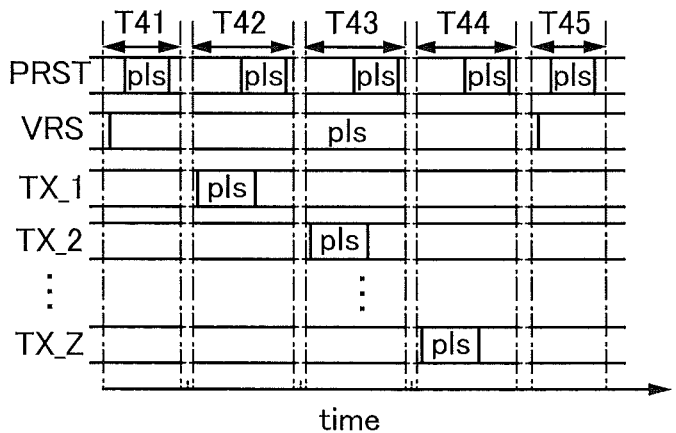

An example of the light detection circuit in this embodiment will be described with reference to FIGS. 3A and 3B. FIGS. 3A and 3B illustrate the photodetector circuit of this embodiment.

First, a configuration example of the light detection circuit in this embodiment will be described with reference to FIG. 3A. FIG. 3A is a circuit diagram illustrating the structure example of the photodetector in this embodiment.

The photodetector circuit illustrated in FIG. 3A includes the Z photoelectric conversion elements, 131_1 to 131_Z, the transistor 132, the Z transistors 134, 134_1 to 134_Z, and the transistor 135, similarly photodetector circuit illustrated in FIG. 2A. In addition, the photodetector circuit illustrated in FIG. 3A is different from the photodetector circuit illustrated in FIG. 2A, because the transistor 133 is not provided in the photodetector circuit illustrated in FIG. 3A.

In the photodetector circuit illustrated in FIG. 3A, a voltage $V_b$ is input to a first current terminal of the photoelectric conversion element 131_K.

One of a source and a drain of the transistor 134_K is connected to a second current terminal of the photoelectric conversion element 131_K and a charge accumulation control signal TX_K is input to a gate of the transistor 134_K.

A voltage $V_0$ is input to one of a source and a drain of the transistor 132. A gate of the transistor 132 is connected to the other of the source and the drain of each of the transistor 134_1 to transistor 134Z.

A reset voltage signal (also referred to as a signal VRS) is input to one of a source and a drain of the transistor 135, and the other of the source and the drain of the transistor 135 is connected to the gate of the transistor 132, and a photodetection reset signal PRST is input to a gate of the transistor 135.

Next, an example of a driving method of the photodetector circuit illustrated in FIG. 3A is described with reference to FIG. 3B. FIG. 3B is a timing chart for explaining the example of the driving method of the photodetector circuit illustrated in FIG. 3A, and shows states of a signal PRST, a signal TX_1 to a signal TX_Z and a signal OSEL. In addition, in this embodiment, an example is described, in which each of the photoelectric conversion element 131_1 to photoelectric conversion element 131_Z is a photodiode, and the voltage $V_a$ is a high power voltage and the voltage $V_b$ is a low power voltage, and the value of voltage $V_0$ is equal to that of a reference potential.

In the example of the driving method of the photodetector circuit illustrated in FIG. 3A, in a period T41, a pulse of a signal PRST is input. In addition, one pulse of the signal VRS is input in the period T41 to the period T45.

While pulses of the signal PRST and the signal VRS are input, the transistor 135 is on state and the voltage of the node N12 is reset to a given value.

Further, in a period T42, a pulse of a signal TX_1 is input, and while the pulse of the signal TX_1 is input in the period T42, a pulse of the signal PRST is input. Further, in a period T43, a pulse of a signal TX_2 is input, and while the pulse of the signal TX_2 is input in the period T43, a pulse of the signal PRST is input. After that, a pulse of a different signal TX is sequentially input, and while the pulse of the signal TX is input, a pulse of a signal PRST is input. In a period T44, a pulse of a signal TX_Z is input, and while the pulse of the signal TX_Z is input in the period T44, a pulse of the signal PRST is input.

In the period T42 to the period T44, before the pulse of the signal PRST_K is input, while the pulse of the signal TX_K is input, the transistor 134_K is in on state, and the voltage of the node N11_K and the voltage of the node N12 vary. At this time, the voltage of the node N11_K and the voltage of the node N12 vary depending on the ratio of a capacitance added to each of the nodes. At this time, when the voltage of the node N12 varies, the value of the channel resistance between the source and the drain of the transistor 132 is changed.

Further, current flows through the source and the drain of the transistor 132. The amount of the current flowing through the source and the drain of the transistor 132 depends on the voltage of the node N12, i.e., the voltage value of the gate of the transistor 132.

In addition, in the period T42 to the period T44, while the pulses of the signal TX_K and the signal VRS are input, the voltage of the node N12 is reset to be substantially equal to the voltage $V_a$.

Further, in the period T42 to the period T44, after a pulse of the signal PRST_K is input and before the pulse of the signal TX_K is input (for example, until entry of a pulse of a signal TX_K in the next reading period), a voltage is applied between a first current terminal and a second current terminal of the photoelectric conversion element 131_K in a direction opposite to a forward direction. At this time, current flows in the photoelectric conversion element 131_K in accordance with the illuminance of incident light, and the value of the node N11_K varies depending on current flowing in photoelectric conversion element 131_K. Note that in the period T42 to the period T44, the period after the pulse of the signal PRST_K is input and before the pulse of the signal TX_K is input again is also referred to an accumulation period.

In addition, the amount of the current flowing through the source and the drain of the transistor 132 depends on the illuminance of light entering the photoelectric conversion element 131_K in the accumulation period. For example, it is also possible that as the illuminance of light entering the photoelectric conversion element 131_K is higher, the voltage representing optical data can be lowered. In addition, the photodetector circuit illustrated in FIG. 3A outputs an optical data signal representing the optical data from the other of the source and the drain of the transistor 132.

Moreover, in a period T45, after a pulse of the signal VRS is input, a pulse of the signal PRST is input.

In the period T45, while the pulse of the signal PRST is input, the transistor 135 is on state. At this time, the voltage of the node N12 is reset to be substantially equal to the voltage of the signal VRS, so that the transistor 132 is in off state. The above is the example of the method for driving the light detection circuit in FIG. 3A.

As described with reference to FIGS. 3A and 3B, the example of the photodetector circuit in this embodiment is a structure in which one amplifying transistor is shared with a plurality of charge accumulation control transistors and a plurality of photoelectric conversion elements. In this structure, the number of the transistors used in the pixel portion can be decreased. By the decrease of the pixel portion number of the transistors used in the pixel portion, the size of one pixel can be reduced or the size of the photoelectric conversion element can be increased. For example, as the size of the photoelectric conversion element is increased, the sensitivity to incident light can be enhanced.

Further, the example of the photodetector circuit in this embodiment is a structure in which the photodetection reset transistor capable of selecting either reset or non-reset of the voltage of the gate of the amplifying transistor is provided. By this structure, the accuracy of optical data can be increased in accordance with the illuminance of light entering the photodetector circuit.

As described with reference to FIGS. 3A and 3B, the example of the photodetector circuit in this embodiment is a structure in which the photoelectric conversion element, the charge accumulation control transistor, the amplifying transistor, and the photodetection reset transistor capable of selecting either reset or non-reset of the voltage of the gate of the amplifying transistor are provided. By employing this structure, the number of the transistors can be decreased because an output selection transistor is not provided, while the generation accuracy of optical data is increased in accordance with the illuminance of light entering the photodetector circuit.

(Embodiment 4)

In this embodiment, examples of the display circuit in the input/output device of the above embodiment are described.

Examples of the display circuit in this embodiment are described with reference to FIGS. 4A to 4D. FIGS. 4A to 4D illustrate the examples of the display circuit in this embodiment.

Figure 4A:
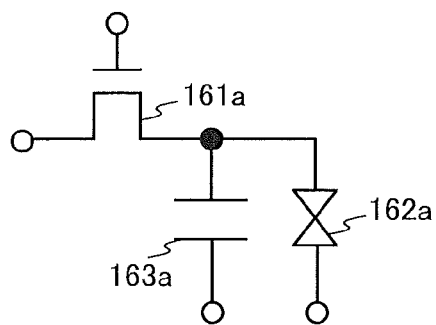
FIGS. 4A to 4D illustrate examples of a display circuit in Embodiment 4.
Figure 4C:
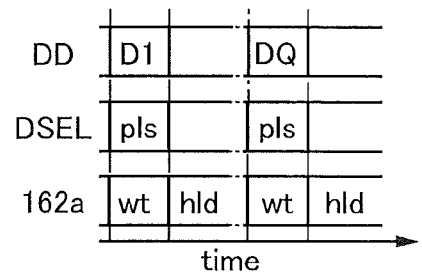
Figure 4B:
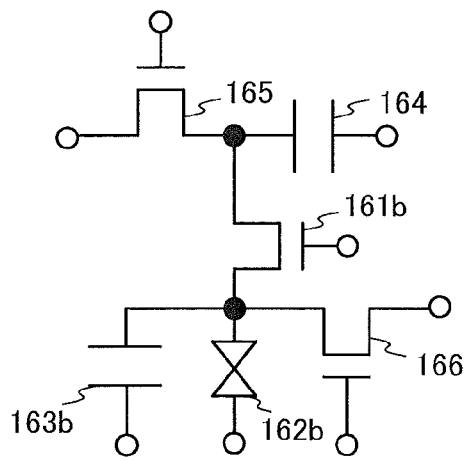

First, structural examples of the display circuit in this embodiment will be described with reference to FIGS. 4A and 4B. FIGS. 4A and 4B illustrate the structural examples of the display circuit in this embodiment.

The display circuit illustrated in FIG. 4A includes a transistor 161a, a liquid crystal element 162a, and a capacitor 163a.

Note that in the display circuit illustrated in FIG. 4A, the transistor 161a is a field-effect transistor.

In addition, in the input/output device, the liquid crystal element includes a first display electrode, a second display electrode, and a liquid crystal layer. The light transmittance of the liquid crystal layer changes depending on voltage applied between the first display electrode and the second display electrode.

Further, in the input/output device, the capacitor includes a first capacitor electrode, a second capacitor electrode, and a dielectric layer overlapping with the first capacitor electrode and the second capacitor electrode. Electric charge is accumulated in the capacitor in accordance with voltage applied between the first capacitor electrode and the second capacitor electrode.

A signal DD is input to one of a source and a drain of the transistor 161a, and a signal DSEL is input to a gate of the transistor 161a.

The first display electrode of the liquid crystal element 162a is electrically connected to the other of the source and the drain of the transistor 161a. Voltage Vc is input to the second display electrode of the liquid crystal element 162a. The value of the voltage Vc can be set as appropriate.

The first capacitor electrode of the capacitor 163a is electrically connected to the other of the source and the drain of the transistor 161a. The voltage Vc is input to the second capacitor electrode of the capacitor 163a.

The display circuit illustrated in FIG. 4B includes a transistor 161b, a liquid crystal element 162b, a capacitor 163b, a capacitor 164, a transistor 165, and a transistor 166.

Note that in the display circuit illustrated in FIG. 4B, the transistor 161b, the transistor 165, and the transistor 166 are field-effect transistors.

A signal DD is input to one of a source and a drain of the transistor 165. A write selection signal (a signal WSEL) that is a pulse signal is input to a gate of the transistor 165.

A first capacitor electrode of the capacitor 164 is electrically connected to the other of the source and the drain of the transistor 165. The voltage Vc is input to a second capacitor electrode of the capacitor 164.

One of a source and a drain of the transistor 161b is electrically connected to the other of the source and the drain of the transistor 165. A signal DSEL is input to a gate of the transistor 161b.

A first display electrode of the liquid crystal element 162b is electrically connected to the other of the source and the drain of the transistor 161b. The voltage Vc is input to a second display electrode of the liquid crystal element 162b.

A first capacitor electrode of the capacitor 163b is electrically connected to the other of the source and the drain of the transistor 161b. The voltage Vc is input to a second capacitor electrode of the capacitor 163b. The value of the voltage Vc is set as appropriate in accordance with the specifications of the display circuit.

Reference voltage is input to one of a source and a drain of the transistor 166. The other of the source and the drain of the transistor 166 is electrically connected to the other of the source and the drain of the transistor 161b. A display reset signal (a signal DRST) that is a pulse signal is input to a gate of the transistor 166.

Further, the components of the display circuits illustrated in FIGS. 4A and 4B will be described.

The transistors 161a and 161b function as display selection transistors.

As each of the liquid crystal layers of the liquid crystal elements 162a and 162b, a liquid crystal layer for transmitting light when voltage applied to a first display electrode and a second display electrode is 0 V can be used. For example, a liquid crystal layer containing an electrically controlled birefringence liquid crystal (ECB liquid crystal), a liquid crystal to which a dichroic pigment is added (a GH liquid crystal), a polymer dispersed liquid crystal, or a discotic liquid crystal can be used. A liquid crystal layer exhibiting a blue phase may be used as the liquid crystal layer. The liquid crystal layer exhibiting a blue phase contains, for example, a liquid crystal composition including a liquid crystal exhibiting a blue phase and a chiral agent. The liquid crystal exhibiting a blue phase has a short response time of 1 ms or less and is optically isotropic, which makes the alignment process unneeded and the viewing angle dependence small. Thus, with the liquid crystal exhibiting a blue phase, operation speed can be improved.

The capacitor 163a functions as a storage capacitor in which voltage i based on the signal DD is applied between the first capacitor electrode and the second capacitor electrode in response to the behavior of the transistor 161a. The capacitor 163b functions as a storage capacitor in which voltage based on the signal DD is applied between the first capacitor electrode and the second capacitor electrode in response to the behavior of the transistor 161b. The capacitors 163a and 163b are not necessarily provided; however, with the capacitors 163a and 163b, fluctuation in voltage applied to the liquid crystal elements due to the leakage current of the display selection transistors can be reduced.

The capacitor 164 functions as a storage capacitor in which voltage based on the signal DD is applied between the first capacitor electrode and the second capacitor electrode in response to the behavior of the transistor 165.

The transistor 165 functions as a write selection transistor for selecting whether or not the signal DD is input to the capacitor 164.

The transistor 166 functions as a display reset selection transistor for selecting whether or not voltage applied to the liquid crystal element 162b is reset.

Note that each of the transistors 161a, 161b, 165, and 166 is, for example, a transistor including a semiconductor layer containing a semiconductor that belongs to Group 14 in the periodic table (e.g., silicon) or a transistor including an oxide semiconductor layer. Channels are formed in the semiconductor layer and the oxide semiconductor layer of the transistors.

Next, examples of methods for driving the display circuits illustrated in FIGS. 4A and 4B will be described.

First, an example of a method for driving the display circuit illustrated in FIG. 4A will be described with reference to FIG. 4C. FIG. 4C is a timing chart for describing the example of the method for driving the display circuit illustrated in FIG. 4A, and illustrates the states of the signal DD and the signal DSEL.

In the example of the method for driving the display circuit illustrated in FIG. 4A, the transistor 161a is turned on when the pulse of a signal DSEL is input.

When the transistor 161a is turned on, the signal DD is input to the display circuit, so that the voltage value of the first display electrode of the liquid crystal element 162a and the voltage value of the first capacitor electrode of the capacitor 163a are equivalent to the voltage value of the signal DD.

At this time, the liquid crystal element 162a is set in a written state (a state wt) and the light transmittance of the liquid crystal element 162a is based on the signal DD, so that the display circuit is set in a display state based on data of the signal DD (data D1 to data DQ (Q is a natural number greater than or equal to 2).

Then, the transistor 161a is turned off, and the liquid crystal element 162a is set to be in a hold state (a state hld) and holds voltage applied between the first display electrode and the second display electrode so that the amount of fluctuation in the voltage from an initial value does not exceed a reference value until the next pulse of the signal DSEL is input. In addition, when the liquid crystal element 162a is in the hold state, the light unit in the input/output device in the above embodiment is lit.

Figure 4D:
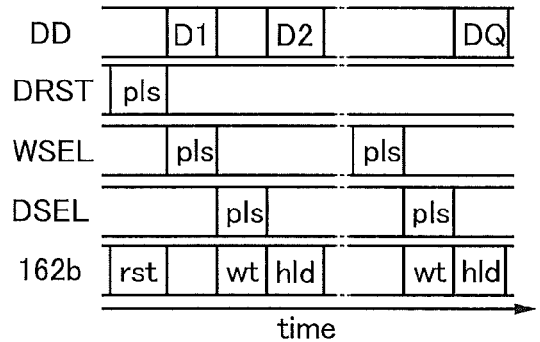

Next, an example of a method for driving the display circuit illustrated in FIG. 4B is described with reference to FIG. 4D. FIG. 4D is a timing chart for describing the example of the method for driving the display circuit illustrated in FIG. 4B.

In the example of the method for driving the display circuit illustrated in FIG. 4B, the transistor 166 is turned on by input of the pulse of a signal DRST, so that the voltage of the first display electrode of the liquid crystal element 162b and the voltage of the first capacitor electrode of the capacitor 163b are reset to reference voltage.

The transistor 165 is turned on by the input of the pulse of a signal WSEL, and the signal DD is input to the display circuit, so that the voltage value of the first capacitor electrode of the capacitor 164 is equivalent to the voltage value of the signal DD.

After that, the transistor 161b is turned on by the input of the pulse of the signal DSEL, so that the voltage value of the first display electrode of the liquid crystal element 162b and the voltage value of the first capacitor electrode of the capacitor 163b are equivalent to the voltage value of the first capacitor electrode of the capacitor 164.

At this time, the liquid crystal element 162b is set in a written state and the light transmittance of the liquid crystal element 162b is based on the signal DD, so that the display circuit is set in a display state based on data of the signal DD (the data D1 to the data DQ).

Then, the transistor 161b is turned off, and the liquid crystal element 162b is set in a hold state and holds voltage applied between the first display electrode and the second display electrode so that the amount of fluctuation in the voltage from an initial value does not exceed a reference value until the next pulse of the signal DSEL is input. In addition, when the liquid crystal element 162b is in the hold state, the light unit in the input/output device in the above embodiment is lit.

As described with reference to FIGS. 4A and 4B, in the example of the display circuit in this embodiment, the display selection transistor and the liquid crystal element are provided. With such a structure, the display circuit can be set in a display state based on a display data signal.

Further, as described with reference to FIG. 4B, in the example of the display circuit in this embodiment, the write selection transistor and the capacitor are provided in addition to the display selection transistor and the liquid crystal element. With such a structure, while the liquid crystal element is set in a display state based on data of the data signal, data of the next display signal can be written to the capacitor. Thus, the operation speed of the display circuit can be improved.

(Embodiment 5)

In this embodiment, a transistor that can be applied to the transistor in the input/output device described in the above embodiments will be described.

As the transistor in the input/output device described in the above embodiment, it is possible to use a transistor including an oxide semiconductor layer or a semiconductor layer containing a semiconductor that belongs to Group 14 of the periodic table (e.g., silicon), in which a channel is formed. Note that a layer in which a channel is formed is also referred to as a channel formation layer.

The semiconductor layer may be a single crystal semiconductor layer, a polycrystalline semiconductor layer, a microcrystalline semiconductor layer, or an amorphous semiconductor layer.

As a transistor including the oxide semiconductor layer which can be used as a transistor in the input/output device described in the above embodiment, for example, a transistor including an oxide semiconductor layer that is highly purified to be intrinsic (also referred to as i-type) or substantially intrinsic can be used.

Examples of structures of the transistor including the oxide semiconductor layer will be described with reference to FIGS. 5A to 5E. FIGS. 5A to 5E are schematic cross-sectional diagrams each illustrating an example of the structure of a transistor in this embodiment.

Figure 5A:
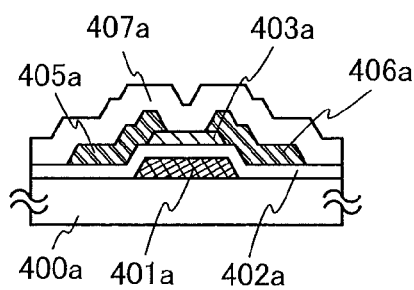
FIGS. 5A to 5E are diagrams for illustrating examples of transistors in Embodiment 5.

The transistor illustrated in FIG. 5A is one of bottom-gate transistors, which is also referred to as an inverted staggered transistor.

The transistor in FIG. 5A includes a conductive layer 401a, an insulating layer 402a, an oxide semiconductor layer 403a, a conductive layer 405a, and a conductive layer 406a.

The conductive layer 401a is formed over a substrate 400a.

The insulating layer 402a is formed over the conductive layer 401a.

The oxide semiconductor layer 403a overlaps with the conductive layer 401a with the insulating layer 402a interposed therebetween.

The conductive layer 405a and the conductive layer 406a are each provided over part of the oxide semiconductor layer 403a.

Further, in the transistor illustrated in FIG. 5A, part of a top surface of the oxide semiconductor layer 403a (part of the oxide semiconductor layer 403a over which neither the conductive layer 405a nor the conductive layer 406a is provided) is in contact with an insulating layer 407a.

In addition, the insulating layer 407a is in contact with the insulating layer 402a in a portion without the conductive layer 405a, the conductive layer 406a, or the oxide semiconductor layer 403a provided.

Figure 5B:
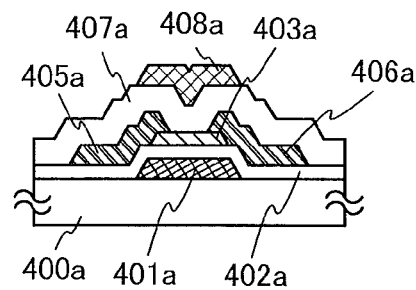

A transistor in FIG. 5B includes a conductive layer 408a in addition to the components in FIG. 5A.

The conductive layer 408a overlaps with the oxide semiconductor layer 403a with the insulating layer 407a interposed therebetween.

Figure 5C:
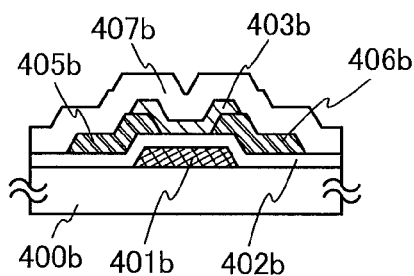

A transistor illustrated in FIG. 5C is a kind of bottom-gate transistor.

The transistor illustrated in FIG. 5C includes a conductive layer 401b, an insulating layer 402b, an oxide semiconductor layer 403b, a conductive layer 405b, and a conductive layer 406b.

The conductive layer 401b is formed over a substrate 400b.

The insulating layer 402b is formed over the conductive layer 401b.

The conductive layer 405b and the conductive layer 406b are formed over part of the insulating layer 402b.

The oxide semiconductor layer 403b overlaps with the conductive layer 401b with the insulating layer 402b interposed therebetween.

Further, in FIG. 5C, an upper surface and side surfaces of the oxide semiconductor layer 403b in the transistor are in contact with an insulating layer 407b.

Further, the insulating layer 407b is in contact with the insulating layer 402b in a portion without the conductive layer 405b, the conductive layer 406b, and the oxide semiconductor layer 403b provided.

Note that in FIGS. 5A and 5C, a protective insulating layer may be provided over the insulating layer.

Figure 5D:
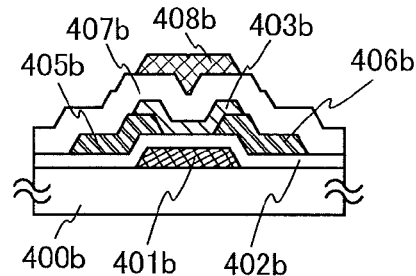

A transistor in FIG. 5D includes a conductive layer 408b in addition to the components in FIG. 5C.

The conductive layer 408b overlaps with the oxide semiconductor layer 403b with the insulating layer 407b interposed therebetween.

Figure 5E:
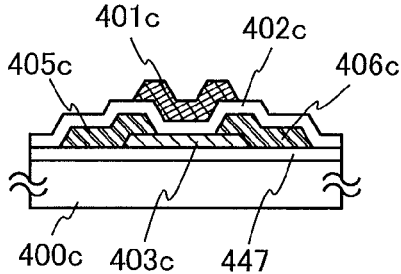

A transistor illustrated in FIG. 5E is a kind of top-gate transistor.

The transistor illustrated in FIG. 5E includes a conductive layer 401c, an insulating layer 402c, an oxide semiconductor layer 403c, a conductive layer 405c, and a conductive layer 406c.

The oxide semiconductor layer 403c is formed over a substrate 400c with an insulating layer 447 interposed therebetween.

The conductive layer 405c and the conductive layer 406c are formed over the oxide semiconductor layer 403c.

The insulating layer 402c is formed over the oxide semiconductor layer 403c, the conductive layer 405c, and the conductive layer 406c.

The conductive layer 401c overlaps with the oxide semiconductor layer 403c with the insulating layer 402c interposed therebetween.

Further, components illustrated in FIGS. 5A to 5E will be described.

As the substrates 400a to 400c, substrates having light-transmitting properties can be used, for example. As the substrates having light-transmitting properties, glass substrates or plastic substrate can be used, for example.

Each of the conductive layers 401a to 401c functions as a gate of the transistor. Note that such a conductive layer functioning as a gate of the transistor can be called a gate electrode or a gate wiring.

Each of the conductive layers 401a to 401c can be, for example, a layer of a metal material such as molybdenum, titanium, chromium, tantalum, tungsten, aluminum, copper, neodymium, or scandium; or an alloy material containing any of these materials as a main component. The conductive layers 401a to 401c can also be formed by stacking layers of materials which can be applied to the conductive layers 401a to 401c.

Each of the insulating layers 402a to 402c serves as a gate insulating layer of the transistor.

As the insulating layers 402a to 402c, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a to 402c can also be formed by stacking layers of materials which can be used for the insulating layers 402a to 402c.

In addition, as the insulating layers 402a to 402c, an insulating layer of a material containing, for example, an element that belongs to Group 13 in the periodic table and an oxygen element can be used. When the oxide semiconductor layers 403a to 403c contain an element that belongs to Group 13, use of insulating layers containing an element that belongs to Group 13 as insulating layers in contact with the oxide semiconductor layers 403a to 403c makes the state of the interfaces between the insulating layers and the oxide semiconductor layers favorable.

Examples of the material including an element that belongs to Group 13 include gallium oxide, aluminum oxide, aluminum gallium oxide, and gallium aluminum oxide. Note that aluminum gallium oxide refers to a substance in which the amount of aluminum is larger than that of gallium in atomic percent, and gallium aluminum oxide refers to a substance in which the amount of gallium is larger than or equal to that of aluminum in atomic percent.

For example, the use of an insulating layer containing gallium oxide as each of the insulating layers 402a to 402c can suppress the accumulation of hydrogen or hydrogen ions at the interfaces between the insulating layer 402a and the oxide semiconductor layer 403a, the insulating layer 402b and the oxide semiconductor layer 403b, and the insulating layer 402c and the oxide semiconductor layer 403c.

In addition, for example, the use of an insulating layer containing aluminum oxide as each of the insulating layers 402a to 402c can reduce the accumulation of hydrogen or hydrogen ions at the interfaces between the insulating layer 402a and the oxide semiconductor layer 403a, the insulating layer 402b and the oxide semiconductor layer 403b, and the insulating layer 402c and the oxide semiconductor layer 403c. An insulating layer containing aluminum oxide is less likely to transmit moisture; thus, the use of an insulating layer containing aluminum oxide can suppress entry of moisture to the oxide semiconductor layer through the insulating layer.

As the insulating layers 402a to 402c, a material represented by $Al_2O_x$ (x=3+α, where α is larger than 0 and smaller than 1), $Ga_2O_x$ (x=3+α, where α is larger than 0 and smaller than 1), or $Ga_xAl_{2-x}O_{3+α}$, (x is larger than 0 and smaller than 2 and α is larger than 0 and smaller than 1) can be used, for example. Each of the insulating layers 402a to 402c can be a stack of layers of materials which can be used for the insulating layers 402a to 402c. For example, each of the insulating layers 402a to 402c can be a stack of layers containing gallium oxide represented by $Ga_2O_x$. Alternatively, each of the insulating layers 402a to 402c can be a stack of an insulating layer containing gallium oxide represented by $Ga_2O_x$ and an insulating layer containing aluminum oxide represented by $Al_2O_x$.

The insulating layer 447 serves as a base layer for preventing the diffusion of an impurity element coining from the substrate 400c. The insulating layer 447 may be provided for the transistors having the structures illustrated in FIGS. 5A to 5D.

The insulating layer 447 can be, for example, a layer of a material which can be used for the insulating layers 402a to 402c. Alternatively, the insulating layer 447 can be a stack of layers of materials which can be used for the insulating layers 402a to 402c.

The oxide semiconductor layers 403a to 403c each function as a layer in which a channel of a transistor is formed. Note that the layer in which a channel of a transistor is formed is also referred to as a channel formation layer. As an oxide semiconductor that can be used for the oxide semiconductor layers 403a to 403c, an oxide semiconductor including at least indium (In) or zinc (Zn) is preferably used. Alternatively, an oxide semiconductor including indium (In) and zinc (Zn) is preferably used. Alternatively, a Sn-based metal oxide can be used as such an oxide semiconductor, for example. As a stabilizer for reducing variation in electric characteristics of a transistor using the oxide semiconductor, gallium (Ga) is preferably contained as a stabilizer in the oxide semiconductor. Tin (Sn) is preferably contained as a stabilizer in the oxide semiconductor. Hafnium (Hf) is preferably contained as a stabilizer in the oxide semiconductor. Aluminum (Al) is preferably contained as a stabilizer in the oxide semiconductor.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained in the oxide semiconductor.

As the oxide semiconductor, for example, an indium oxide, a tin oxide, a zinc oxide, a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide, a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used. The metal oxide that can be used as the oxide semiconductor may contain silicon oxide.

Note that here, for example, an "In—Ga—Zn-based oxide" means an oxide containing In, Ga, and Zn as its main component, in which there is no particular limitation on the ratio of In:Ga:Zn. The In—Ga—Zn-based oxide may contain a metal element other than the hi, Ga, and Zn.

In the case where an In—Zn-based metal oxide is used, for example, an oxide target having the following composition ratios can be used for deposition of an In—Zn-based metal oxide semiconductor layer: In:Zn=50:1 to 1:2 ($In_2O_3$:ZnO=25:1 to 1:4 in a molar ratio), preferably In:Zn=20:1 to 1:1 ($In_2O_3$:ZnO=10:1 to 1:2 in a molar ratio), more preferably In:Zn=15:1 to 1.5:1 ($In_2O_3$:ZnO=15:2 to 3:4 in a molar ratio). For example, when the atomic ratio of the target used for the deposition of the In—Zn-based oxide semiconductor is expressed by In:Zn:O=P:U:R, R>1.5P+U. The increase in In content makes the mobility (also referred to as a field effect mobility) of the transistor higher.

As the oxide semiconductor, a material represented by $InMO_3(ZnO)_m$ (nm is larger than 0) can be used. Here, M in $InMO_3(ZnO)_m$ represents one or more metal elements selected from Ga, Al, Mn, or Co.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

However, the composition is not limited to those described above, and a material having the appropriate composition may be used depending on necessary semiconductor characteristics (e.g., mobility, threshold voltage, and variation of electric characteristics). In order to obtain necessary semiconductor characteristics, it is preferable that the carrier density, the impurity concentration, the defect density, the atomic ratio of a metal element to oxygen, the interatomic distance, the density, and the like be set to be appropriate.

For example, with the In—Sn—Zn-based oxide, a high mobility can be relatively easily obtained. However, the mobility can be increased by reducing the defect density in the bulk also in the case of using the In—Ga—Zn-based oxide.

Note that for example, the expression "the composition of an oxide including In, Ga, and Zn at the atomic ratio, In:Ga:Zn=a:b:c (a+b+c=1), is in the neighborhood of the composition of an oxide including In, Ga, and Zn at the atomic ratio, In:Ga:Zn=A:B:C (A+B+C=1)" means that a, b, and c satisfy the following relationship: $(a-A)^2+(b-B)^2+(c-C)^2 \leq r^2$, and r may be 0.05, for example. The same applies to other oxides.

The oxide semiconductor may be either single crystal or non-single-crystal. In the latter case, the oxide semiconductor may be either amorphous or polycrystalline. Further, the oxide semiconductor may have either an amorphous structure including a portion having crystallinity or a non-amorphous structure.

In an oxide semiconductor in an amorphous state, a flat surface can be obtained relatively easily, so that when a transistor is manufactured with the use of the oxide semiconductor, interface scattering can be reduced, and relatively high mobility can be obtained relatively easily.

In an oxide semiconductor having crystallinity, defects in the bulk can be further reduced and when a surface flatness is improved, mobility higher than that of an oxide semiconductor in an amorphous state can be obtained. In order to improve the surface flatness, the oxide semiconductor is preferably formed over a flat surface. Specifically, the oxide semiconductor may be formed over a surface with the average surface roughness ($R_a$) of less than or equal to 1 nm, preferably less than or equal to 0.3 nm, further preferably less than or equal to 0.1 nm.

Note that the average surface roughness ($R_a$) is a value obtained by expanding, into three dimensions, center line average roughness that is defined by JIS B 0601 so as to be able to apply it to a measurement surface. The $R_a$ can be expressed as an "average value of the absolute values of deviations from a reference surface to a designated surface" and is defined by the following formula.

$$Ra = \frac{1}{S_0} \int_{y_1}^{y_2} \int_{x_1}^{x_2} |f(x, y) - Z_0| dx dy \quad \text{[FORMULA 1]}$$

In the above formula, $S_0$ represents the area of a measurement plane (a rectangular region which is defined by four points represented by coordinates $(x_1, y_1)$, $(x_1, y_2)$, $(x_2, y_2)$ and $(x_2, y_2)$), and $Z_0$ represents an average height of the measurement plane. $R_a$ can be measured using an atomic force microscope (AFM). The measurement plane is a plane where the all measurement data are shown. The measurement plane consists of three parameters (X, Y, Z) and is represented as Z=F(X, Y). The range of X (and Y) is from 0 to $X_{max}$ (and $Y_{max}$), and the range of Z is from $Z_{min}$ to $Z_{max}$.

As an oxide semiconductor, an oxide including a crystal with c-axis alignment (also referred to as a c-axis aligned crystal (CAAC)), which has a triangular or hexagonal atomic arrangement when seen from the direction of an a-b plane, a surface, or an interface may be used. In the crystal, metal atoms are arranged in a layered manner, or metal atoms and oxygen atoms are arranged in a layered manner along the c-axis, and the direction of the a-axis or the b-axis is varied in the a-b plane (the crystal rotates around the c-axis). CAAC will described below.

In a broad sense, an oxide including CAAC means a non-single-crystal oxide including a phase that has a triangular, hexagonal, regular triangular or regular hexagonal atomic arrangement when seen from the direction perpendicular to the a-b plane and in which metal atoms are arranged in a layered manner or metal atoms and oxygen atoms are arranged in a layered manner when seen from the direction perpendicular to the c-axis direction.

The CAAC is not a single crystal, but this does not mean that the CAAC is composed of only an amorphous component. Although the CAAC includes a crystallized portion (crystalline portion), a boundary between one crystalline portion and another crystalline portion is not clear in some cases.

When oxygen is contained in the CAAC, nitrogen may be substituted for part of oxygen included in the CAAC. The c-axes of individual crystalline portions included in the CAAC may be aligned in one direction (e.g., a direction perpendicular to a surface of a substrate over which the CAAC is formed or a surface of the CAAC). Alternatively, the normals of the a-b planes of the individual crystalline portions included in the CAAC may be aligned in one direction (e.g., a direction perpendicular to a surface of a substrate over which the CAAC is formed or a surface of the CAAC).

The CAAC becomes a conductor, a semiconductor, or an insulator depending on its composition or the like. The CAAC transmits or does not transmit visible light depending on its composition or the like.

As an example of such a CAAC, there is a crystal which is formed into a film shape and has a triangular or hexagonal atomic arrangement when observed from the direction perpendicular to a surface of the film or a surface of a supporting substrate, and in which metal atoms are arranged in a layered manner or metal atoms and oxygen atoms (or nitrogen atoms) are arranged in a layered manner when a cross section of the film is observed.

An example of a crystal structure of the CAAC will be described in detail with reference to FIGS. 18A to 18E, FIGS. 19A to 19C, and FIGS. 20A to 20C. In FIGS. 18A to 18E, FIGS. 19A to 19C, and FIGS. 20A to 20C, the vertical direction corresponds to the c-axis direction and a plane perpendicular to the c-axis direction corresponds to the a-b plane, unless otherwise specified. When the expressions an "upper half" and a "lower half" are simply used, the "upper half" and the "lower half" refer to an upper half above the a-b plane and a lower half below the a-b plane, respectively.

Figure 18A:
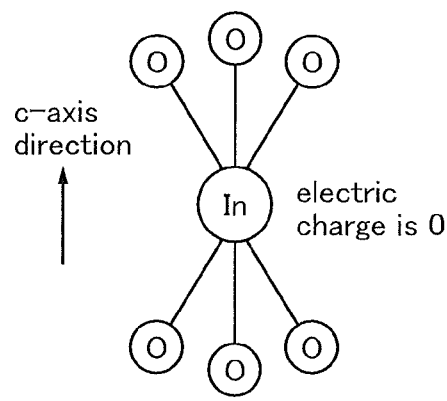
FIGS. 18A to 18E are diagrams illustrating structures of oxide materials according to one embodiment of the present invention.

FIG. 18A illustrates a structure including one hexacoordinate In atom and six tetracoordinate oxygen (hereinafter referred to as tetracoordinate O) atoms proximate to the In atom. Here, a structure including one metal atom and oxygen atoms proximate to the metal atom is referred to as a small group. The structure in FIG. 18A is actually an octahedral structure, but is illustrated as a planar structure for simplicity. Note that three tetracoordinate O atoms exist in each of an upper half and a lower half in FIG. 18A. In the small group illustrated in FIG. 18A, electric charge is 0.

Figure 18D:
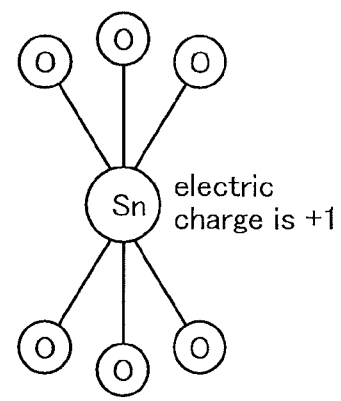
Figure 18B:
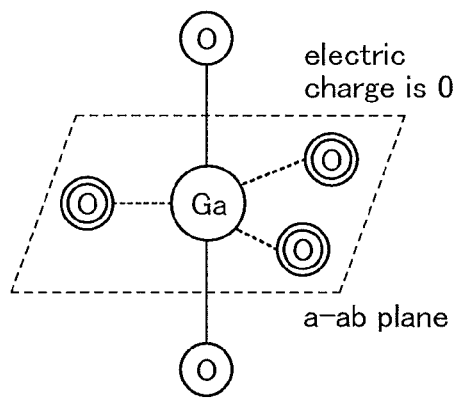

FIG. 18B illustrates a structure including one pentacoordinate Ga atom, three tricoordinate oxygen (hereinafter referred to as tricoordinate O) atoms proximate to the Ga atom, and two tetracoordinate O atoms proximate to the Ga atom. All the tricoordinate O atoms exist on the a-b plane. One tetracoordinate O atom exists in each of an upper half and a lower half in FIG. 18B. An In atom can also have the structure illustrated in FIG. 18B because an In atom can have five ligands. In the small group illustrated in FIG. 18B, electric charge is 0.

Figure 18E:
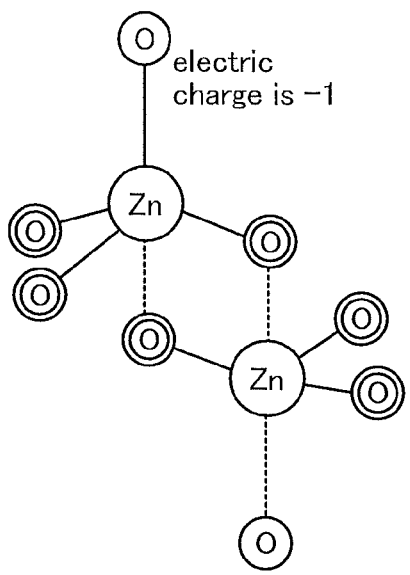
Figure 18C:
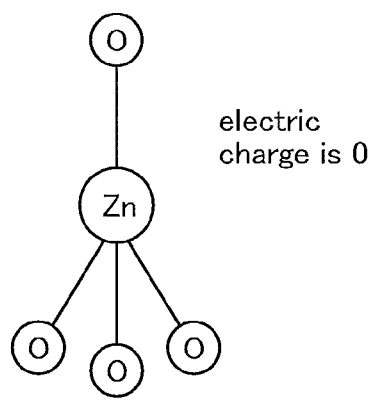

FIG. 18C illustrates a structure including one tetracoordinate Zn atom and four tetracoordinate O atoms proximate to the Zn atom. In FIG. 18C, one tetracoordinate O atom exists in an upper half and three tetracoordinate O atoms exist in a lower half. Alternatively, three tetracoordinate O atoms may exist in the upper half and one tetracoordinate O atom may exist in the lower half in FIG. 18C. In the small group illustrated in FIG. 18C, electric charge is 0.

FIG. 18D illustrates a structure including one hexacoordinate Sn atom and six tetracoordinate O atoms proximate to the Sn atom. In FIG. 18D, three tetracoordinate O atoms exist in each of an upper half and a lower half. In the small group illustrated in FIG. 18D, electric charge is +1.

FIG. 18E illustrates a small group including two Zn atoms. In FIG. 18E, one tetracoordinate O atom exists in each of an upper half and a lower half. In the small group illustrated in FIG. 18E, electric charge is −1.

Here, a plurality of small groups form a medium group, and a plurality of medium groups form a large group (also referred to as a unit cell).

Now, a rule of bonding between the small groups will be described. The three O atoms in the upper half with respect to the hexacoordinate In atom in FIG. 18A each have three proximate In atoms in the downward direction, and the three O atoms in the lower half each have three proximate In atoms in the upward direction. The one O atom in the upper half with respect to the pentacoordinate Ga atom has one proximate Ga atom in the downward direction, and the one O atom in the lower half has one proximate Ga atom in the upward direction. The one O atom in the upper half with respect to the tetracoordinate Zn atom has one proximate Zn atom in the downward direction, and the three O atoms in the lower half each have three proximate Zn atoms in the upward direction. In this manner, the number of the tetracoordinate O atoms above the metal atom is equal to the number of the metal atoms proximate to and below each of the tetracoordinate O atoms. Similarly, the number of the tetracoordinate O atoms below the metal atom is equal to the number of the metal atoms proximate to and above each of the tetracoordinate O atoms. Since the coordination number of the tetracoordinate O atom is 4, the sum of the number of the metal atoms proximate to and below the O atom and the number of the metal atoms proximate to and above the O atom is 4. Accordingly, when the sum of the number of tetracoordinate O atoms above a metal atom and the number of tetracoordinate O atoms below another metal atom is 4, the two kinds of small groups including the metal atoms can be bonded. For example, in the case where the hexacoordinate metal (In or Sn) atom is bonded through a tetracoordinate O atom in the lower half, since the number of the tetracoordinate O atoms in the lower half of the hexacoordinate metal (In or Sn) atom is 3, it is bonded to the pentacoordinate metal (Ga or In) atom or the tetracoordinate metal (Zn) atom.

A metal atom whose coordination number is 4, 5, or 6 is bonded to another metal atom through a tetracoordinate O atom in the c-axis direction. In addition to the above, a medium group can be formed in a different manner by combining a plurality of small groups so that the total electric charge of the layered structure is 0.

Figure 19A:
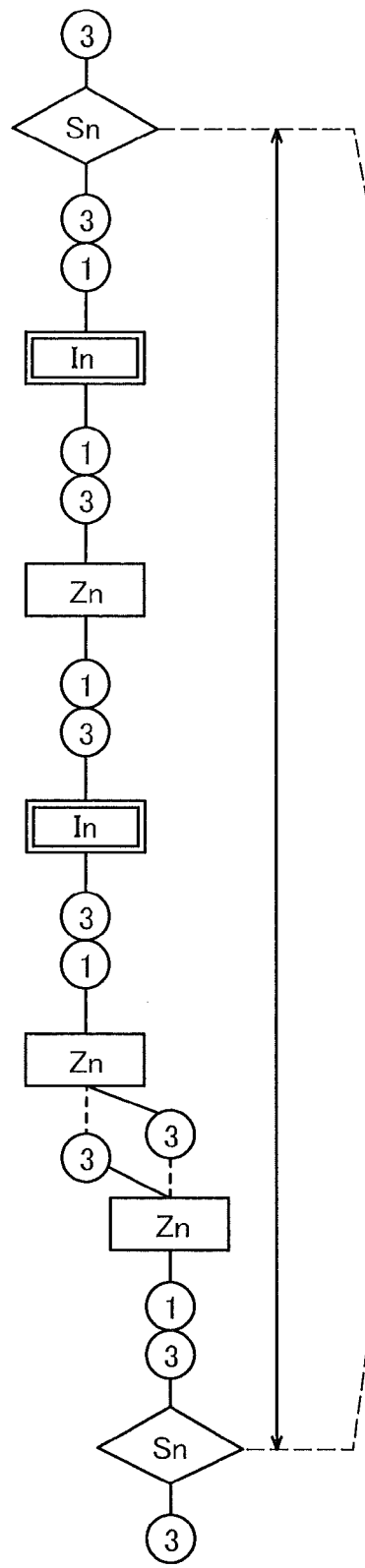
FIGS. 19A to 19C are diagrams illustrating a structure of an oxide material according to one embodiment of the present invention.
Figure 19B:
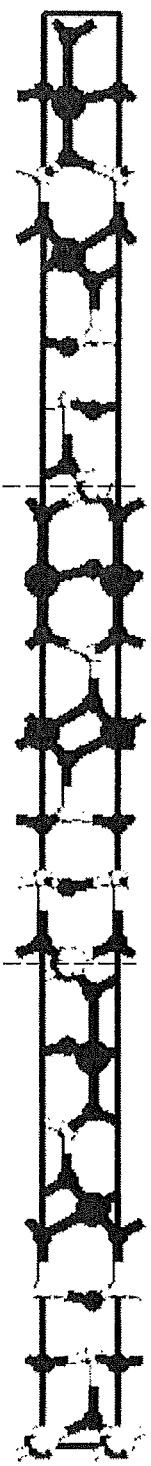
Figure 19C:
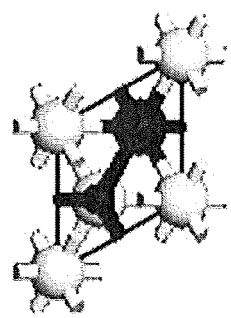

FIG. 19A illustrates a model of a medium group included in a layered structure of an In—Sn—Zn—O-based material. FIG. 19B illustrates a large group including three medium groups. Note that FIG. 19C illustrates an atomic arrangement in the case where the layered structure in FIG. 19B is observed from the c-axis direction.

In FIG. 19A, a tricoordinate O atom is omitted for simplicity, and a tetracoordinate O atom is illustrated by a circle; the number in the circle shows the number of tetracoordinate O atoms. For example, the state that three tetracoordinate O atoms existing in each of an upper half and a lower half with respect to a Sn atom is denoted by circled 3. Similarly, in FIG. 19A, one tetracoordinate O atom existing in each of an upper half and a lower half with respect to an In atom is denoted by circled 1. FIG. 19A also illustrates a Zn atom proximate to one tetracoordinate O atom in a lower half and three tetracoordinate O atoms in an upper half, and a Zn atom proximate to one tetracoordinate O atom in an upper half and three tetracoordinate O atoms in a lower half.

In the medium group included in the layered structure of the In—Sn—Zn—O-based material in FIG. 19A, in the order starting from the top, a Sn atom proximate to three tetracoordinate O atoms in each of an upper half and a lower half is bonded to an In atom proximate to one tetracoordinate O atom in each of an upper half and a lower half, the In atom is bonded to a Zn atom proximate to three tetracoordinate O atoms in an upper half, the Zn atom is bonded to an In atom proximate to three tetracoordinate O atoms in each of an upper half and a lower half through one tetracoordinate O atom in a lower half with respect to the Zn atom, the In atom is bonded to a small group that includes two Zn atoms and is proximate to one tetracoordinate O atom in an upper half, and the small group is bonded to a Sn atom proximate to three tetracoordinate O atoms in each of an upper half and a lower half through one tetracoordinate O atom in a lower half with respect to the small group. A plurality of such medium groups are bonded, so that a large group is formed.

Here, electric charge for one bond of a tricoordinate O atom and electric charge for one bond of a tetracoordinate O atom can be assumed to be −0.667 and −0.5, respectively. For example, electric charge of a (hexacoordinate or pentacoordinate) In atom, electric charge of a (tetracooridnate) Zn atom, and electric charge of a (pentacoordinate or hexacoordinate) Sn atom are +3, +2, and +4, respectively. Accordingly, electric charge in a small group including a Sn atom is +1. Therefore, electric charge of −1, which cancels +1, is needed to form a layered structure including a Sn atom. As a structure having electric charge of −1, the small group including two Zn atoms as illustrated in FIG. 18E can be given. For example, with one small group including two Zn atoms, electric charge of one small group including a Sn atom can be cancelled, so that the total electric charge of the layered structure can be 0.

When the large group illustrated in FIG. 19B is repeated, an In—Sn—Zn—O-based crystal ($In_2SnZn_3O_8$) can be obtained. Note that a layered structure of the obtained In—Sn—Zn—O-based crystal can be expressed as a composition formula, $In_2SnZn_2O_7(ZnO)_m$ (m is 0 or a natural number).

The above-described rule also applies to the following oxides: a four-component metal oxide such as an In—Sn—Ga—Zn-based oxide; a three-component metal oxide such as an In—Ga—Zn-based oxide (also referred to as IGZO), an In—Al—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga—based oxide; and the like.

Figures 20A, 20B, 20C:
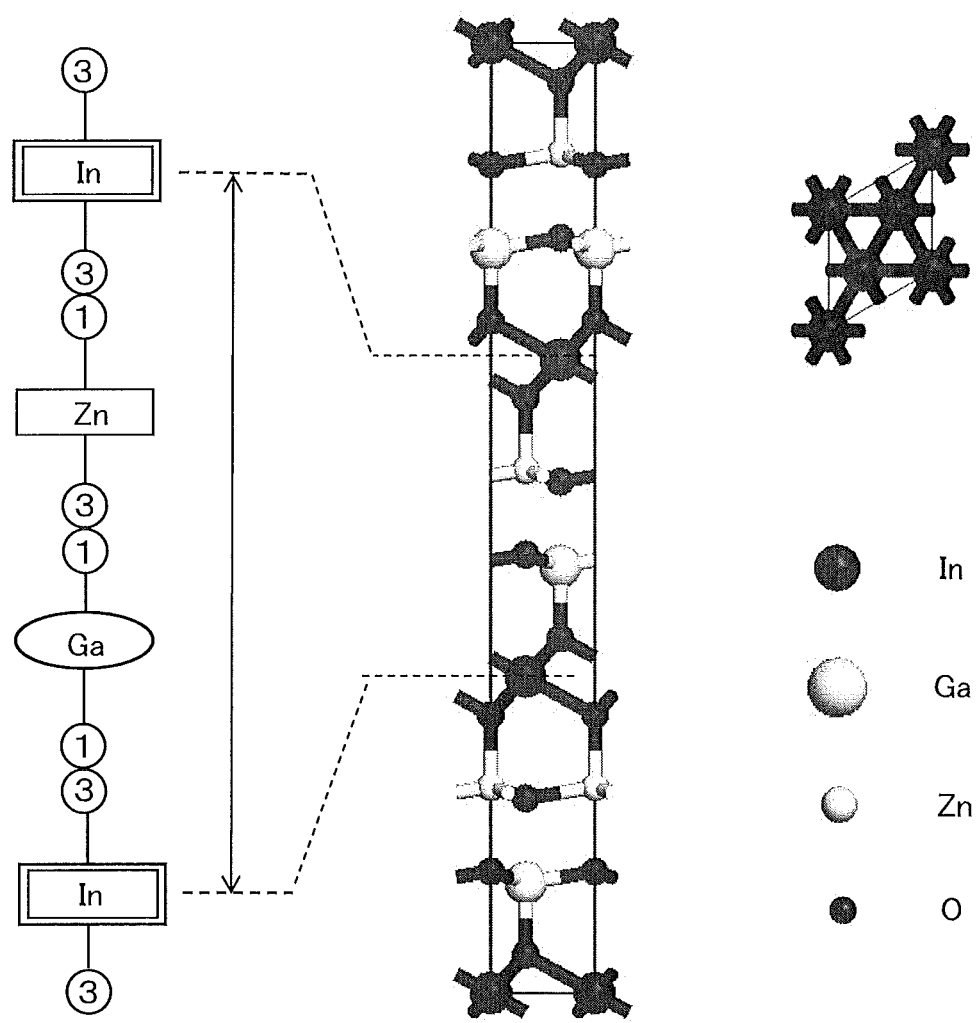
FIGS. 20A to 20C are diagrams illustrating a structure of an oxide material according to one embodiment of the present invention.

As an example, FIG. 20A illustrates a model of a medium group included in a layered structure of an In—Ga—Zn—O-based material.

In the medium group included in the layered structure of the In—Ga—Zn—O-based material in FIG. 20A, in the order starting from the top, an In atom proximate to three tetracoordinate O atoms in each of an upper half and a lower half is bonded to a Zn atom proximate to one tetracoordinate O atom in an upper half, the Zn atom is bonded to a Ga atom proximate to one tetracoordinate O atom in each of an upper half and a lower half through three tetracoordinate O atoms in a lower half with respect to the Zn atom, and the Ga atom is bonded to an In atom proximate to three tetracoordinate O atoms in each of an upper half and a lower half through one tetracoordinate O atom in a lower half with respect to the Ga atom. A plurality of such medium groups are bonded, so that a large group is formed.

FIG. 20B illustrates a large group including three medium groups. Note that FIG. 20C illustrates an atomic arrangement in the case where the layered structure in FIG. 20B is observed from the c-axis direction.

Here, since electric charge of a (hexacoordinate or pentacoordinate) In atom, electric charge of a (tetracooridnate) Zn atom, and electric charge of a (pentacoordinate) Ga atom are +3, +2, +3, respectively, electric charge of a small group including any of an In atom, a Zn atom, and a Ga atom is 0. As a result, the total electric charge of a medium group having a combination of such small groups is always 0.

In order to form the layered structure of the In—Ga—Zn—O-based material, a large group can be formed using not only the medium group illustrated in FIG. 20A but also a medium group in which the arrangement of the In atom, the Ga atom, and the Zn atom is different from that in FIG. 20A.

An example of a crystal structure contained in CAAC is described above.

The conductive layers 405a to 405c and the conductive layers 406a to 406c illustrated in FIGS. 5A to 5E each function as a source or a drain of the transistor. Note that a conductive layer functioning as a source of a transistor is also referred to as a source electrode or a source wiring, and a conductive layer functioning as a drain of a transistor is also referred to as a drain electrode or a drain wiring.

Each of the conductive layers 405a to 405c and the conductive layers 406a to 406c can be, for example, a layer of a metal material such as aluminum, chromium, copper, tantalum, titanium, molybdenum, or tungsten; or an alloy material containing the metal material as a main component. Alternatively, each of the conductive layers 405a to 405c and each of the conductive layers 406a to 406c can be a stack of layers of a material which can be used for the conductive layers 405a to 405c and the conductive layers 406a to 406c.

Alternatively, each of the conductive layers 405a to 405c and the conductive layers 406a to 406c can be a layer containing a conductive metal oxide. As the conductive metal oxide, indium oxide, tin oxide, zinc oxide, an alloy of indium oxide and tin oxide, or an alloy of indium oxide and zinc oxide can be used, for example. Note that the conductive metal oxide which can be used for each of the conductive layers 405a to 405c and the conductive layers 406a to 406c may contain silicon oxide.

Like the insulating layers 402a to 402c, as the insulating layers 407a and 407b, an insulating layer of a material containing, for example, an element that belongs to Group 13 in the periodic table and an oxygen element can be used. Alternatively, for the insulating layers 407a and 407b, a material represented by $Al_2O_x$, $Ga_2O_x$, or $Ga_xAl_{2-x}O_{3+\alpha}$ can be used.

For example, each of the insulating layers 402a to 402c and the insulating layers 407a and 407b can be an insulating layer containing gallium oxide represented by $Ga_2O_x$. Further, one of the insulating layer (the insulating layers 402a to 402c) and the insulating layer (the insulating layers 407a and 407b) may be an insulating layer including gallium oxide represented by $Ga_2O_x$, and the other of the insulating layer (the insulating layers 402a to 402c) and the insulating layer (the insulating layers 407a and 407b) may be an insulating layer including aluminum oxide represented by $Al_2O_x$.

Each of the conductive layers 408a and 408b functions as a gate of the transistor. When the transistor includes the conductive layer 408a or the conductive layer 408b, one of the conductive layer 401a and the conductive layer 408a or the one of the conductive layer 401b and the conductive layer 408b is referred to as a back gate, a back-gate electrode, or a back-gate wiring. A plurality of layers functioning as a gate are provided with the channel formation layer interposed therebetween, whereby the threshold voltage of the transistor can be controlled.

Each of the conductive layers 408a and 408b can be, for example, a layer of a metal material such as aluminum, chromium, copper, tantalum, titanium, molybdenum, or tungsten; or an alloy material which contains any of the above metal materials as a main component. Each of the conductive layers 408a and 408b can be formed by stacking layers of materials applicable to the conductive layers 408a and 408b.

Alternatively, as the conductive layers 408a and 408b, a layer including conductive metal oxide can be used. Examples of the conductive metal oxide are indium oxide, tin oxide, zinc oxide, an alloy of indium oxide and tin oxide, and an alloy of indium oxide and zinc oxide. Note that the conductive metal oxide applicable to the conductive layers 408a and 408b may contain silicon oxide.

Note that the transistor of this embodiment may have a structure in which an insulating layer is provided over part of the oxide semiconductor layer functioning as a channel formation layer and a conductive layer functioning as a source or a drain is provided to overlap with the oxide semiconductor layer with the insulating layer interposed therebetween. In the above structure, the insulating layer functions as a layer protecting a channel formation layer (also referred to as a channel protective layer) of the transistor. As the insulating layer functioning as a channel protective layer, a layer including a material applicable to the insulating layers 402a to 402c can be used for example. Alternatively, an insulating layer functioning as a channel protective layer may be formed by stacking layers of materials applicable to the insulating layers 402a to 402c.

Note that the transistor in this embodiment does not necessarily have the structure where the entire oxide semiconductor layer overlaps with the conductive layer functioning as a gate electrode, as illustrated in FIGS. 5A to 5E; in the case of employing the structure where the entire oxide semiconductor layer overlaps with the conductive layer functioning as a gate electrode, entry of light into the oxide semiconductor layer can be prevented.

In addition, the actually measured field-effect mobility of an insulated gate transistor can be lower than its original mobility because of a variety of reasons; this phenomenon occurs in not only transistors using oxide semiconductor but also all types of transistors. One of the reasons why the mobility is lowered is a defect inside a semiconductor or a defect at an interface between a semiconductor and an insulating film. When a Levinson model is adopted, the field-effect mobility on the assumption that no defect exists inside the semiconductor can be calculated theoretically.

Assuming that the original mobility and the measured field-effect mobility of a semiconductor are $\mu_0$ and $\mu$, respectively, and a potential barrier (such as a grain boundary) exists in the semiconductor, the following formula is obtained.

$$\mu = \mu_0 \exp\left(-\frac{E}{kT}\right) \qquad \text{[FORMULA 2]}$$

Here, E represents the height of the potential barrier, k represents the Boltzmann constant, and T represents the absolute temperature. When the potential barrier is assumed to be attributed to a defect, E can be expressed as the following formula according to the Levinson model.

$$E = \frac{e^2 N^2}{8\varepsilon n} = \frac{e^3 N^2 t}{8\varepsilon C_{ox} V_g} \qquad \text{[FORMULA 3]}$$

Here, e represents the elementary charge, N represents the average defect density per unit area in a channel, $\in$ represents the permittivity of the semiconductor, n represents the number of carriers per unit area in the channel, $C_{ox}$ represents the capacitance per unit area, $V_g$ represents the gate voltage, and t represents the thickness of the channel. In the case where the thickness of the semiconductor layer is less than or equal to 30 nm, the thickness of the channel may be regarded as being the same as the thickness of the semiconductor layer. The drain current $I_d$ in a linear region can be expressed as the following formula.

$$I_d = \frac{W_\mu V_g V_d C_{ox}}{L} \exp\left(-\frac{E}{kT}\right) \quad \text{[FORMULA 4]}$$

Here, L represents the channel length and W represents the channel width, and L and W are each 10 μm (L=W=10 μm). In addition, $V_d$ represents the drain voltage. When dividing both sides of the above formula by $V_g$ and then taking logarithms of both sides, the following formula can be obtained.

$$\ln\left(\frac{I_d}{V_g}\right) = \ln\left(\frac{W_\mu V_d C_{ox}}{L}\right) - \frac{E}{kT} \quad \text{[FORMULA 5]}$$
$$= \ln\left(\frac{W_\mu V_d C_{ox}}{L}\right) - \frac{e^3 N^2 t}{8kT\varepsilon C_{ox} V_g}$$

The right side (rightmost side) of Formula 5 is a function of $V_g$. From the formula, it is found that the defect density N can be obtained from the slope of a line in a graph which is obtained by plotting actual measured values with $\ln(I_d/V_g)$ as the axis of ordinate and $1/V_g$ as the axis of abscissa. That is, the defect density can be evaluated from the $I_d$-$V_g$ characteristics of the transistor. The defect density N of an oxide semiconductor in which the ratio of indium (In), tin (Sn), and zinc (Zn) is 1:1:1 is approximately $1\times10^{12}/cm^2$.

On the basis of the defect density etc., obtained in this manner, $\mu_0$ can be calculated to be 120 $cm^2$/Vs from Formula 2 and Formula 3. The measured mobility of an In—Sn—Zn oxide including a defect is approximately 40 $cm^2$/Vs. However, assuming that no defect exists inside the semiconductor and at the interface between the semiconductor and an insulating film, the mobility $\mu_0$ of the oxide semiconductor is expected to be 120 $cm^2$/Vs.

Note that even when no defect exists inside a semiconductor, scattering at an interface between a channel and a gate insulating layer affects the transport property of the transistor. In other words, the mobility $\mu_1$ at a position that is distance x away from the interface between the channel and the gate insulating layer can be expressed as the following formula.

$$\frac{1}{\mu_1} = \frac{1}{\mu_0} + \frac{D}{B}\exp\left(-\frac{x}{l}\right) \quad \text{[FORMULA 6]}$$

Here, D represents the electric field in the gate direction, and B and l are constants. B and l can be obtained from actual measurement results; according to the above measurement results, B is $4.75\times10^7$ cm/s and l is 10 nm (the depth which the influence of interface scattering reaches). When D is increased (i.e., when the gate voltage is increased), the second term of Formula 6 is increased and accordingly the mobility $\mu_1$ is decreased.

Figure 21:
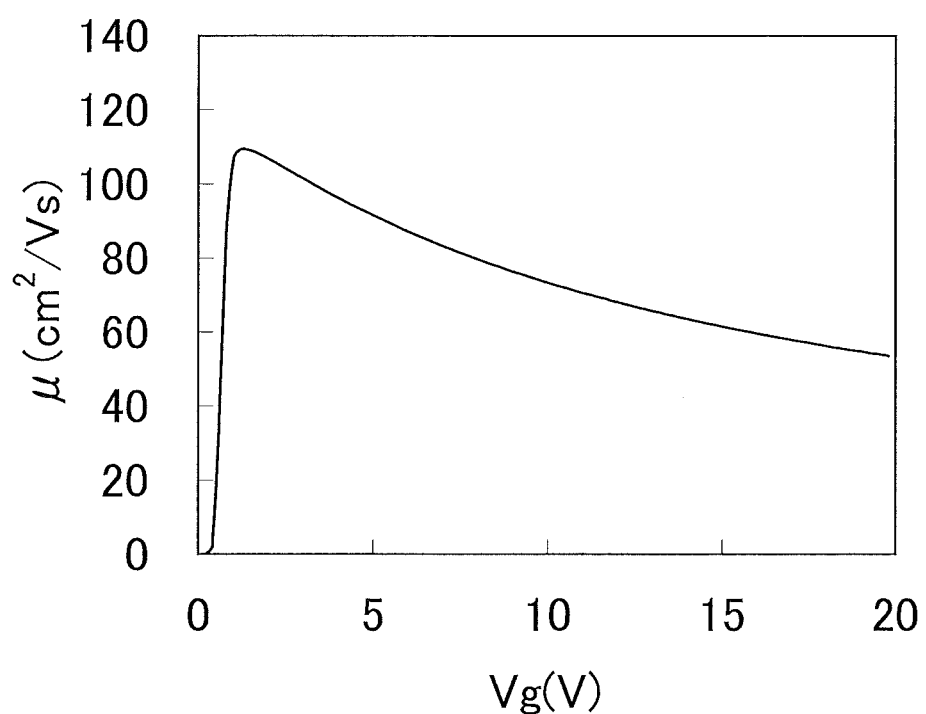
FIG. 21 shows gate voltage dependence of mobility obtained by calculation.

Calculation results of the mobility $\mu_2$ of a transistor, a channel of which includes an ideal oxide semiconductor without a defect inside the semiconductor, are shown in FIG. 21. For the calculation, device simulation software Sentaurus Device manufactured by Synopsys, Inc. was used, and the band gap, the electron affinity, the relative permittivity, and the thickness of the oxide semiconductor were assumed to be 2.8 eV, 4.7 eV, 15, and 15 nm, respectively. These values were obtained by measurement of a thin film that was formed by a sputtering method.

Further, the work functions of a gate, a source, and a drain were assumed to be 5.5 eV, 4.6 eV, and 4.6 eV, respectively. The thickness of a gate insulating layer was assumed to be 100 nm, and the relative permittivity thereof was assumed to be 4.1. The channel length and the channel width were each assumed to be 10 μm, and the drain voltage $V_d$ was assumed to be 0.1 V.

As shown in FIG. 21, the mobility is 100 $cm^2$/Vs or more at a gate voltage of 1 V and is decreased as the gate voltage becomes higher because the influence of interface scattering is increased. Note that in order to suppress interface scattering, it is desirable that a surface of the semiconductor layer be flat at the atomic level (atomic layer flatness).

Calculation results of characteristics of minute transistors which are manufactured using an oxide semiconductor having such a mobility are shown in FIGS. 22A to 22C, FIGS. 23A to 23C, and FIGS. 24A to 24C. FIGS. 25A and 25B illustrate cross-sectional structures of the transistors used for the calculation. The transistors illustrated in FIGS. 25A and 25B each include a semiconductor region 703a and a semiconductor region 703c which have n$^+$-type conductivity in an oxide semiconductor layer. The resistivities of the semiconductor region 703a and the semiconductor region 703c are $2\times10^{-3}$ Ωcm.

The transistor illustrated in FIG. 25A is formed over a base insulating layer 701 and an embedded insulator 702 which is embedded in the base insulating layer 701 and formed of aluminum oxide. The transistor includes the semiconductor region 703a, the semiconductor region 703c, an intrinsic semiconductor region 703b serving as a channel formation region interposed therebetween and a gate electrode 705. The width of the gate electrode 705 is 33 nm.

A gate insulating layer 704 is formed between the gate electrode 705 and the semiconductor region 703b. In addition, a sidewall insulator 706a and a sidewall insulator 706b are formed on both side surfaces of the gate electrode 705, and an insulator 707 is formed over the gate electrode 705 so as to prevent a short circuit between the gate electrode 705 and another wiring. The sidewall insulator has a width of 5 nm. In addition, a source electrode 708a and a drain electrode 708b are provided in contact with the semiconductor region 703a and the semiconductor region 703c. Note that the channel width of this transistor illustrated in FIG. 25A is 40 nm.

The transistor in FIG. 25B is the same as the transistor in FIG. 25A in that it is formed over the base insulating layer 701 and the embedded insulator 702 formed of aluminum oxide and that it includes the semiconductor region 703a, the semiconductor region 703c, the intrinsic semiconductor region 703b provided therebetween, the gate electrode 705 having a width of 33 nm, the gate insulating layer 704, the sidewall insulator 706a, the sidewall insulator 706b, the insulator 707, the source electrode 708a, and the drain electrode 708b.

The transistor illustrated in FIG. 25A is different from the transistor illustrated in FIG. 25B in the conductivity type of semiconductor regions under the sidewall insulator 706a and the sidewall insulator 706b. In the transistor in FIG. 25A, the semiconductor regions under the sidewall insulator 706a and the sidewall insulator 706b are part of the semiconductor region 703a having n$^+$-type conductivity and part of the semiconductor region 703c having n$^+$-type conductivity, whereas in the transistor in FIG. 25B, the semiconductor regions under the sidewall insulator 706a and the sidewall insulator 706b are part of the intrinsic semiconductor region 703b. In other words, in the semiconductor layer of FIG. 25B, a region having a width of $L_{off}$ which overlaps with neither the semiconductor region 703a (the semiconductor region 703c) nor the gate electrode 705 is provided. This region is called an offset region, and the width $L_{off}$ is called an offset length. As is seen from the drawing, the offset length is equal to the width of the sidewall insulator 706a (the sidewall insulator 706b).

Figure 22A:
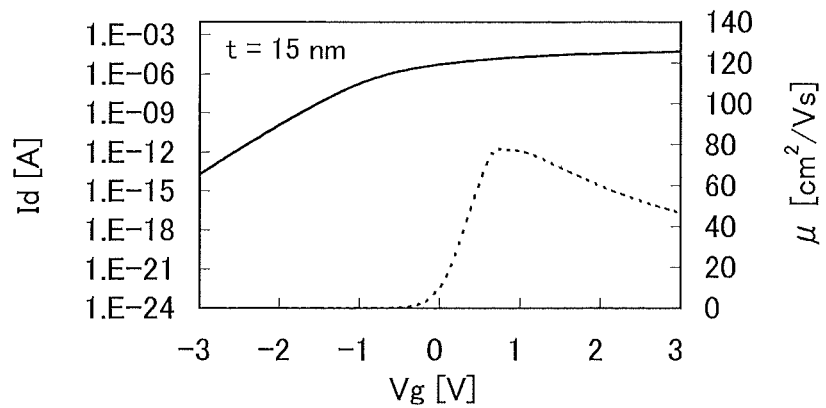
FIGS. 22A to 22C each show gate voltage dependence of drain current and mobility, obtained by calculation.
Figure 22B:
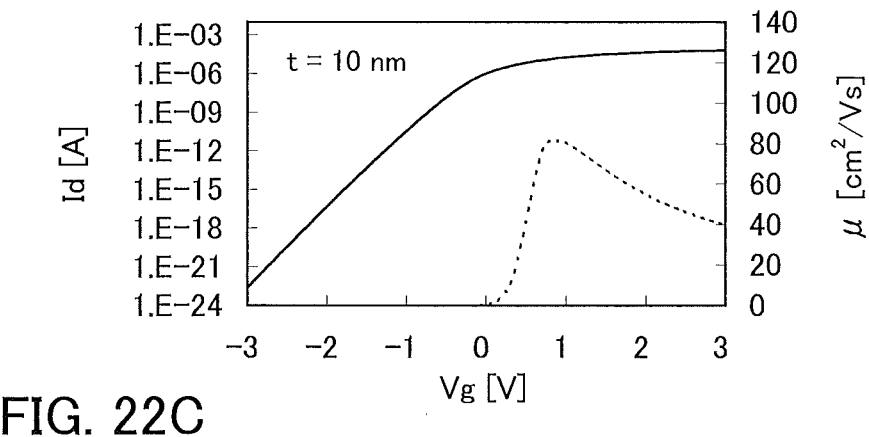
Figure 22C:
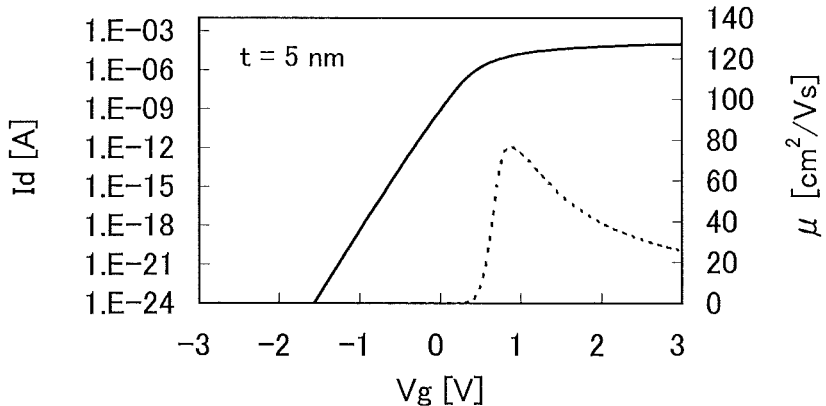

The other parameters used in calculation are as described above. For the calculation, device simulation software Sentaurus Device manufactured by Synopsys, Inc. was used. FIGS. 22A to 22C show the gate voltage ($V_g$: a potential difference between the gate and the source) dependence of the drain current ($I_d$, a solid line) and the mobility (μ, a dotted line) of the transistor having the structure illustrated in FIG. 25A. The drain current $I_d$ is obtained by calculation under the assumption that the drain voltage is +1 V and the mobility μ is obtained by calculation under the assumption that the drain voltage is +0.1 V.

FIG. 22A shows the gate voltage dependence of the transistor in the case where the thickness of the gate insulating layer is 15 nm, FIG. 22B shows that of the transistor in the case where the thickness of the gate insulating layer is 10 nm, and FIG. 22C shows that of the transistor in the case where the thickness of the gate insulating layer is 5 nm. As the gate insulating layer is thinner, the drain current $I_d$ (off-state current) particularly in an off state is significantly decreased. In contrast, there is no noticeable change in the peak value of the mobility μ and the drain current $I_d$ (on-state current) in an on state. The graphs show that the drain current exceeds 10 μA at a gate voltage of around 1 V.

Figure 23A:
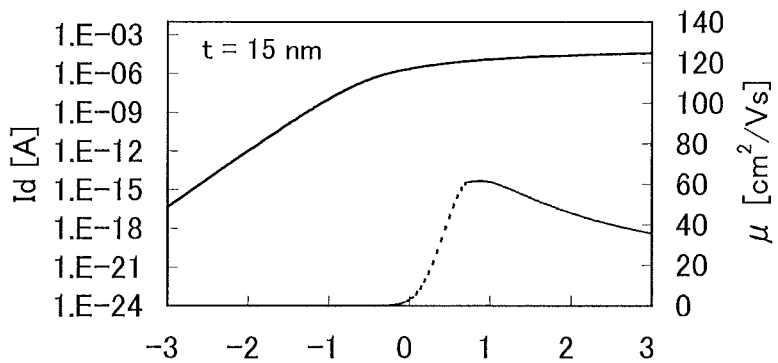
FIGS. 23A to 23C each show gate voltage dependence of drain current and mobility, obtained by calculation.
Figure 23B:
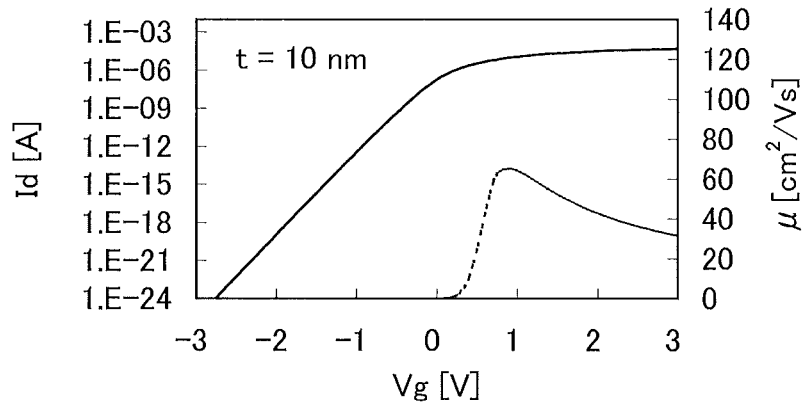
Figure 23C:
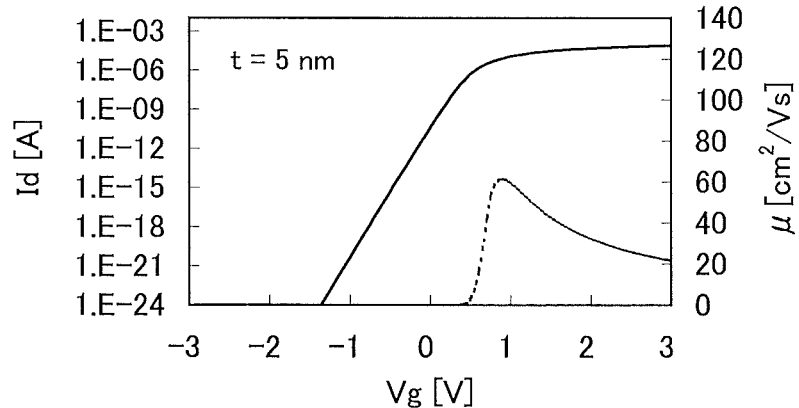

FIGS. 23A to 23C show the gate voltage $V_g$ dependence of the drain current $I_d$ (a solid line) and the mobility μ (a dotted line) of the transistor having the structure in FIG. 25B and an offset length $L_{off}$ of 5 nm. The drain current $I_d$ is calculated under the assumption that the drain voltage is +1 V and the mobility μ is calculated under the assumption that the drain voltage is +0.1 V. FIG. 23A shows the gate voltage dependence of the transistor in the case where the thickness of the gate insulating layer is 15 nm, FIG. 23B shows that of the transistor in the case where the thickness of the gate insulating layer is 10 nm, and FIG. 23C shows that of the transistor in the case where the thickness of the gate insulating layer is 5 nm.

Figure 24A:
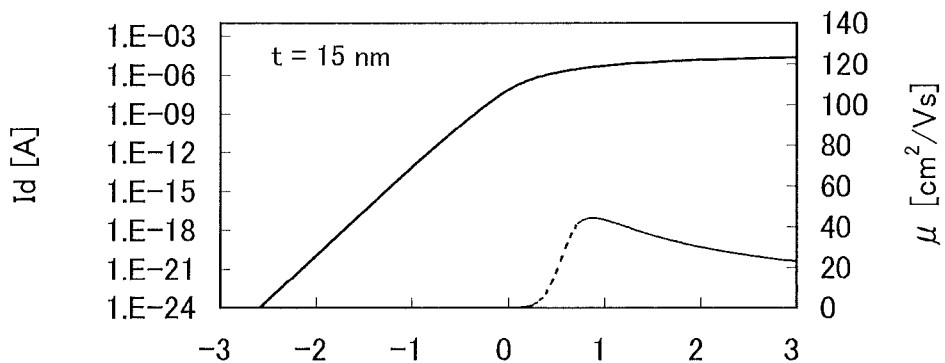
FIGS. 24A to 24C each show gate voltage dependence of drain current and mobility, obtained by calculation.
Figure 24B:
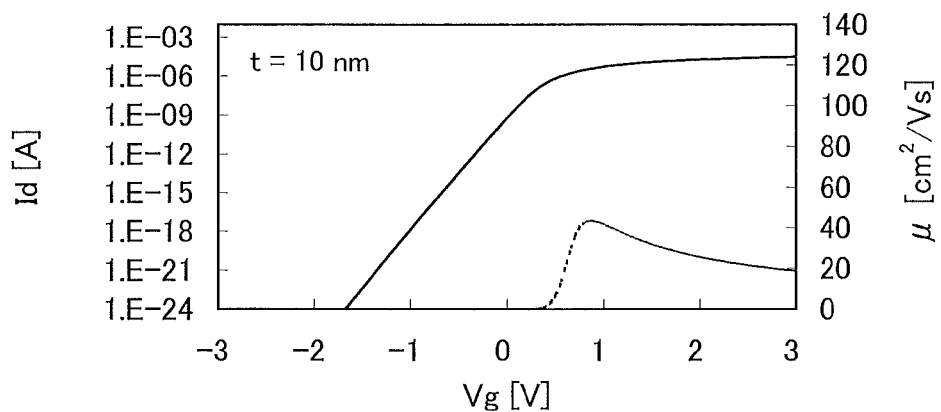
Figure 24C:
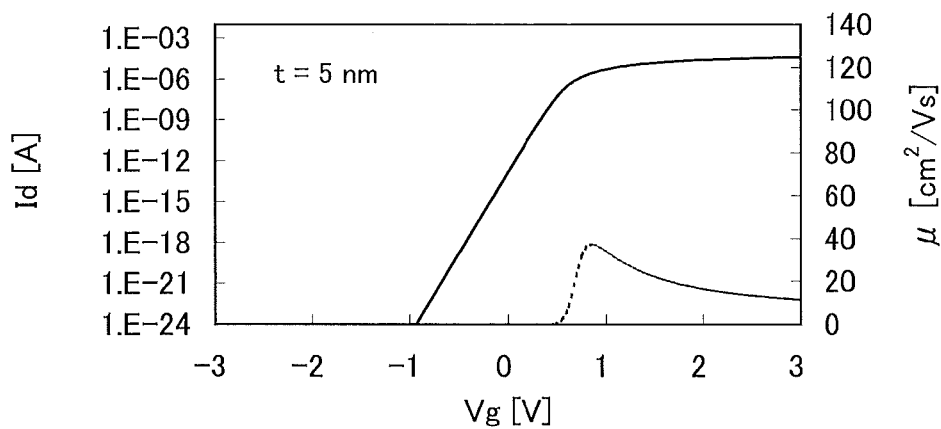
Figure 25A:
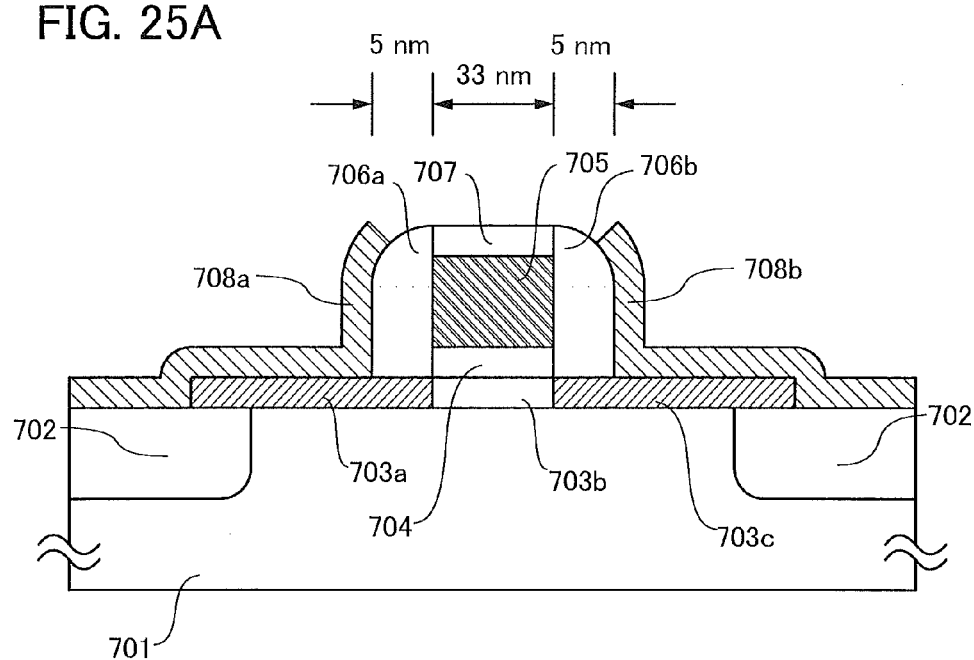
FIGS. 25A and 25B each illustrate a cross-sectional structure of a transistor used in calculation.
Figure 25B:
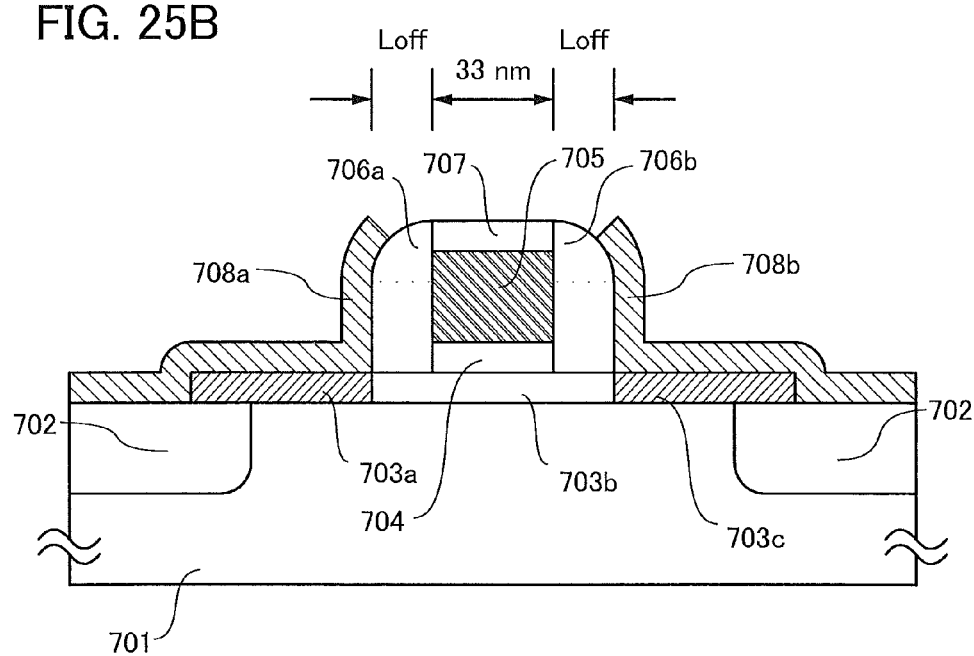

Further, FIGS. 24A to 24C show the gate voltage dependence of the drain current $I_d$ (a solid line) and the mobility μ (a dotted line) of the transistor having the structure illustrated in FIG. 25B where the offset length $L_{off}$ is 15 nm. The drain current $I_d$ is calculated under the assumption that the drain voltage is +1 V and the mobility μ is calculated under the assumption that the drain voltage is +0.1 V. FIG. 24A shows the gate voltage dependence of the transistor in the case where the thickness of the gate insulating layer is 15 nm, FIG. 24B shows that of the transistor in the case where the thickness of the gate insulating layer is 10 nm, and FIG. 24C shows that of the transistor in the case where the thickness of the gate insulating layer is 5 nm.

In either of the structures, as the gate insulating layer is thinner, the off-state current is significantly decreased, whereas no noticeable change arises in the peak value of the mobility μ and the on-state current.

Note that the peak of the mobility μ is approximately 80 cm²/Vs in FIGS. 22A to 22C, approximately 60 cm²/Vs in FIGS. 23A to 23C, and approximately 40 cm²/Vs in FIGS. 24A to 24C; thus, the peak of the mobility μ is decreased as the offset length $L_{off}$ is increased. Further, the off-state current tends to decrease similarly. The on-state current is also decreased as the offset length $L_{off}$ is increased; however, the decrease in the on-state current is much more gradual than the decrease in the off-state current. Further, the graphs show that in either of the structures, the drain current exceeds 10 μA at a gate voltage of around 1 V.

Further, a transistor in which an oxide semiconductor including In, Sn, and Zn as main components is used as a channel formation region can have favorable characteristics by depositing the oxide semiconductor while heating a substrate or by performing heat treatment after an oxide semiconductor layer is formed. Note that a main component refers to an element included in a composition at 5 atomic % or more.

By intentionally heating the substrate after formation of the oxide semiconductor layer including In, Sn, and Zn as main components, the field-effect mobility of the transistor can be improved. Further, the threshold voltage of the transistor can be positively shifted to make the transistor normally off.

Figure 28A:
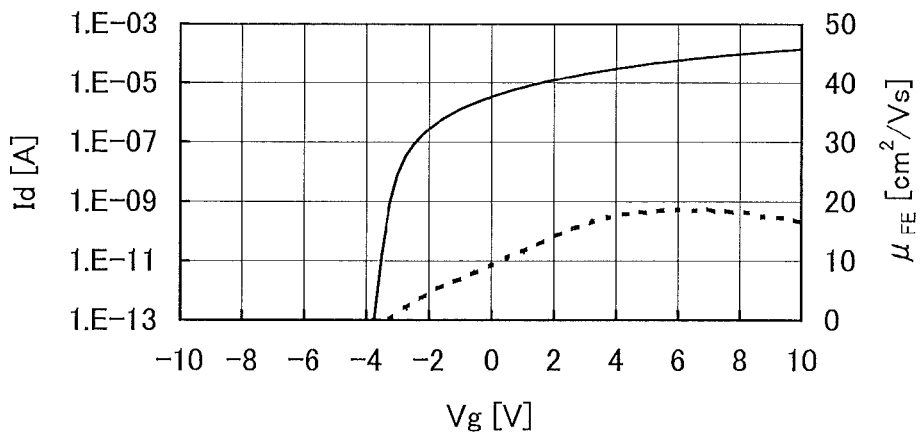
FIGS. 28A to 28C are graphs showing Vg-Id characteristics and field effect mobility of transistors as Samples 3 and 4.
Figure 28B:
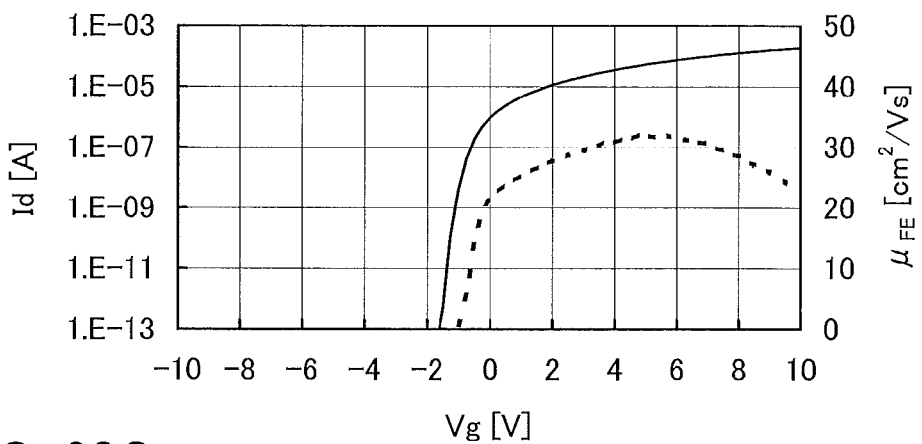
Figure 28C:
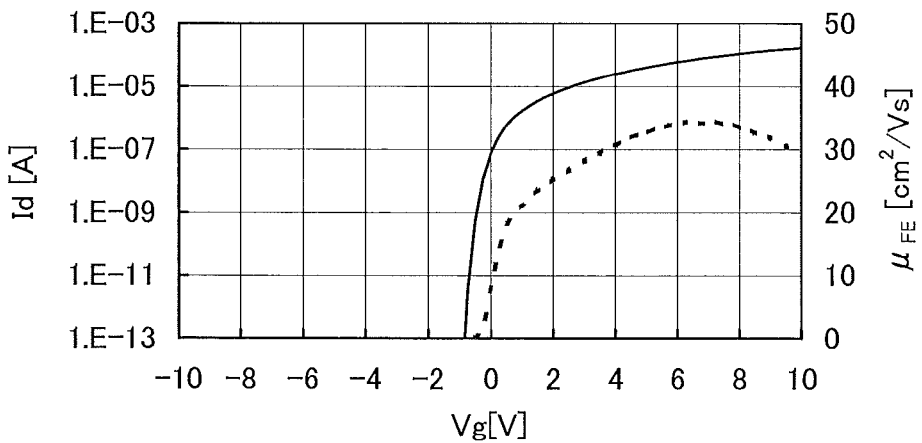

As an example, FIGS. 28A to 28C each show characteristics of a transistor in which an oxide semiconductor layer including In, Sn, and Zn as main components and having a channel length L of 3 μm and a channel width W of 10 μm, and a gate insulating layer with a thickness of 100 nm are used. Note that $V_d$ is 10 V.

FIG. 28A shows characteristics of a transistor whose oxide semiconductor layer including In, Sn, and Zn as main components was formed by a sputtering method without heating a substrate intentionally. The field-effect mobility of the transistor is 18.8 cm²/Vsec. On the other hand, when the oxide semiconductor layer including In, Sn, and Zn as main components is formed while heating the substrate intentionally, the field-effect mobility can be improved. FIG. 28B shows characteristics of a transistor whose oxide semiconductor film including In, Sn, and Zn as main components is formed while heating a substrate at 200° C. The field-effect mobility of the transistor is 32.2 cm²/Vsec.

The field-effect mobility can be further improved by performing heat treatment after formation of the oxide semiconductor layer including In, Sn, and Zn as main components. FIG. 28C shows characteristics of a transistor whose oxide semiconductor layer including In, Sn, and Zn as main components is formed by sputtering at 200° C. and then subjected to heat treatment at 650° C. The field-effect mobility of the transistor is 34.5 cm²/Vsec.

The intentional heating of the substrate can reduce the probability that moisture will be taken into the oxide semiconductor layer during the formation by sputtering. Further, the heat treatment after film formation enables hydrogen, a hydroxyl group, or moisture to be released and removed from the oxide semiconductor layer. In this manner, the field-effect mobility can be improved. Such an improvement in field-effect mobility is presumed to be achieved not only by removal of impurities by dehydration or dehydrogenation but also by a reduction in interatomic distance due to an increase in density. The oxide semiconductor can be crystallized by being purified by removal of impurities from the oxide semiconductor. In the case of using such a purified non-single crystal oxide semiconductor, ideally, a field-effect mobility exceeding 100 cm²/Vsec is expected to be realized.

The oxide semiconductor including In, Sn, and Zn as main components may be crystallized in the following manner oxygen ions are implanted into the oxide semiconductor, hydrogen, a hydroxyl group, or moisture included in the oxide semiconductor is released by heat treatment, and the oxide semiconductor is crystallized through the heat treatment or by another heat treatment performed later. By such crystallization treatment or recrystallization treatment, a non-single crystal oxide semiconductor having favorable crystallinity can be obtained.

The intentional heating of the substrate during film formation and/or the heat treatment after the film formation contributes not only to improving field-effect mobility but also to making the transistor normally off. In a transistor in which an oxide semiconductor layer that includes In, Sn, and Zn as main components and is formed without heating a substrate intentionally is used as a channel formation region, the threshold voltage tends to be shifted negatively. However, when the oxide semiconductor layer formed while heating the substrate intentionally is used, the negative shift of the threshold voltage can be settled. That is, the threshold voltage is shifted so that the transistor becomes normally off; this tendency can be confirmed by comparison between FIGS. 28A and 28B.

Note that the threshold voltage can also be controlled by changing the ratio of In, Sn, and Zn; when the composition ratio of In, Sn, and Zn is 2:1:3, a normally-off transistor is easily formed. In addition, an oxide semiconductor layer having high crystallinity can be obtained by setting the composition ratio of a target as follows: In:Sn:Zn=2:1:3.

The temperature of the intentional heating of the substrate or the temperature of the heat treatment is 150° C. or higher, preferably 200° C. or higher, further preferably 400° C. or higher. When film formation or heat treatment is performed at a high temperature, the transistor can be normally off.

By intentionally heating the substrate during film formation and/or by performing heat treatment after the film formation, the stability against a gate-bias stress can be increased. For example, when a gate bias is applied with an intensity of 2 MV/cm at 150° C. for one hour, drift of the threshold voltage can be less than ±1.5 V, preferably less than ±1.0 V.

A BT test was performed on the following two transistors: Sample 1 on which heat treatment was not performed after formation of an oxide semiconductor layer, and Sample 2 on which heat treatment at 650° C. was performed after formation of an oxide semiconductor layer.

First, $V_g$-$I_d$ characteristics of the transistors were measured at a substrate temperature of 25° C. and $V_d$ of 10 V. Then, the substrate temperature is 150° C. and $V_d$ (voltage between a drain and a source) was 0.1 V. After that, 20 V of $V_g$ (voltage between a gate and a source) was applied so that the intensity of an electric field applied to the gate insulating layer 608 was 2 MV/cm, and the condition was kept for one hour. $V_g$ was 0 V. Then, $V_g$-$I_d$ characteristics of the transistor were measured at a substrate temperature of 25° C. and $V_d$ of 10 V. This process is called a positive BT test.

In a similar manner, first, $V_g$-$I_d$ characteristics of the transistors were measured at a substrate temperature of 25° C. and $V_d$ of 10 V. Then, the substrate temperature was set at 150° C. and $V_d$ was set to 0.1 V. After that, $V_g$ of −20 V was applied so that the intensity of an electric field applied to the gate insulating layer 608 was −2 MV/cm, and the condition was kept for one hour Next, $V_g$ was set to 0 V. Then, $V_g$-$I_d$ characteristics of the transistors were measured at a substrate temperature of 25° C. and $V_d$ of 10 V. This process is called a negative BT test.

Figure 29A:
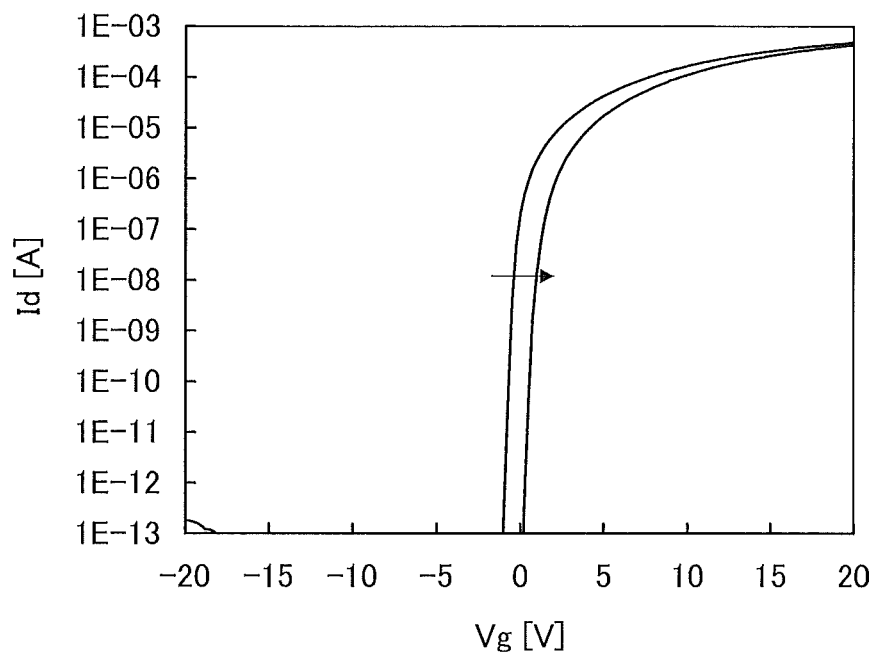
FIGS. 29A and 29B are graphs showing Vg-Id characteristics and field effect mobility before and after a BT test of a transistor as Sample 1.
Figure 29B:
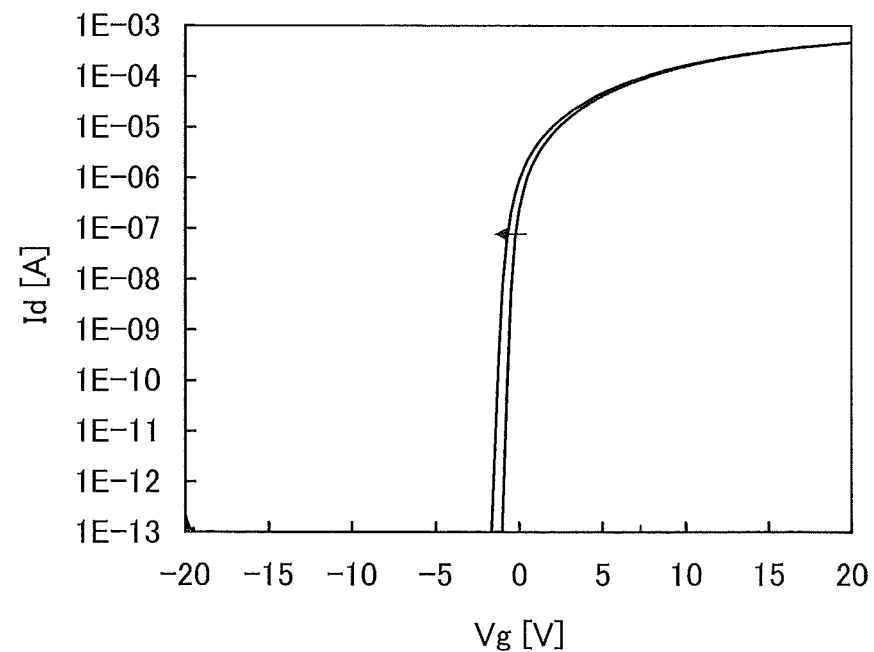
Figure 30A:
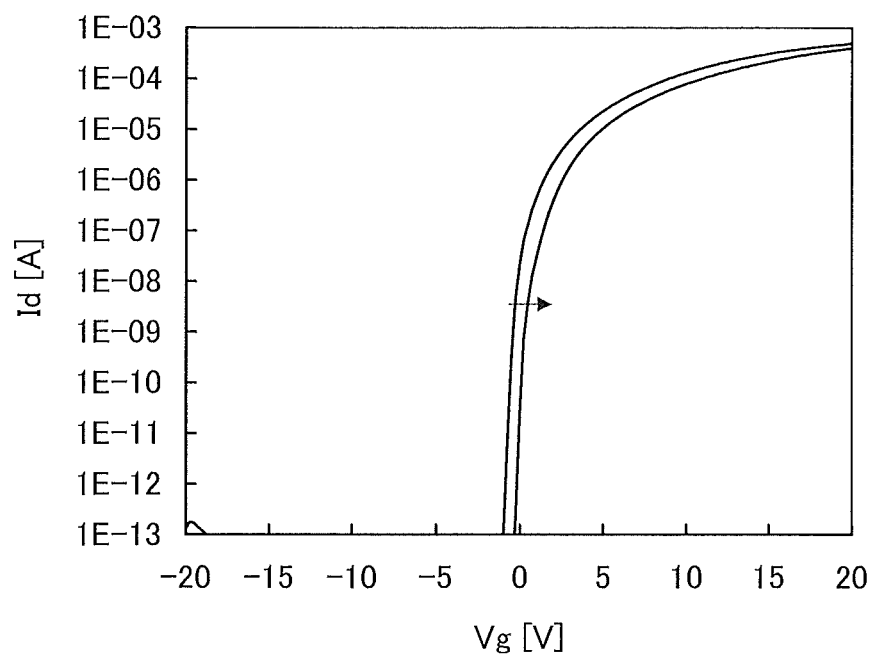
FIGS. 30A and 30B are graphs showing Vg-Id characteristics and field effect mobility before and after a BT test of a transistor as Sample 4.
Figure 30B:
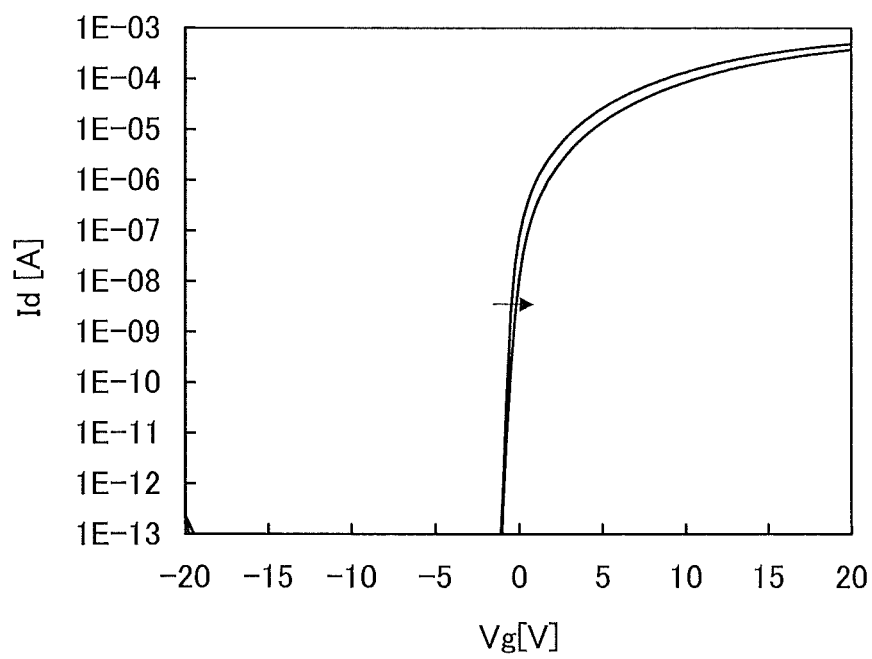

FIGS. 29A and 29B show results of the positive BT test and the negative BT test, respectively, of Sample 1. FIGS. 30A and 30B show results of the positive BT test and the negative BT test, respectively, of Sample 2.

The amount of shift in the threshold voltage of Sample 1 due to the positive BT test and that due to the negative BT test were 1.80 V and −0.42 V, respectively. The amount of shift in the threshold voltage of Sample 2 due to the positive BT test and that due to the negative BT test were 0.79 V and 0.76 V, respectively. It is found that, in each of Sample 1 and Sample 2, the amount of shift in the threshold voltage between before and after the BT tests is small and the reliability is high.

The heat treatment can be performed in an oxygen atmosphere; alternatively, the heat treatment may be performed first in an atmosphere of nitrogen or an inert gas or under reduced pressure, and then in an atmosphere including oxygen. Oxygen is supplied to the oxide semiconductor after dehydration or dehydrogenation, whereby the effect of the heat treatment can be further increased. As a method for supplying oxygen after dehydration or dehydrogenation, a method in which oxygen ions are accelerated by an electric field and implanted into the oxide semiconductor layer may be employed.

A defect due to oxygen deficiency is easily caused in the oxide semiconductor or at an interface between the oxide semiconductor and a film stacked over the oxide semiconductor; however, when excess oxygen is included in the oxide semiconductor by the heat treatment, oxygen deficiency caused constantly can be compensated for with excess oxygen. The excess oxygen is mainly oxygen existing between lattices. When the concentration of oxygen is set in the range of $1\times10^{16}$/cm$^3$ to $2\times10^{20}$/cm$^3$, excess oxygen can be included in the oxide semiconductor without causing crystal distortion or the like.

When heat treatment is performed so that at least part of the oxide semiconductor includes crystal, a more stable oxide semiconductor layer can be obtained. For example, when an oxide semiconductor layer which is formed by sputtering using a target having a composition ratio of In:Sn:Zn=1:1:1 without heating a substrate intentionally is analyzed by X-ray diffraction (XRD), a halo pattern is observed. The formed oxide semiconductor layer can be crystallized by being subjected to heat treatment. The temperature of the heat treatment can be set as appropriate; when the heat treatment is performed at 650° C., for example, a clear diffreaction peak can be observed in an X-ray diffraction analysis.

Actually, an XRD analysis of an In—Sn—Zn—O film was conducted. The XRD analysis was conducted using an X-ray diffractometer D8 ADVANCE manufactured by Bruker AXS, and measurement was performed by an out-of-plane method.

Sample A and Sample B were prepared and the XRD analysis was performed thereon. A method for manufacturing Sample A and Sample B will be described below.

First, an In—Sn—Zn—O film with a thickness of 100 nm was formed over a quartz substrate that had been subjected to dehydrogenation treatment.

The In—Sn—Zn—O film was formed with a sputtering apparatus with a power of 100 W (DC) in an oxygen atmosphere. An In—Sn—Zn—O target having an atomic ratio of In:Sn:Zn=1:1:1 was used as a target. Note that the substrate heating temperature in film formation was set at 200° C. A sample manufactured in this manner was used as Sample A.

Next, a sample manufactured by a method similar to that of Sample A was subjected to heat treatment at 650° C. As the heat treatment, heat treatment in a nitrogen atmosphere was first performed for one hour and heat treatment in an oxygen atmosphere was further performed for one hour without lowering the temperature. A sample manufactured in this manner was used as Sample B.

Figure 33:
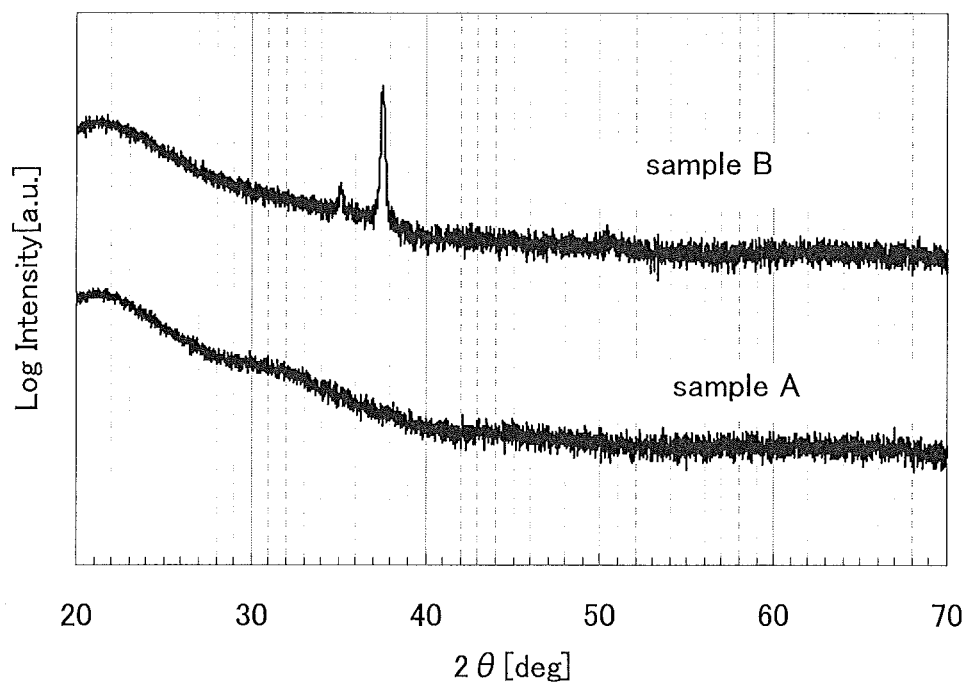
FIG. 33 is a graph showing XRD spectrum of an In—Sn—Zn—O film.

FIG. 33 shows XRD spectra of Sample A and Sample B. No peak derived from crystal was observed in Sample A, whereas peaks derived from crystal were observed when 2θ was around 35 deg. and at 37 deg. to 38 deg. in Sample B.

As described above, by intentionally heating a substrate during deposition of an oxide semiconductor including In, Sn, and Zn as main components and/or by performing heat treatment after the deposition, characteristics of a transistor can be improved.

These substrate heating and heat treatment have an effect of preventing hydrogen and a hydroxyl group, which are unfavorable impurities for an oxide semiconductor, from being included in the film or an effect of removing hydrogen and a hydroxyl group from the film. That is, an oxide semiconductor can be purified by removing hydrogen serving as a donor impurity from the oxide semiconductor, whereby a normally-off transistor can be obtained. The purification of an oxide semiconductor enables the off-state current of the transistor to be 1 aA/μm or lower. Here, the unit of the off-state current represents current per micrometer of a channel width.

Figure 34:
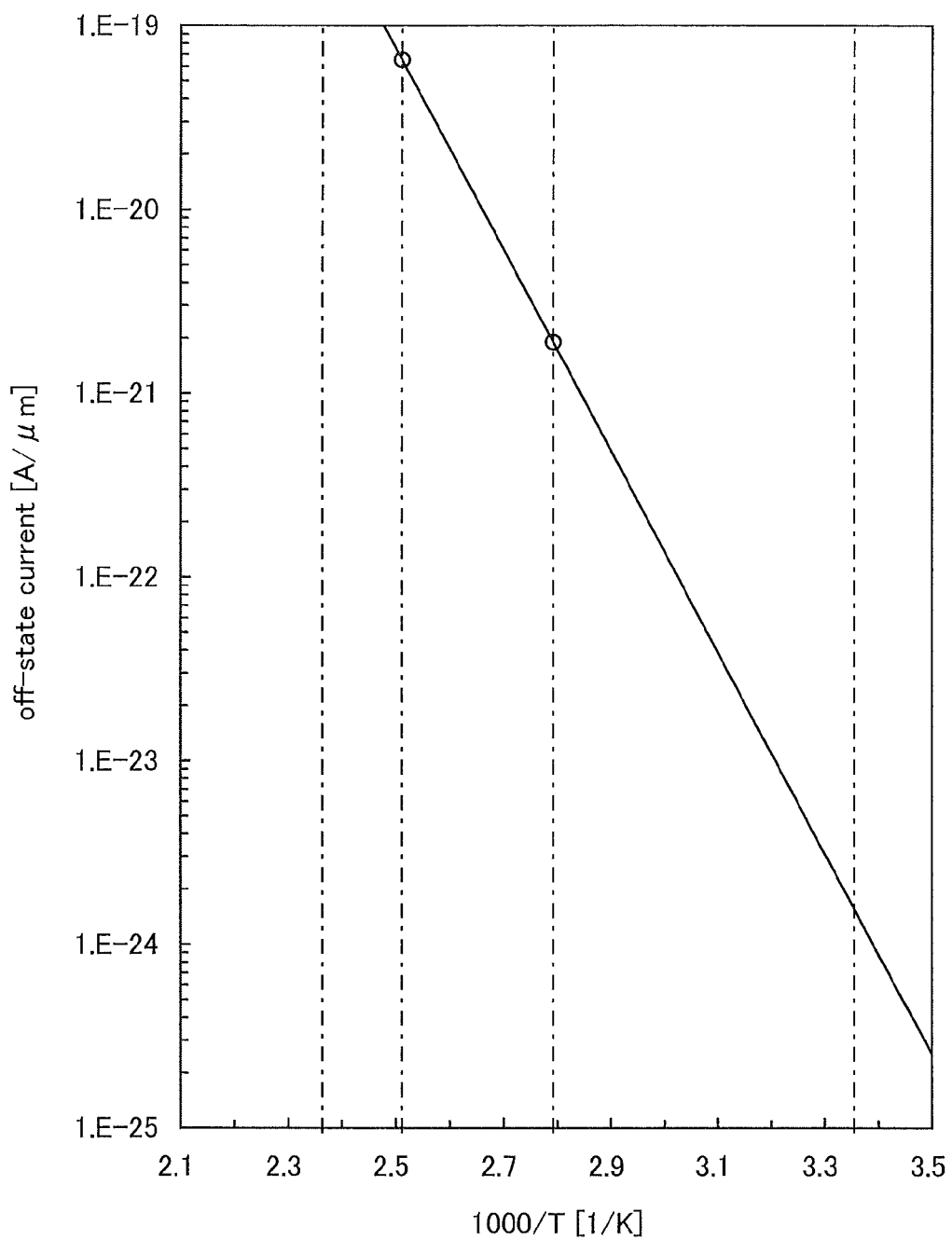
FIG. 34 is a graph showing off-state current of a transistor using the In In—Sn—Zn—O film.

Specifically, as shown in FIG. 34, the off-state current can be 1 aA/μm ($1\times10^{-18}$ A/μm) or lower, 100 zA/μm ($1\times10^{-19}$ A/μm) or lower, and 1 zA/μm ($1\times10^{-21}$ A/μm) or lower when the substrate temperature is 125° C., 85° C., and room temperature (27° C.), respectively. Preferably, the off-state current can be 100 zA/μm ($1\times10^{-19}$ A/μm) or lower, 10 zA/μm ($1\times10^{-20}$ A/μm) or lower, and 0.1 zA/μm ($1\times10^{-22}$ A/μm) or lower at 125° C., 85° C., and room temperature, respectively.

Note that in order to prevent hydrogen and moisture from being included in the oxide semiconductor layer during formation thereof, it is preferable to increase the purity of a sputtering gas by sufficiently suppressing leakage from the outside of a deposition chamber and degasification through an inner wall of the deposition chamber. For example, a gas with a dew point of −70° C. or lower is preferably used as the sputtering gas in order to prevent moisture from being included in the film. In addition, it is preferable to use a target which is purified so as not to include impurities such as hydrogen and moisture. Although it is possible to remove moisture from a film of an oxide semiconductor including In, Sn, and Zn as main components by heat treatment, a film which does not include moisture originally is preferably formed because moisture is released from the oxide semiconductor including In, Sn, and Zn as main components at a higher temperature than from an oxide semiconductor including In, Ga, and Zn as main components.

The relationship between the substrate temperature and electric characteristics of a transistor formed using Sample B, on which heat treatment at 650° C. was performed after formation of the oxide semiconductor layer, was evaluated.

The transistor used for the measurement has a channel length L of 3 μm, a channel width W of 10 μm, Lov on one side of 3 μm (the total is 6 μm), and dW of 0 μm. Note that $V_d$ was 10 V. Note that the substrate temperature was −40° C., −25° C., 25° C., 75° C., 125° C., and 150° C. Here, in a transistor, the width of a portion where a gate electrode overlaps with one of a pair of electrodes is referred to as Lov, and the width of a portion of the pair of electrodes, which does not overlap with an oxide semiconductor layer, is referred to as dW.

Figure 31:
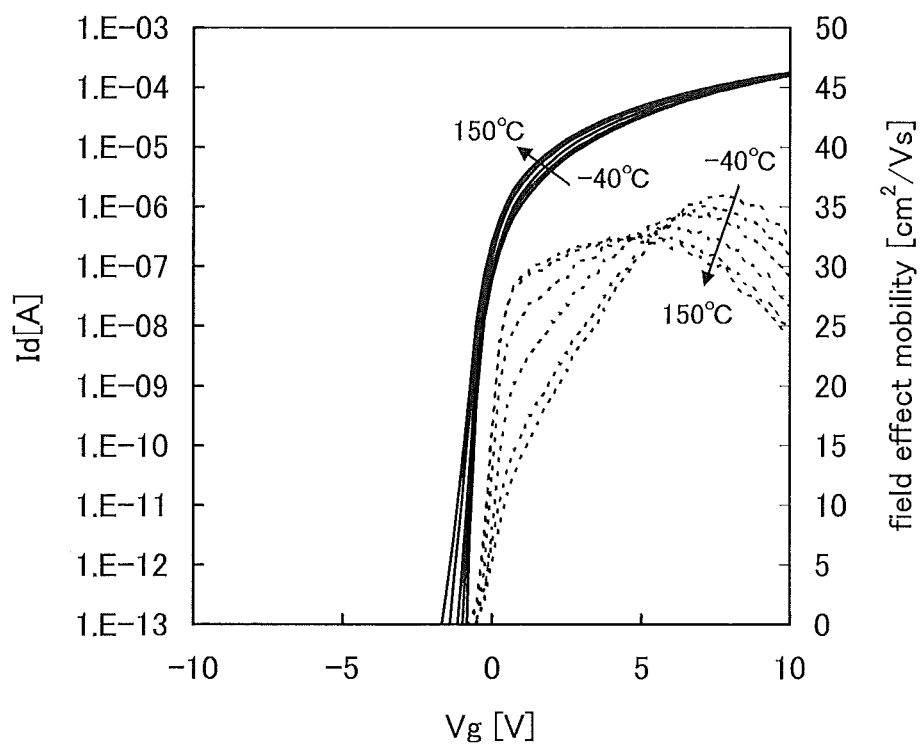
FIG. 31 is a graph showing Vg-Id characteristics and field effect mobility at measurement temperatures of a transistor as Sample 4.
Figure 32A:
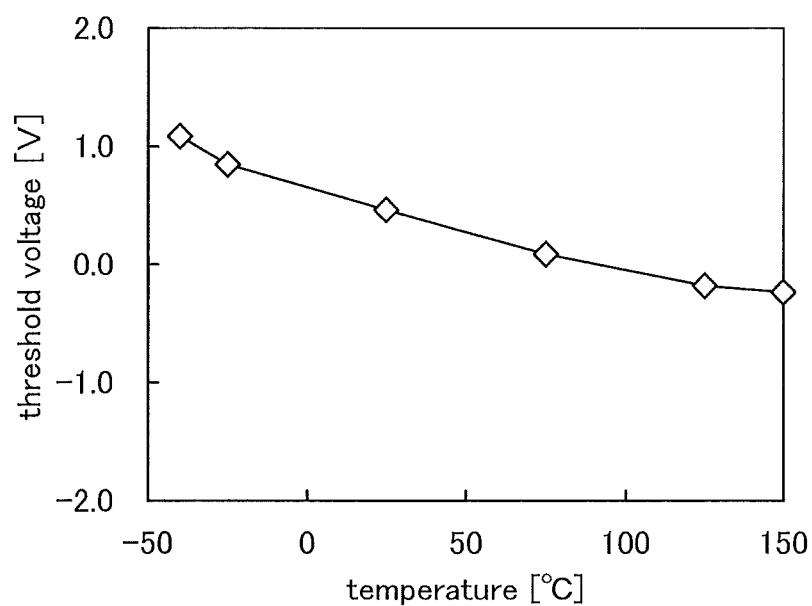
FIGS. 32A and 32B are graphs showing temperature dependencies of a threshold voltage and field effect mobility, respectively, of the transistor as Sample 4.

FIG. 31 shows the $V_g$ dependence of $I_d$ (a solid line) and field-effect mobility (a dotted line). FIG. 32A shows a relationship between the substrate temperature and the threshold voltage, and FIG. 32B shows a relationship between the substrate temperature and the field-effect mobility.

From FIG. 32A, it is found that the threshold voltage gets lower as the substrate temperature increases. Note that the threshold voltage is decreased from 0.38 V to −1.08 V in the range from −40° C. to 150° C.

Figure 32B:
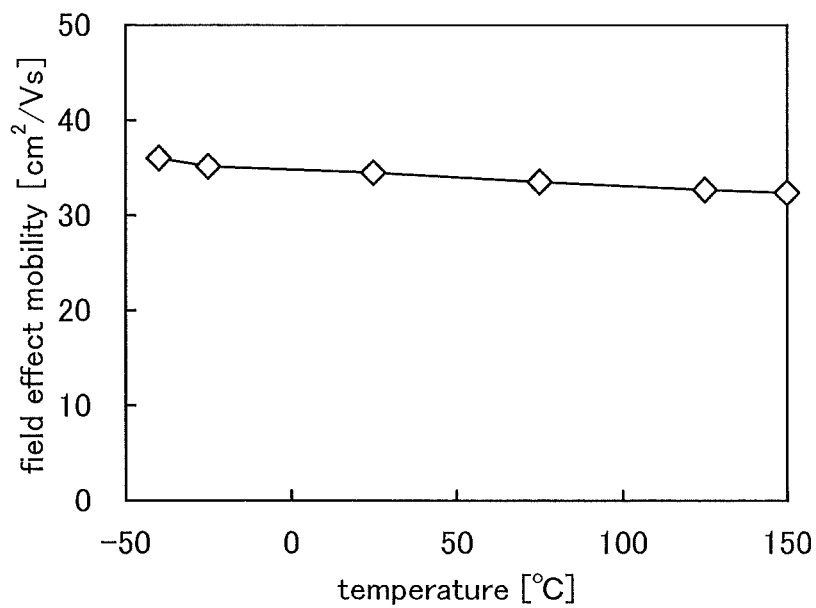

From FIG. 32B, it is found that the field-effect mobility gets lower as the substrate temperature increases. Note that the field-effect mobility is decreased from 37.4 cm$^2$/Vs to 33.4 cm$^2$/Vs in the range from −40° C. to 150° C. Thus, it is found that variation in electric characteristics is small in the above temperature range.

In a transistor in which such an oxide semiconductor including In, Sn, and Zn as main components is used as a channel formation region, a field-effect mobility of 30 cm$^2$/Vsec or higher, preferably 40 cm$^2$/Vsec or higher, further preferably 60 cm$^2$/Vsec or higher can be obtained with the off-state current maintained at 1 aA/μm or lower, which can achieve on-state current needed for an LSI. For example, in an FET where L/W is 33 nm/40 nm, an on-state current of 12 μA or higher can flow when the gate voltage is 2.7 V and the drain voltage is 1.0 V. In addition, sufficient electric characteristics can be ensured in a temperature range needed for operation of a transistor. With such characteristics, an integrated circuit having a novel function can be realized without decreasing the operation speed even when a transistor including an oxide semiconductor is also provided in an integrated circuit formed using a Si semiconductor.

Next, an example of a transistor in which an In—Sn—Zn—O film is used as an oxide semiconductor layer will be described with reference to FIGS. 26A and 26B and the like.

Figure 26A:
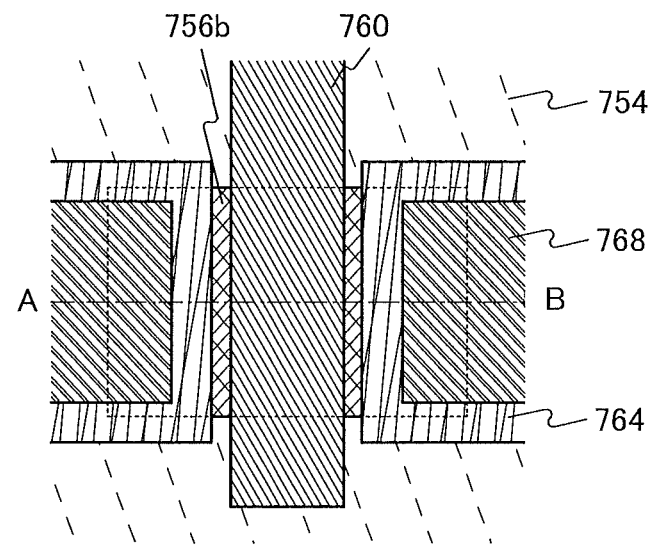
FIGS. 26A and 26B are a top view and a cross-sectional view of a transistor according to one embodiment of the present invention.
Figure 26B:
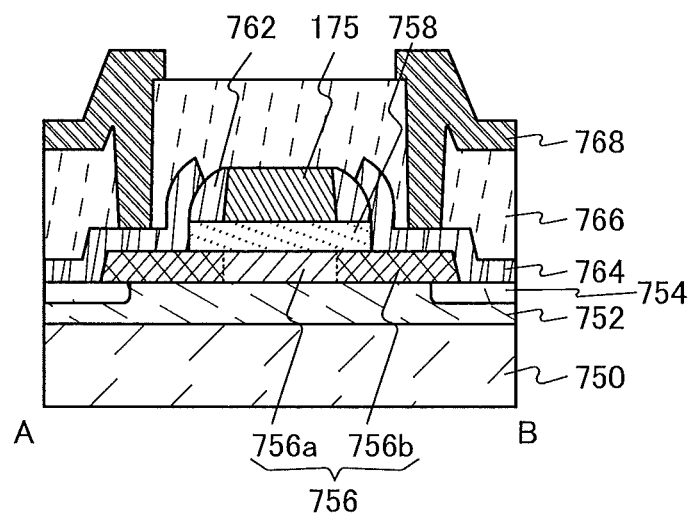

FIGS. 26A and 26B are a top view and a cross-sectional view of a coplanar transistor having a top-gate top-contact structure. FIG. 26A is the top view of the transistor. FIG. 26B illustrates cross section A-B along the dashed-dotted line A-B in FIG. 26A.

The transistor illustrated in FIG. 26B includes a substrate 750; a base insulating layer 752 provided over the substrate 750; a protective insulating layer 754 provided in the periphery of the base insulating layer 752; an oxide semiconductor layer 756 that is provided over the base insulating layer 752 and the protective insulating layer 754 and includes a high-resistance region 756a and low-resistance regions 756b; a gate insulating layer 758 provided over the oxide semiconductor layer 756; a gate electrode 760 provided to overlap with the oxide semiconductor layer 756 with the gate insulating layer 758 positioned therebetween; a sidewall insulator 762 provided in contact with a side surface of the gate electrode 760; a pair of electrodes 764 provided in contact with at least the low-resistance regions 756b; an interlayer insulating layer 766 provided to cover at least the oxide semiconductor layer 756, the gate electrode 760, and the pair of electrodes 764; and a wiring 768 provided to be connected to at least one of the pair of electrodes 764 through an opening formed in the interlayer insulating layer 766.

Although not illustrated, a protective film may be provided to cover the interlayer insulating layer 766 and the wiring 768. With the protective film, a minute amount of leakage current generated by surface conduction of the interlayer insulating layer 766 can be reduced, so that the off-state current of the transistor can be reduced.

Next, another example of a transistor in which an In—Sn—Zn—O film is used as an oxide semiconductor layer will be described.

Figure 27A:
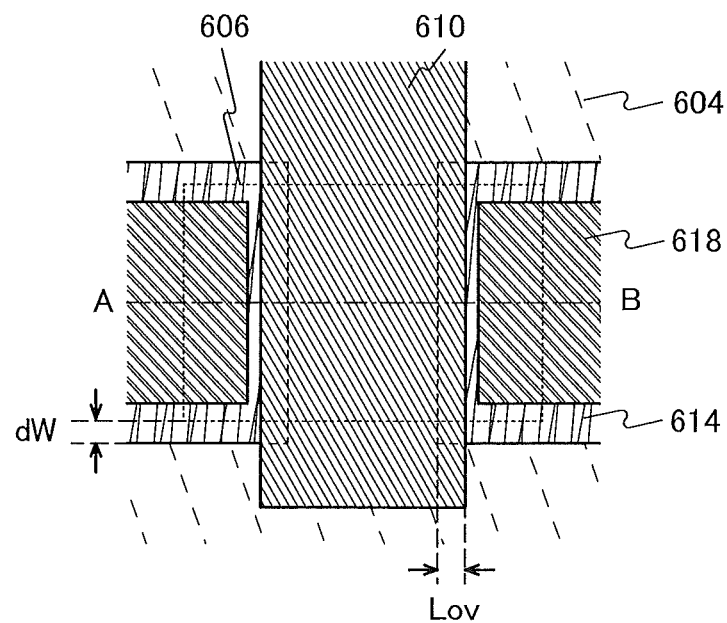
FIGS. 27A and 27B are a top view and a cross-sectional view of transistors as Sample 1 to Sample 6.
Figure 27B:
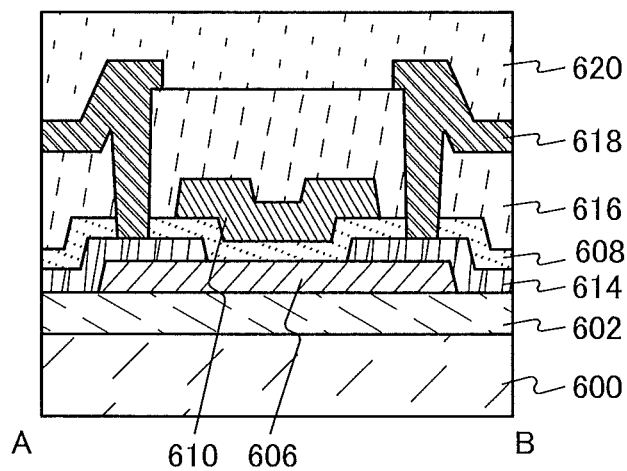

FIGS. 27A and 27B are a top view and a cross-sectional view illustrating a structure of a transistor in this embodiment. FIG. 27A is the top view of the transistor. FIG. 27B is a cross-sectional view along the dashed-dotted line A-B in FIG. 27A.

The transistor illustrated in FIG. 27B includes a substrate 600; a base insulating layer 602 provided over the substrate 600; an oxide semiconductor layer 606 provided over the base insulating layer 602; a pair of electrodes 614 in contact with the oxide semiconductor layer 606; a gate insulating layer 608 provided over the oxide semiconductor layer 606 and the pair of electrodes 614; a gate electrode 610 provided to overlap with the oxide semiconductor layer 606 with the gate insulating layer 608 positioned therebetween; an interlayer insulating layer 616 provided to cover the gate insulating layer 608 and the gate electrode 610; wirings 618 connected to the pair of electrodes 614 through openings formed in the interlayer insulating layer 616; and a protective film 620 provided to cover the interlayer insulating layer 616 and the wirings 618.

As the substrate 600, a glass substrate was used. As the base insulating layer 602, a silicon oxide film was used. As the oxide semiconductor layer 606, an In—Sn—Zn—O film was used. As the pair of electrodes 614, a tungsten film was used. As the gate insulating layer 608, a silicon oxide film was used. The gate electrode 610 had a stacked structure of a tantalum nitride film and a tungsten film. The interlayer insulating layer 616 had a stacked structure of a silicon oxynitride film and a polyimide film. The wirings 618 had a stacked structure in which a titanium film, an aluminum film, and a titanium film were formed in this order. As the protective film 620, a polyimide film was used.

Note that in the transistor having the structure illustrated in FIG. 27A, the width of a portion where the gate electrode 610 overlaps with one of the pair of electrodes 614 is referred to as Lov. Similarly, the width of a portion of the pair of electrodes 614, which does not overlap with the oxide semiconductor layer 606, is referred to as dW.

As an example of a method for forming the transistor in this embodiment, an example of a method for forming the transistor illustrated in FIG. 5A is described with reference to FIGS. 6A to 6E. FIGS. 6A to 6E are schematic cross-sectional views illustrating the example of the method for forming the transistor in FIG. 5A.

Figure 6A:
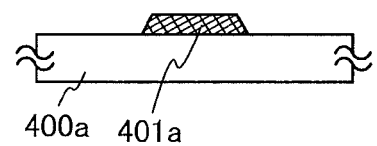
FIGS. 6A to 6E are schematic cross-sectional views illustrating an example of a method for forming the transistor in FIG. 5A.

First, as illustrated in FIG. 6A, the substrate 400a is prepared and a first conductive film is formed over the substrate 400a. Part of the first conductive film is etched so that the conductive layer 401a is formed.

For example, the first conductive film is a layer of a material, which can be used for the conductive layer 401a, formed by sputtering. Alternatively, the first conductive film can be formed by stacking films of materials that can be used for the conductive layer 401a.

Note that when a high-purity gas from which an impurity such as hydrogen, moisture, a hydroxyl group, or hydride is removed is used as a sputtering gas, for example, the impurity concentration in the film can be lowered.

Note that preheating treatment may be performed in a preheating chamber of a sputtering apparatus before the film is formed by sputtering. By the preheating treatment, an impurity such as hydrogen or moisture can be eliminated.

Before the film is formed by sputtering, for example, treatment by which voltage is applied to a substrate side, not to a target side, in an argon, nitrogen, helium, or oxygen atmosphere with the use of an RF power and plasma is generated so that a surface of the substrate on which the film is formed is modified (such treatment is also referred to as reverse sputtering) may be performed. By reverse sputtering, powdery substances (also referred to as particles or dust) that attach onto the surface on which the film is formed can be removed.

In the case where the film is formed by sputtering, moisture remaining in a deposition chamber used for forming the film can be removed with an entrapment vacuum pump. As the entrapment vacuum pump, a cryopump, an ion pump, or a titanium sublimation pump can be used, for example. Alternatively, moisture remaining in the deposition chamber can be removed by a turbo molecular pump provided with a cold trap.

As performed in the method for forming the conductive layer 401a, in the example of a method for forming the transistor of this embodiment, when a layer is formed by etching of a film, for example, a resist mask is formed over a part of a film by a photolithography process and the film is etched using the resist mask, and thereby a layer is formed. Note that in this case, the resist mask is removed after the layer is formed.

The resist mask may be formed by an inkjet method. A photomask is not used in an inkjet method; thus, manufacturing cost can be reduced. In addition, the resist mask may be formed using an exposure mask having a plurality of regions with different transmittances (such an exposure mask is also referred to as a multi-tone mask). With the multi-tone mask, a resist mask having a plurality of regions with different thicknesses can be formed, so that the number of resist masks used for the formation of the transistor can be reduced.

Figure 6B:
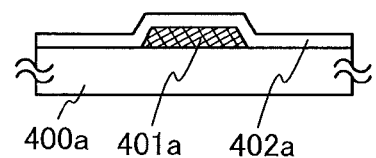

Next, as illustrated in FIG. 6B, the insulating layer 402a is formed by formation of a first insulating film over the conductive layer 401a.

For example, the first insulating film is a layer of a material, which can be used for the insulating layer 402a, formed by sputtering, plasma-enhanced CVD, or the like. The first insulating film is alternatively a stack of layers of materials that can be used for the insulating layer 402a. Further, when the layer of a material that can be used for the insulating layer 402a is formed by high-density plasma-enhanced CVD (e.g., high-density plasma-enhanced CVD using microwaves (e.g., microwaves with a frequency of 2.45 GHz)), the insulating layer 402a can be dense and can have higher breakdown voltage.

Figure 6C:
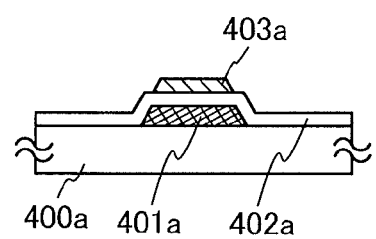

Then, as illustrated in FIG. 6C, an oxide semiconductor layer is formed over the insulating layer 402a. After that, part of the oxide semiconductor layer is etched, so that the oxide semiconductor layer 403a is formed.

For example, the oxide semiconductor layer is a layer of an oxide semiconductor material, which can be used for the oxide semiconductor layer 403a, formed by sputtering. Note that the oxide semiconductor layer may be formed in a rare gas atmosphere, an oxygen atmosphere, or in a mixed atmosphere of a rare gas and oxygen.

The oxide semiconductor layer can be formed using an oxide target having a composition ratio of $In_2O_3:Ga_2O_3:ZnO=1:1:1$ (in a molar ratio) as a sputtering target. Alternatively, for example, a target having a composition ratio of $In_2O_3:Ga_2O_3:ZnO=1:1:2$ [molar ratio] may be used.

In the case where an In—Sn—Zn—O-based material is used for the oxide semiconductor, an oxide target which has a composition ratio of In:Sn:Zn=1:2:2, 2:1:3, 1:1:1, or 20:45:35 in an atomic ratio is used. Note that an In—Sn—Zn-based oxide semiconductor can be referred to as ITZO.

When the oxide semiconductor layer is formed by sputtering, the substrate 400a may be kept under reduced pressure and heated at 100 to 600° C., preferably 200 to 400° C. Heating the substrate 400a can lower the impurity concentration in the oxide semiconductor film and reduce damage to the oxide semiconductor film caused by the sputtering.

Figure 6D:
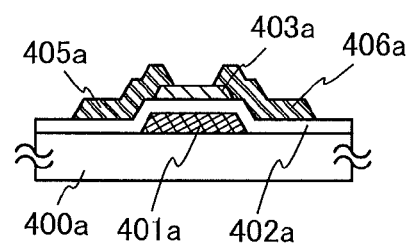

Then, as illustrated in FIG. 6D, a second conductive film is formed over the insulating layer 402a and the oxide semiconductor layer 403a and partly etched so that the conductive layers 405a and 406a are formed.

For example, the second conductive film is a layer of a material, which can be used for the conductive layers 405a and 406a, formed by sputtering or the like. Alternatively, the second conductive film is a stack of films of materials that can be used for the conductive layers 405a and 406a.

Figure 6E:
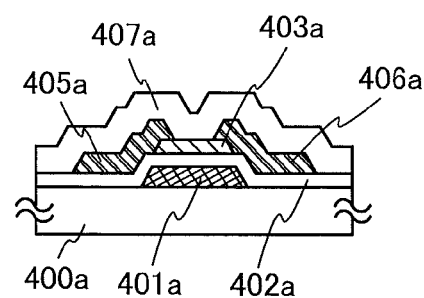

Then, as illustrated in FIG. 6E, the insulating layer 407a is formed so as to be in contact with the oxide semiconductor layer 403a.

For example, the insulating layer 407a is a film, which can be used for the insulating layer 407a, formed in a rare gas (typically, argon) atmosphere, an oxygen atmosphere, or a mixed atmosphere of a rare gas and oxygen by sputtering. The formation of the insulating layer 407a by sputtering can suppress the decrease in the resistance of part of the oxide semiconductor layer 403a that functions as a back channel of the transistor. The temperature of the substrate at the time of the formation of the insulating layer 407a is preferably higher than or equal to room temperature and lower than or equal to 300° C.

Before the formation of the insulating layer 407a, plasma treatment using a gas such as $N_2O$, $N_2$, or Ar may be performed so that moisture or the like adsorbed onto an exposed surface of the oxide semiconductor layer 403a is removed. In the case where the plasma treatment is performed, the insulating layer 407a is preferably formed after the plasma treatment without exposure to air.

In addition, in the example of the method for forming the transistor illustrated in FIG. 5A, heat treatment is performed at higher than or equal to 400° C. and lower than or equal to 750° C., or higher than or equal to 400° C. and lower than the strain point of the substrate, for example. For example, the heat treatment is performed after the oxide semiconductor layer is formed, after part of the oxide semiconductor layer is etched, after the second conductive film is formed, after part of the second conductive film is etched, or after the insulating layer 407a is formed.

A heat treatment apparatus for the heat treatment can be an electric furnace or an apparatus for heating an object by heat conduction or heat radiation from a heating element such as a resistance heating element. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating a process object by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the high-temperature gas, a rare gas or an inert gas (e.g., nitrogen) which does not react with the object by the heat treatment can be used.

After the heat treatment, a high-purity oxygen gas, a high-purity $N_2O$ gas, or ultra-dry air (with a dew point of −40° C. or lower, preferably −60° C. or lower) may be introduced into the furnace that has been used in the heat treatment while the heating temperature is maintained or decreased. It is preferable that the oxygen gas or the $N_2O$ gas do not contain moisture, hydrogen, and the like. The purity of the oxygen gas or the $N_2O$ gas which is introduced into the heat treatment apparatus is preferably equal to or more than 6N, more preferably equal to or more than 7N (i.e., the impurity concentration of the oxygen gas or the $N_2O$ gas is preferably equal to or lower than 1 ppm, more preferably equal to or lower than 0.1 ppm). By the action of the oxygen gas or the $N_2O$ gas, oxygen is supplied to the oxide semiconductor layer 403a, so that defects caused by oxygen deficiency in the oxide semiconductor layer 403a can be reduced.

Further, in addition to the heat treatment, after the insulating layer 407a is formed, heat treatment (preferably at 200 to 400° C., for example, 250 to 350° C.) may be performed in an inert gas atmosphere or an oxygen gas atmosphere.

Oxygen doping using oxygen plasma may be performed after the insulating layer 402a is formed, after the oxide semiconductor layer is formed, after the conductive layers serving as the source electrode and the drain electrode are formed, after the oxide insulating layer is formed, or after the heat treatment is performed. For example, an oxygen doping treatment using a high-density plasma of 2.45 GHz may be performed. Alternatively, oxygen doping treatment may be performed by an ion implantation method or ion doping. By the oxygen doping treatment, variations in electrical characteristics of the transistors can be reduced. For example, the oxygen doping treatment is performed to cause the insulating layer 402a or the insulating layer 407a, or both to contain oxygen with a higher proportion than that in the stoichiometric composition. Consequently, excess oxygen in the insulating layer is easy to be supplied to the oxide semiconductor layer 403a. This can reduce oxygen deficiency in the oxide semiconductor layer 403a or at the interface between one or both of the insulating layer 402a and the insulating layer 407a and the oxide semiconductor layer 403a, thereby reducing the carrier concentration of the oxide semiconductor layer 403a.

For example, when an insulating layer containing gallium oxide is formed as one or both of the insulating layer 402a and the insulating layer 407a, the composition of the gallium oxide can be set to be $Ga_2O_x$ by supplying the insulating layer with oxygen.

Alternatively, when an insulating layer containing aluminum oxide is formed as one or both of the insulating layer 402a and the insulating layer 407a, the composition of the aluminum oxide can be set to be $Al_2O_x$ by supplying the insulating layer with oxygen.

Alternatively, when an insulating layer containing gallium aluminum oxide or aluminum gallium oxide is formed as one or both of the insulating layer 402a and the insulating layer 407a, the composition of the gallium aluminum oxide or the aluminum gallium oxide can be set to be $Ga_xAl_{2-x}O_{3+\alpha}$ by supplying the insulating layer with oxygen.

Through the steps, an impurity such as hydrogen, moisture, a hydroxyl group, or hydride (also referred to as a hydrogen compound) is removed from the oxide semiconductor layer 403a and oxygen is supplied to the oxide semiconductor layer 403a. Thus, the oxide semiconductor layer can be highly purified.

The example of the manufacturing method of the transistor illustrated in FIG. 5A is a non-limiting example. For example, if any of the components illustrated in FIGS. 5B to 5E has the same designation as the components in FIG. 5A and has a function, at least part of which is the same as that of the components in FIG. 5A, the description of the example of the manufacturing method of the transistor in FIG. 5A can be employed as appropriate.

As described with reference to FIGS. 5A to 5D and FIGS. 6A to 6E, the example of the transistor in this embodiment includes a conductive layer functioning as a gate; an insulating layer functioning as a gate insulating layer; an oxide semiconductor layer which includes a channel and overlaps with conductive layer functioning as a gate with the insulating layer functioning as a gate insulating layer provided therebetween; a conductive layer which is electrically connected to the oxide semiconductor layer and functions as one of a source and a drain; and a conductive layer which is electrically connected to the oxide semiconductor layer and functions as the other of the source and the drain.

In an example of the transistor of this embodiment, an insulating layer in contact with an oxide semiconductor layer is in contact with an insulating layer serving as a gate insulating layer in a portion where the oxide semiconductor layer, a conductive layer serving as one of a source and a drain, and a conductive layer serving as the other of the source and the drain are not provided. With the above structure, the oxide semiconductor layer, the conductive layer functioning as one of a source and a drain, and the conductive layer functioning as the other of the source and the drain are surrounded by the insulating layer which is in contact with the oxide semiconductor layer and the insulating layer functioning as a gate insulating layer. Thus, entry of impurities to the oxide semiconductor layer, the conductive layer functioning as one of a source and a drain, and the conductive layer functioning as the other of the source and the drain can be suppressed.

In addition, the concentration of an alkali metal included in the oxide semiconductor layer where a channel is formed is preferably low. For example, when sodium is contained in the oxide semiconductor layer where a channel is formed, the concentration of sodium included in the oxide semiconductor layer where a channel is formed is $5 \times 10^{16}/cm^3$ or lower, preferably $1 \times 10^{16}/cm^3$ or lower, more preferably $1 \times 10^{15}/cm^3$ or lower. Moreover, when lithium is contained in the oxide semiconductor layer where a channel is formed, the concentration of lithium included in the oxide semiconductor layer where a channel is formed is $5 \times 10^{15}/cm^3$ or lower, preferably $1 \times 10^{15}/cm^3$ or lower. In addition, when potassium is contained in the oxide semiconductor layer where a channel is formed, the concentration of potassium included in the oxide semiconductor layer where a channel is formed is $5 \times 10^{15}/cm^3$ or lower, preferably $1 \times 10^{15}/cm^3$ or lower. For example, in a case where an insulating layer in contact with the oxide semiconductor layer is an oxide, sodium diffuses into the insulating layer of the oxide to cause deterioration of a transistor (e.g., shift of threshold voltage, reduction of mobility, or the like). Further, sodium also causes variation of characteristics of plural transistors. Therefore, the reduction of the concentration of an alkali metal contained in the oxide semiconductor layer where a channel is formed leads to suppression of deterioration of transistor characteristics due to an alkali metal.

As described above, the oxide semiconductor layer in which a channel is formed is an oxide semiconductor layer which is made intrinsic (i-type) or substantially intrinsic (i-type) by the purifying operation. By highly purification of the oxide semiconductor layer, the carrier concentration of the oxide semiconductor layer can be lower than $1 \times 10^{14}/cm^3$, preferably lower than $1 \times 10^{12}/cm^3$, further preferably lower than $1 \times 10^{11}/cm^3$, and thus, change in characteristics due to temperature change can be suppressed. With the above structure, the off-state current per micrometer of the channel width can be 10 aA ($1 \times 10^{-17}$ A) or less, 1 aA ($1 \times 10^{-18}$ A) or less, 10 zA ($1 \times 10^{-20}$ A) or less, further 1 zA ($1 \times 10^{-21}$ A) or less, and further more 100 yA ($1 \times 10^{-22}$ A) or less. It is preferred that the off-state current of the transistor is as low as possible. The lower limit of the off-state current of the transistor in this embodiment is estimated at about $10^{-30}$ A/μm.

The transistor including an oxide semiconductor layer described in this embodiment is used as a transistor in one or more of the display circuit, the display selection signal output circuit, the display data signal output circuit, the photodetector circuit, the photodetection reset signal output circuit, and the output selection signal output circuit in the input/output device in the above embodiment, whereby the reliability of the input/output device can be enhanced.

A calculation example of the off-state current of the example of the transistor including an oxide semiconductor layer in this embodiment, in which leakage current measurement with a circuit for evaluating characteristics is utilized, will be described below.

Figure 7A:
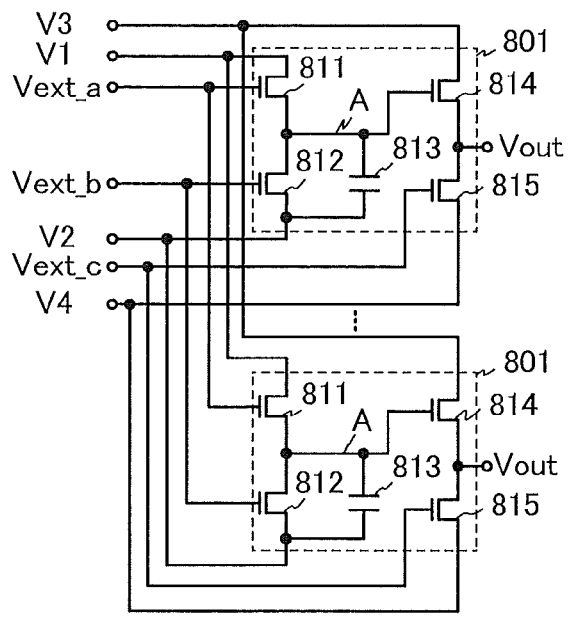
FIGS. 7A to 7C illustrate a circuit for evaluating characteristics.
Figure 7B:
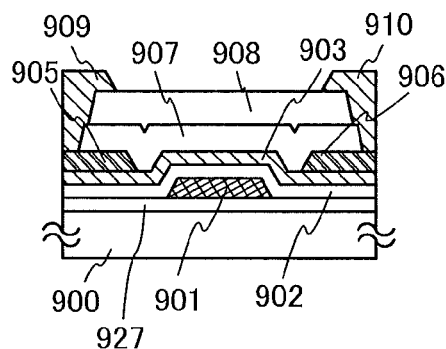

The leakage current measurement with a circuit for evaluating characteristics is described with reference to FIGS. 7A and 7B. FIGS. 7A and 7B illustrate the circuit for evaluating characteristics.

First, the structure of the circuit for evaluating characteristics is described with reference to FIG. 7A. FIG. 7A is a circuit diagram illustrating the structure of the circuit for evaluating characteristics.

The circuit for evaluating characteristics illustrated in FIG. 7A includes a plurality of measurement systems 801. The plurality of measurement systems 801 are connected in parallel. Here, as an example, eight measurement systems 801 are connected in parallel. Plural kinds of measurement can be performed using the plurality of measurement systems 801.

The measurement system 801 includes a transistor 811, a transistor 812, a capacitor 813, a transistor 814, and a transistor 815.

The transistor 811, the transistor 812, the transistor 814, and the transistor 815 are n-type field-effect transistors.

A voltage V1 is input to one of a source and a drain of the transistor 811, and a voltage Vext_a is input to a gate of the transistor 811. The transistor 811 is for injection of electric charge.

One of a source and a drain of the transistor 812 is electrically connected to the other of the source and the drain of the transistor 811, a voltage V2 is input to the other of the source and the drain of the transistor 812, and a voltage Vext_b is input to a gate of the transistor 812. The transistor 812 is for evaluation of leakage current. Note that the leakage current here refers to a leakage current including the off-state current of a transistor.

A first capacitor electrode of the capacitor 813 is connected to the other of the source and the drain of the transistor 811. The voltage V2 is input to a second capacitor electrode of the capacitor 813. Here, the voltage V2 is 0 V.

A voltage V3 is input to one of a source and a drain of the transistor 814, and a gate of the transistor 814 is electrically connected to the one of the source and the drain of the transistor 811. Note that a portion where the gate of the transistor 814, the other of the source and the drain of the transistor 811, the one of the source and the drain of the transistor 812, and the first electrode of the capacitor 813 are connected to each other is referred to as a node A. Here, the voltage V3 is 5 V.

One of a source and a drain of the transistor 815 is electrically connected to the other of the source and the drain of the transistor 814, a voltage V4 is input to the other of the source and the drain of the transistor 815, and a voltage Vext_c is input to a gate of the transistor 815. Here, the voltage Vext_c is 0.5 V.

The measurement system 801 outputs a voltage at a portion where the other of the source and the drain of the transistor 814 is connected to the one of the source and the drain of the transistor 815, as an output voltage Vout.

Here, as an example of the transistor 811, a transistor including an oxide semiconductor layer and having a channel length L of 10 μm and a channel width W of 10 μm is used.

As an example of each of the transistor 814 and the transistor 815, a transistor including an oxide semiconductor layer and having a channel length L of 3 μm and a channel width W of 100 μm is used.

The structure of the transistor 812 is illustrated in FIG. 7B. FIG. 7B is a cross-sectional view illustrating the structure of the transistor.

As illustrated in FIG. 7B, the transistor 812 includes a conductive layer 901 serving as a gate, an insulating layer 902 serving as a gate insulating layer, an oxide semiconductor layer 903 being over the conductive layer 901 with the insulating layer 902 interposed therebetween and serving as a channel formation layer, a conductive layer 905 being in contact with the oxide semiconductor layer 903 and serving as one of a source and a drain, and a conductive layer 906 being in contact with the oxide semiconductor layer 903 and serving as the other of the source and the drain. In the transistor 812, an insulating layer 907 and a planarization layer 908 are stacked over the oxide semiconductor layer 903, the conductive layer 905, and the conductive layer 906, a conductive layer 909 in contact with the conductive layer 905 in an opening, a conductive layer 910 in contact with the conductive layer 909 in an opening, the conductive layer 905 and the conductive layer 906 do not overlap with the conductive layer 901, and off-set regions with a width of 1 μm is provided. Provision of the offset region can reduce parasitic capacitance. Further, as the transistor 812, samples (SMP) of six transistors having different channel lengths L and different channel widths W are used (see Table 1).

TABLE 1

|  | L [μm] | W [μm] |
|---|---|---|
| SMP1 | 1.5 | $1 \times 10^5$ |
| SMP2 | 3 | $1 \times 10^5$ |
| SMP3 | 10 | $1 \times 10^5$ |
| SMP4 | 1.5 | $1 \times 10^6$ |
| SMP5 | 3 | $1 \times 10^6$ |
| SMP6 | 10 | $1 \times 10^6$ |

Next, a manufacturing method of the transistor 812 is described below.

First, a glass substrate is prepared as a substrate 900 and an insulating layer 927 is formed over the substrate 900. Here, a silicon nitride film with a thickness of 100 nm is formed over the substrate 900, and a silicon oxynitride film with a thickness of 150 nm is formed over the silicon nitride film as an insulating layer 927.

Next, a conductive layer 901 is formed over the substrate 900 with the insulating layer 927 therebetween. In addition, a tungsten film with a thickness of 100 nm is formed over the substrate 900 with the insulating layer 927 interposed therebetween, and part of the tungsten film is etched so that a conductive layer 901 is formed.

Next, over the conductive layer 901 and the insulating layer 927, an insulating layer 902 is formed. Here, over the conductive layer 901 and the insulating layer 927, a silicon oxynitride film with a thickness of 100 nm is formed by a CVD method as an insulating layer 902.

Next, the oxide semiconductor layer 903 is formed over the conductive layer 901 with the insulating layer 902 interposed therebetween. An oxide semiconductor layer is formed by a sputtering method over the conductive layer 901 with the insulating layer 902 interposed therebetween, and a part of the oxide semiconductor layer is etched so that the oxide semiconductor layer 903 is formed. Note that in the manufacturing process of the oxide semiconductor layer, the oxide semiconductor layer is formed under conditions that a target of a metal oxide including $In_2O_3$, $Ga_2O_3$, and ZnO ($In_2O_3$:$Ga_2O_3$:ZnO=1:1:2 [mol]) is used, the substrate temperature is 200° C., the pressure inside a chamber of a sputtering apparatus is 0.6 Pa, a DC power of the sputtering apparatus is 5 kV, and the deposition atmosphere is a mixed atmosphere of oxygen and argon (oxygen flow rate of 50 sccm and argon flow rate of 50 seem).

Subsequently, heat treatment is performed at 450° C. for one hour in a mixed atmosphere of nitrogen and oxygen (the percentage of nitrogen is 80% and that of oxygen is 20%).

Next, a part of the insulating layer 902 is etched so that an opening passing through the conductive layer 901 is formed.

Next, over the oxide semiconductor layer 903, the conductive layer 905 and the conductive layer 906 are formed. In addition, by a sputtering method, over the oxide semiconductor layer 903, a titanium film with a thickness of 100 nm is formed, and over the titanium film, an aluminum film with a thickness of 200 nm is formed, and over the aluminum film, a titanium film with a thickness of 100 nm is formed. Then, a part of stacked-layer of the titanium film, the aluminum film, and the titanium film is etched so that the conductive layer 905 and the conductive layer 906 are formed.

Then, heat treatment is performed at 300° C. for one hour in a nitrogen atmosphere.

Next, the insulating layer 907 is formed over the insulating layer 902, the oxide semiconductor layer 903, the conductive layer 905, and the conductive layer 906. Here, over the insulating layer 902, the oxide semiconductor layer 903, the conductive layer 905, and the conductive layer 906, a silicon oxide film with a thickness of 300 nm is formed as the insulating layer 907.

Then, a part of the insulating layer 907 is etched so that an opening passing through the conductive layer 905 and an opening passing through the conductive layer 906 are formed.

Then, over the insulating layer 907, the planarization layer 908 is formed. Here, an acrylic layer with a thickness of 1.5 μm is formed by coating and a part of the acrylic layer is exposed to light so that the planarization layer 908 is formed.

Further, heat treatment is performed in a nitrogen atmosphere at 250° C. for one hour.

Next, over the planarization layer 908, a conductive layer 909 in contact with the conductive layer 905 and a conductive layer 910 in contact with the conductive layer 906 are formed. Here, by a sputtering method, a titanium film with a thickness of 200 nm is formed over the planarization layer 908, and a part of the titanium film is etched so that the conductive layer 909 and the conductive layer 910 are formed.

Then, heat treatment is performed at 250° C. for one hour under a nitrogen atmosphere. These steps are a manufacturing process of the transistor 812.

By separately providing a transistor for injecting electric charge and a transistor for evaluating leakage current as illustrated in FIG. 7A, the transistor for evaluating leakage current can be always kept off at the time of electric charge injection.

In addition, by separately providing the transistor for injecting electric charge and the transistor for evaluating leakage current, each of these transistors can be of the proper size. Further, by making the channel width W of the transistor for evaluating leakage current larger than that of the transistor for injecting electric charge, the leakage current other than the leakage current of the transistor for evaluating leakage current can be made relatively small in the circuit for characteristic evaluation. As a result, the leakage current of the transistor for evaluating leakage current can be measured with great accuracy. Further, the transistor for evaluating leakage current does not need to be turned on at the time of charge injection, preventing the influence of fluctuations in the voltage of the node A caused by part of the electric charge in the channel formation region of the transistor for evaluating leakage current flowing into the node A.

Figure 7C:
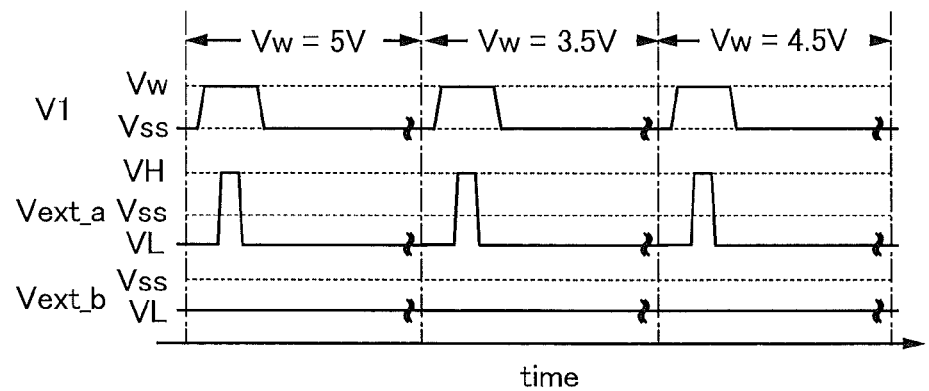

Next, a method for measuring the leakage current of the circuit for evaluating characteristics illustrated in FIG. 7A is described with referent to FIG. 7C. FIG. 7C is a timing chart for describing the method for measuring the leakage current with the use of the circuit for evaluating characteristics illustrated in FIG. 7A.

In the method for measuring the leakage current with the use of the circuit for evaluating characteristics illustrated in FIG. 7A, a period is divided into a writing period and a holding period. Operations performed in these periods will be described below.

In the writing period, voltage VL (−3 V) that turns off the transistor 812 is input as the voltage Vext_b. As the voltage V1, the writing voltage Vw is input, and then, as the voltage Vext_a, the voltage VH (5 V) with which the transistor 811 is in an on state for a certain period is input. Consequently, charge is stored on the node A, so that the voltage of the node A becomes equivalent to the write voltage Vw. Then, as the voltage Vext_a, a voltage VL with which the transistor 811 is turned off is input. Then, a voltage VSS (0 V) is input as the voltage V1.

In the holding period, the amount of change in the voltage of the node A due to the change in the amount of electric charge held in the node A is measured. From the amount of change in the voltage, the value of the current flowing between the source electrode and the drain electrode of the transistor 812 can be calculated. Thus, charge can be stored on the node A, and the amount of change in the voltage of the node A can be measured.

At that time, the storage of charge on the node A and the measurement of the amount of change in the voltage of the node A (also referred to as storage and measurement operation) are repeatedly performed. First, first storage and measurement operation is repeated 15 times. In the first storage and measurement operation, a voltage of 5 V is input as the write voltage Vw in a write period, and held for one hour in a holding period. Next, second storage and measurement operation are conducted twice. In the second storage and measurement operation, a voltage of 3.5 V is input as the write voltage Vw in a write period, and held for 50 hours in a holding period. Then, third storage and measurement operation is performed once. In the third storage and measurement operation, a voltage of 4.5 V is input as the write voltage Vw in a write period, and held for ten hours in a holding period. It is possible to confirm if a measured current value is a value supposed to be obtained at the steady state by repeating the storage and measurement operations. In other words, it is possible to remove a transient (a current decreasing with time after the start of the measurement) from $I_A$ (current flowing through the node A). As a result, the leakage current can be measured with greater accuracy.

In general, the voltage $V_A$ of the node A is expressed by the following formula as a function of the output voltage Vout.

$$V_A = F(Vout)$$ [Formula 7]

Electric charge $Q_A$ of the node A can be expressed by the following formula using the voltage $V_A$ of the node A, capacitance $C_A$ connected to the node A, and a constant (const).

$$Q_A = C_A V_A + const$$ [Formula 8]

Here, the capacitance $C_A$ connected to the node A is the sum of capacitance of the capacitor 813 and the other capacitance.

Current $I_A$ of the node A is a temporal differential of electric charge which flows to the node A (or electric charge which flows out of the node A) and thus is expressed by the following formula.

$$I_A \equiv \frac{\Delta Q_A}{\Delta t} = \frac{C_A \cdot \Delta F(Vout)}{\Delta t}$$ [FORMULA 9]

Note that here, as an example, Δt is about 54000 sec. As the above, the current $I_A$ of the node A, which is leakage current can be calculated with the capacitance $C_A$ connected to the node A and the output voltage Vout, and the leakage current of the circuit for evaluating characteristics can be accordingly obtained.

Next, measurement results of the output voltage obtained by the measurement method using the circuit for evaluating characteristics, and the leakage current of the circuit for evaluating characteristics that is calculated from the measurement results are described with reference to FIGS. 8A and 8B.

Figure 8A:
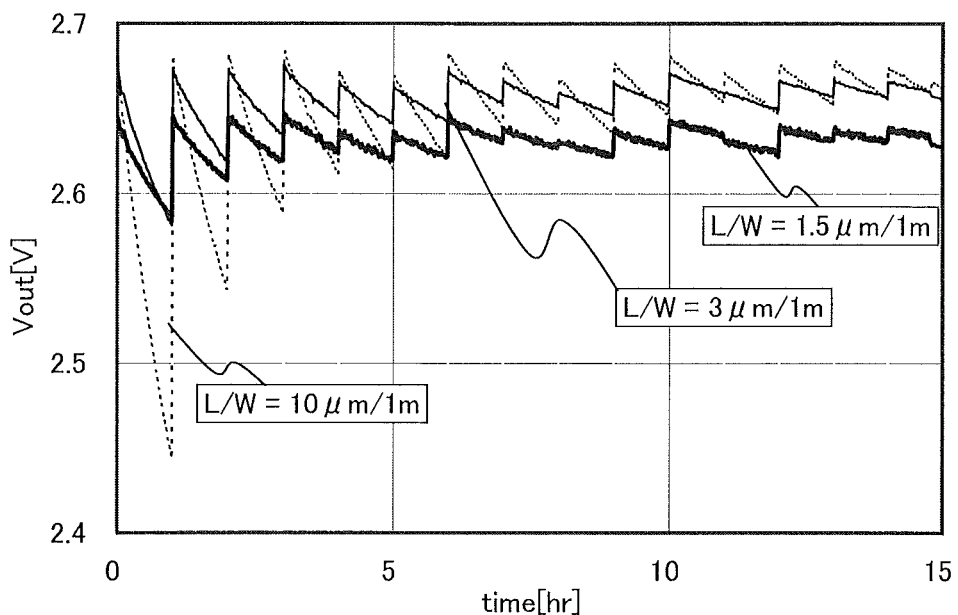
FIG. 8A illustrates a relationship between elapsed time Time in measurement of Samples 4, 5, and 6 (SMPs 4, 5, 6) and output voltage Vout.
Figure 8B:
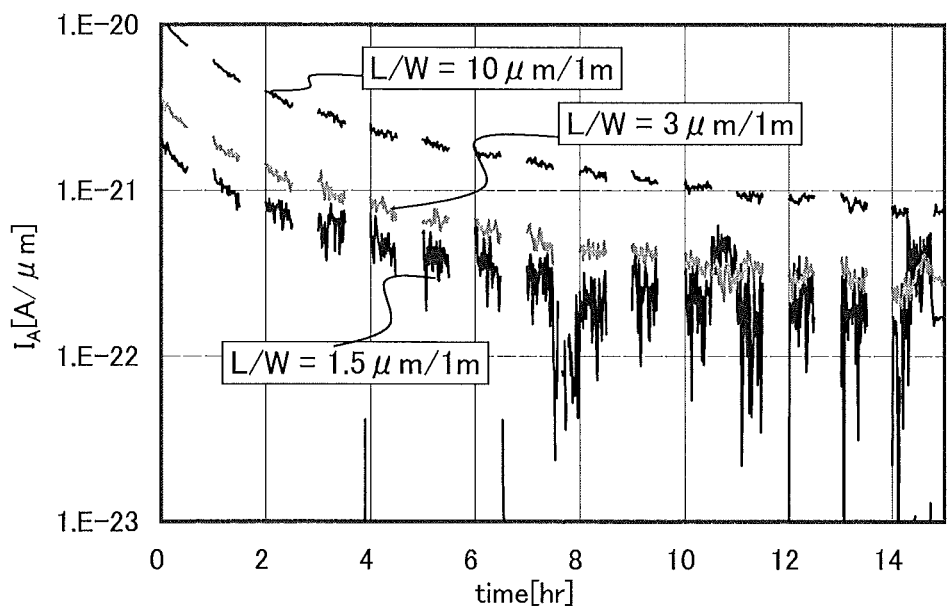
FIG. 8B illustrates a relationship between the elapsed time Time in the measurement of Samples 4, 5, and 6 (SMPs 4, 5, 6) and leakage current calculated from the measurement.

For example, FIG. 8A illustrates the relationship between the elapsed time Time of the measurement (the first accumulation and measurement operation) and the output voltage Vout in the transistors of SMP4, SMP5, and SMP6. FIG. 8B illustrates the relationship between the elapsed time Time of the measurement and the current $I_A$ calculated by the measurement. It is found that Vout (output voltage) fluctuates after the start of the measurement and ten hours or more are needed for the transistors to go into the steady state.

Figure 9:
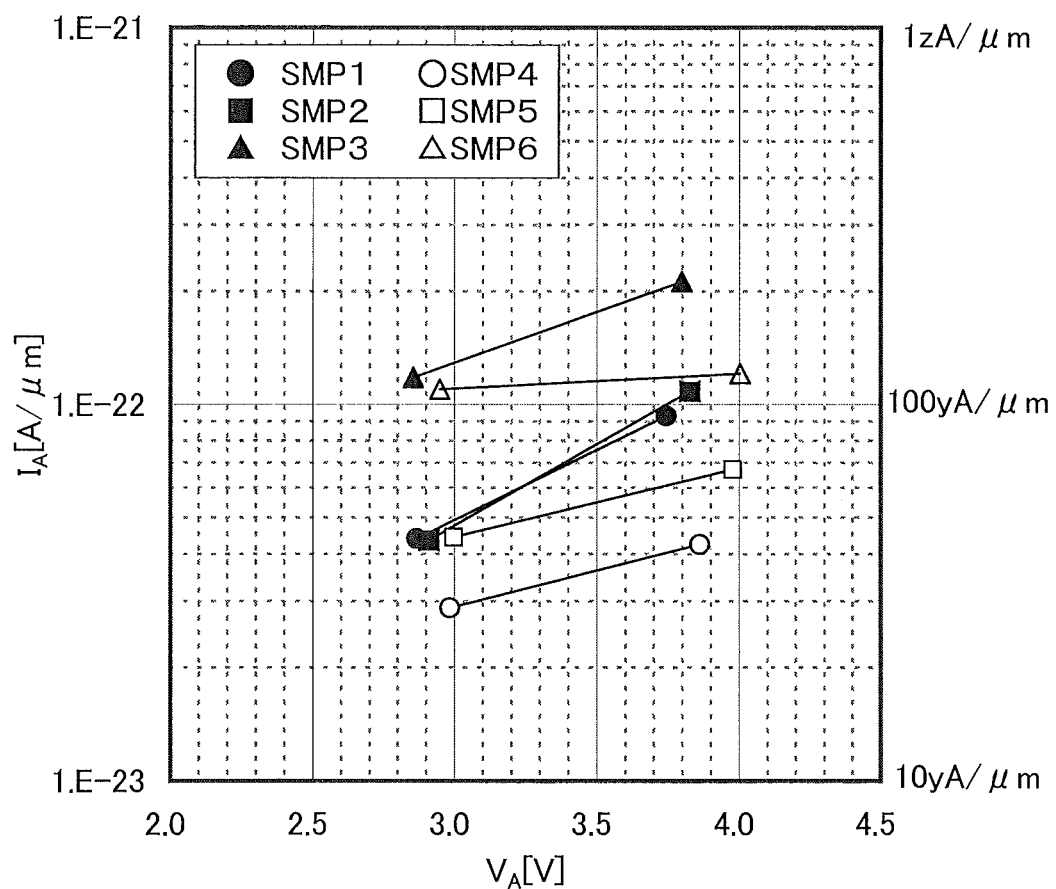
FIG. 9 is a graph showing a relationship between voltage of a node A and leakage current estimated from the measurement.

FIG. 9 illustrates the relationship between the voltage of the node A and the leakage current in the SMP1 to SMP6 estimated from values obtained in the measurement. In FIG. 9, for example, in the case of SMP4, leakage current is 28 yA/μm when the voltage of the node A is 3.0 V. Since the leakage current includes the off-state current of the transistor 812, the off-state current of the transistor 812 can be considered to be 28 yA/μm or less.

Figure 10:
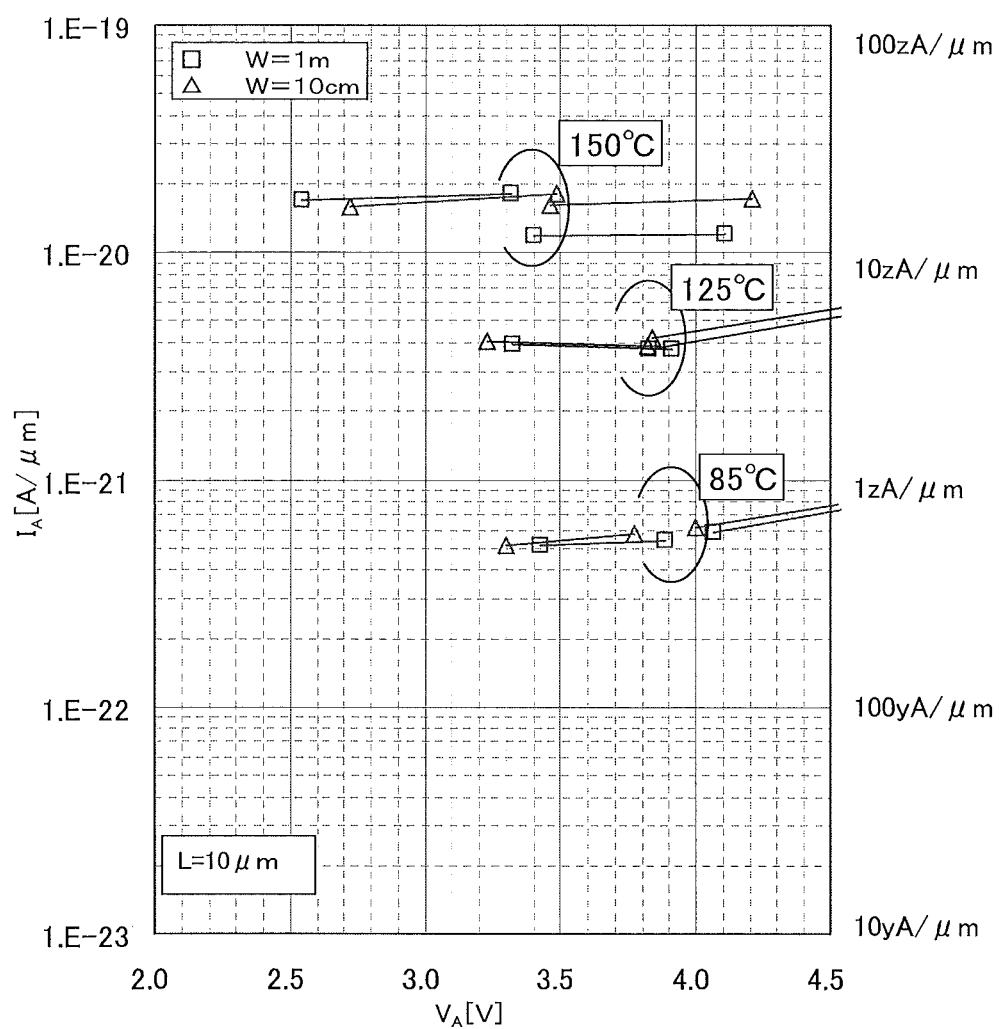
FIG. 10 is a graph showing a relationship between voltage of a node A and leakage current estimated by measurement.
Figure 11:
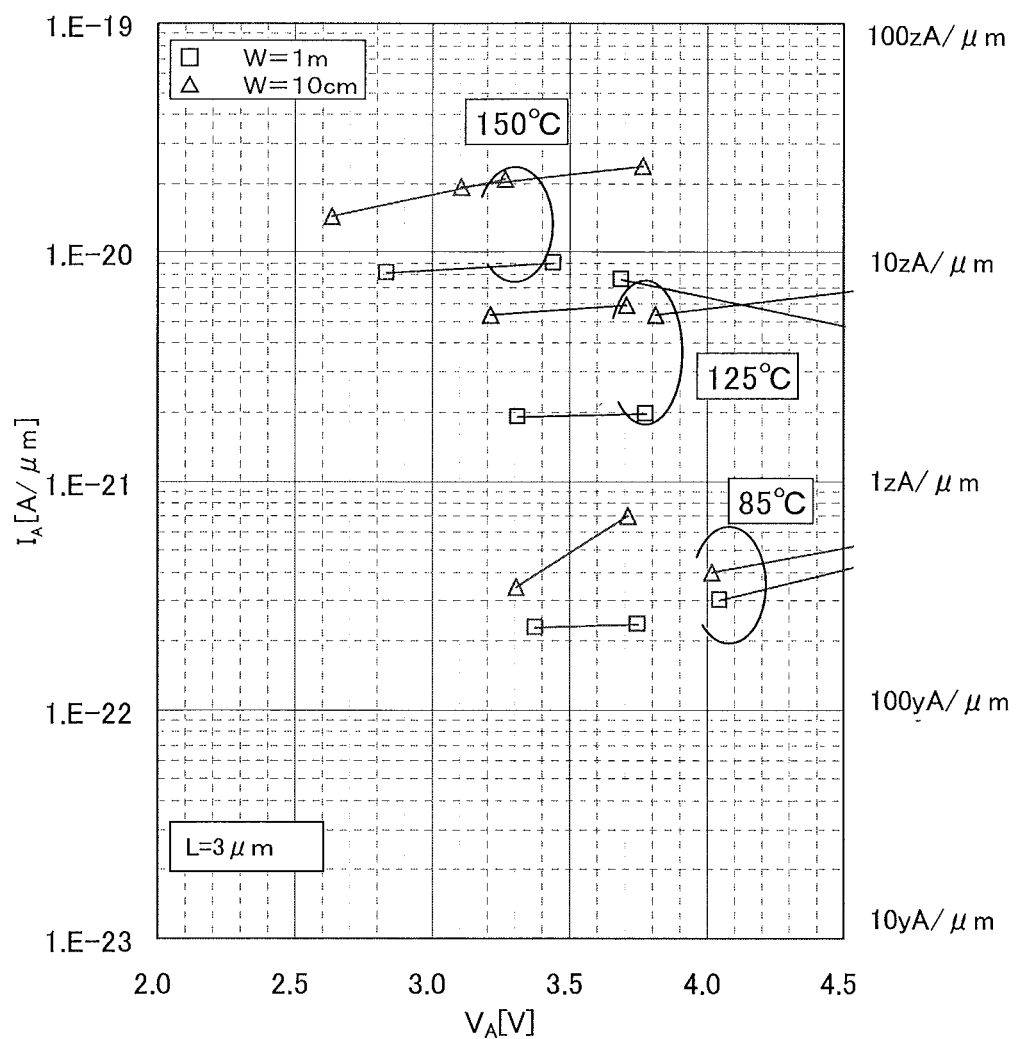
FIG. 11 is a graph showing a relationship between voltage of a node A and leakage current estimated from measurement.
Figure 12:
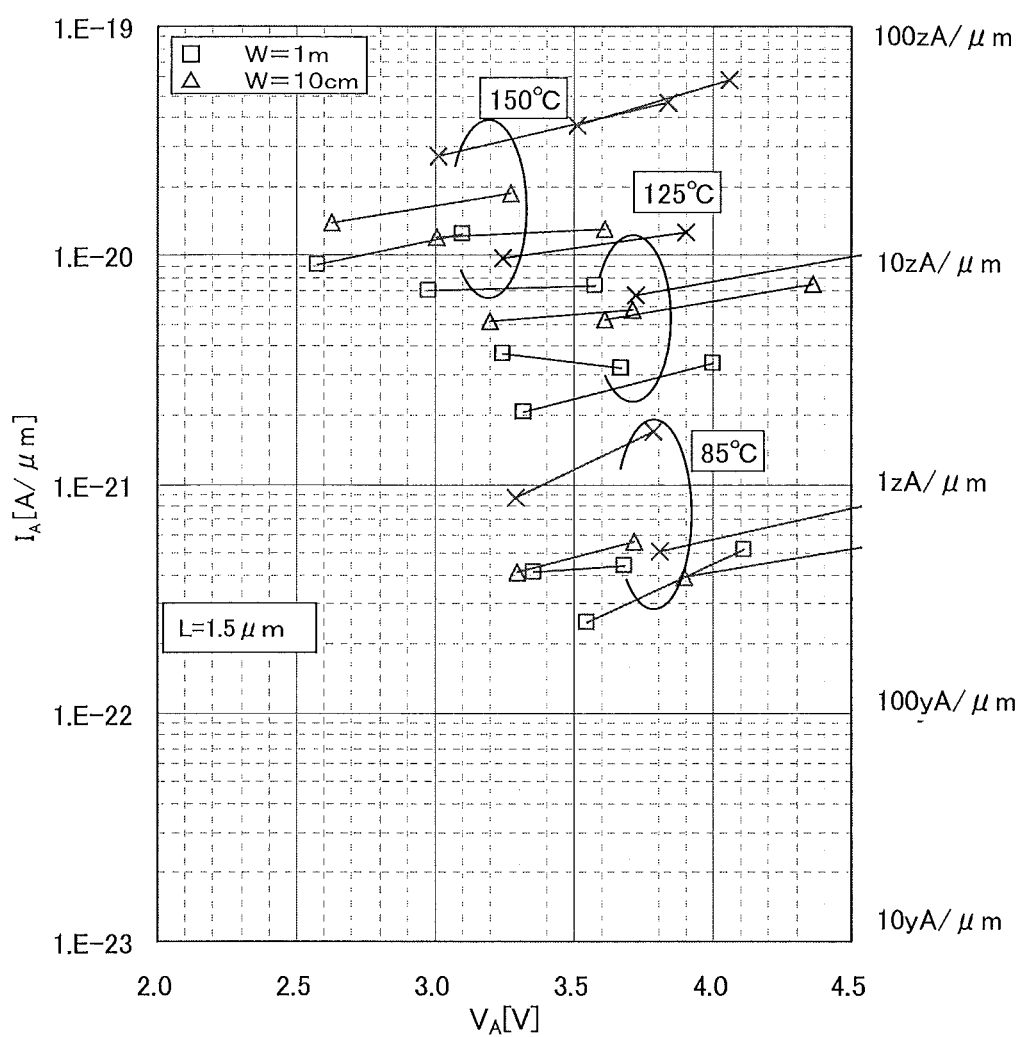
FIG. 12 is a graph showing a relationship between leakage current and voltage of a node A estimated from measurement.

FIG. 10, FIG. 11, and FIG. 12 illustrate the relationship between the voltage of the node A and the leakage current in the SMP1 to SMP6 estimated from the measurement at 85° C., 125° C., and 150° C. As illustrated in FIG. 10, FIG. 11, and FIG. 12, even at 150° C., the leakage current is 100 zA/μm or lower.

As described above, the leakage current of the circuit for characteristic evaluation using a transistor including a highly purified oxide semiconductor layer serving as a channel formation layer is sufficiently low, which means that the off-state current of the transistor is sufficiently low. In addition, it is found that the off-state current of the above transistor is sufficiently low even when the temperature increases.

(Embodiment 6)

In this embodiment, structural examples of the input/output device of the above embodiment are described.

The input/output device of this embodiment includes a first substrate (an active matrix substrate) provided with a semiconductor element such as a transistor, a second substrate, and a liquid crystal layer provided between the first substrate and the second substrate.

Figure 13A:
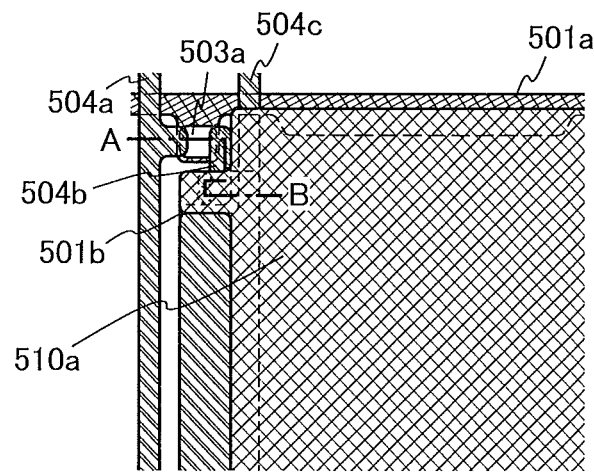
FIGS. 13A and 13B are diagrams illustrating a structural example of an active-matrix substrate of an input/output device of Embodiment 6.
Figure 13B:
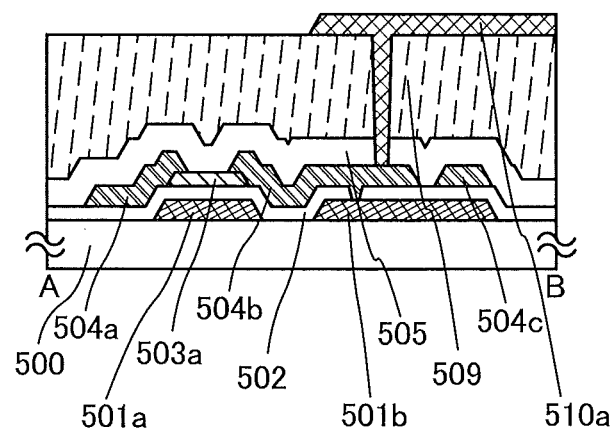
Figure 14A:
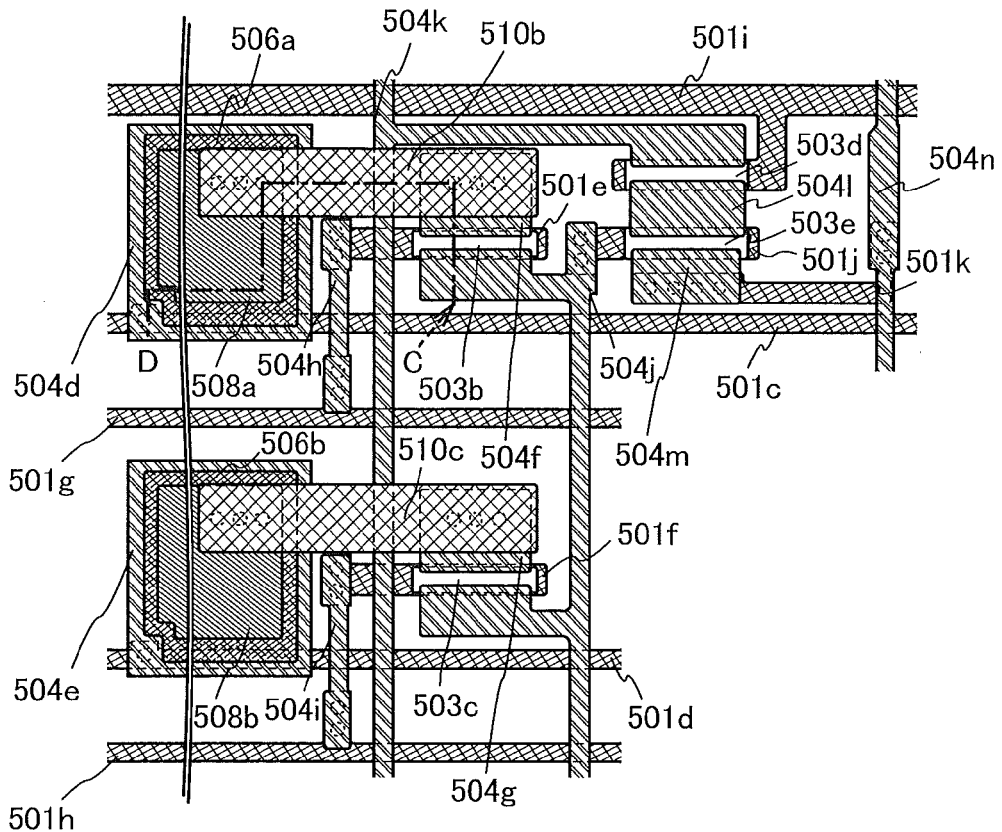
FIGS. 14A and 14B are diagrams illustrating a structural example of the active-matrix substrate of the input/output device of Embodiment 6.
Figure 14B:
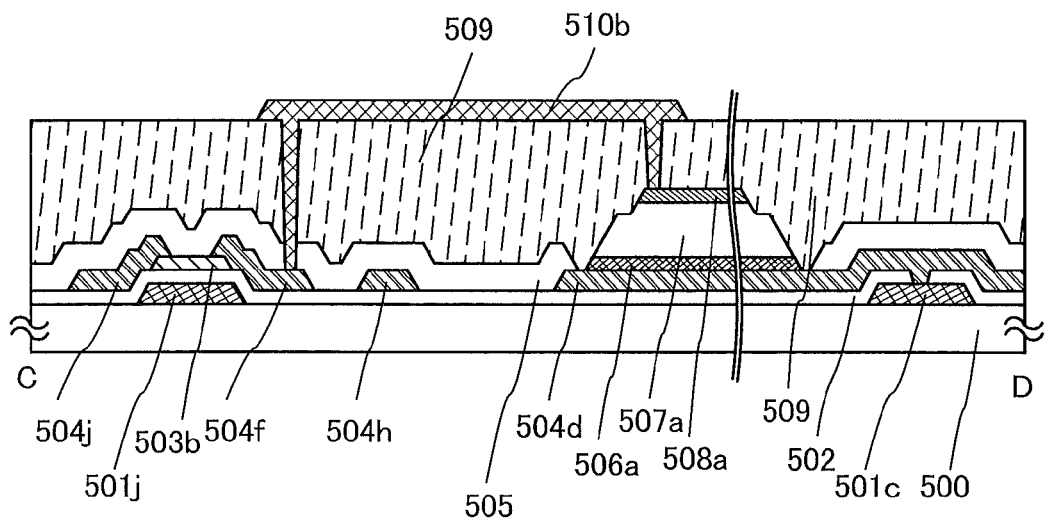

First, structural examples of the active matrix substrate in the input/output device of this embodiment will be described with reference to FIGS. 13A and 13B and FIGS. 14A and 14B. FIGS. 13A and 13B and FIGS. 14A and 14B illustrate structure examples of the active matrix substrate in the input/output device of this embodiment. FIG. 13A is a schematic plan view, and FIG. 13B is a schematic cross-sectional view taken along line A-B in FIG. 13A. FIG. 14A is a schematic plan view, and FIG. 14B is a schematic cross-sectional view taken along line C-D in FIG. 14A. Note that in FIGS. 14A and 14B, the photodetector circuit having the structure illustrated in FIG. 1B is used as an example of a photodetector circuit, and two photoelectric conversion elements, two charge accumulation control transistors, an amplifying transistor, and an output selection transistor are illustrated as an example. In FIGS. 13A and 13B and FIGS. 14A and 14B, the transistor with the structure described with reference to FIG. 5A is used as an example of a transistor.

The active matrix substrate illustrated in FIGS. 13A and 13B and FIGS. 14A and 14B includes a substrate 500, conductive layers 501a to 501k, an insulating layer 502, semiconductor layers 503a to 503e, conductive layers 504a to 504n, an insulating layer 505, a semiconductor layer 506a, a semiconductor layer 506b, a semiconductor layer 507a, a semiconductor layer 507b, a semiconductor layer 508a, a semiconductor layer 508b, an insulating layer 509, and conductive layers 510a to 510c.

The conductive layers 501a to 501k are formed over one surface of the substrate 500.

The conductive layer 501a functions as a gate of a display selection transistor in a display circuit.

The conductive layer 501b functions as a first capacitor electrode of a storage capacitor in the display circuit. Note that a layer that functions as a first capacitor electrode of a capacitor (a storage capacitor) is also referred to as a first capacitor electrode.

The conductive layer 501c has a function of a wiring through which a first photodetection reset signal is input. Note that a layer that functions as a wiring is also referred to as a wiring.

The conductive layer 501d has a function of a wiring through which a second photodetection reset signal is input.

The conductive layer 501e functions as a gate of a first charge accumulation control transistor in the photodetector circuit.

The conductive layer 501f functions as a gate of a second charge accumulation control transistor in the photodetector circuit.

The conductive layer 501g functions as a signal line through which a first charge accumulation control signal is input. Note that a layer that functions as a signal line is also referred to as a signal line.

The conductive layer 501h has a function of a signal line through which a second charge accumulation control signal is input.

The conductive layer 501i functions as a gate of an output control transistor in the photodetector circuit.

The conductive layer 501j functions as a gate of an amplifying transistor in the photodetector circuit.

The conductive layer 501k functions as a wiring through which voltage $V_o$ is input.

The insulating layer 502 is provided over a surface of the substrate 500 with the conductive layers 501a to 501k interposed therebetween.

The insulating layer 502 functions as a gate insulating layer of the display selection transistor in the display circuit, a dielectric layer of the storage capacitor in the display circuit, gate insulating layers of the X charge accumulation control transistors in the photodetector circuit, a gate insulating layer of the amplifying transistor in the photodetector circuit, and a gate insulating layer of the output selection transistor in the photodetector circuit.

The semiconductor layer 503a overlaps with the conductive layer 501a with the insulating layer 502 interposed therebetween. The semiconductor layer 503a functions as a channel formation layer of the display selection transistor in the display circuit.

The semiconductor layer 503b overlaps with the conductive layer 501d with the insulating layer 502 interposed therebetween. The semiconductor layer 503b functions as a channel formation layer of the first charge accumulation control transistor in the photodetector circuit.

The semiconductor layer 503c overlaps with the conductive layer 501f with the insulating layer 502 interposed therebetween. The semiconductor layer 503c functions as a channel formation layer of the second charge accumulation control transistor in the photodetector circuit.

The semiconductor layer 503d overlaps with the conductive layer 501i with the insulating layer 502 interposed therebetween. The semiconductor layer 503d functions as a channel formation layer of the output selection transistor in the photodetector circuit.

The semiconductor layer 503e overlaps with the conductive layer 501j with the insulating layer 502 interposed therebetween. The semiconductor layer 503j functions as a channel formation layer of the amplifying transistor in the photodetector circuit.

The conductive layer 504a is electrically connected to the semiconductor layer 503a. The conductive layer 504a functions as one of a source and a drain of the display selection transistor in the display circuit.

The conductive layer 504b is electrically connected to the conductive layer 501b and the semiconductor layer 503a. The conductive layer 504b functions as the other of the source and the drain of the display selection transistor in the display circuit.

The conductive layer 504c overlaps with the conductive layer 501b with the insulating layer 502 interposed therebetween. The conductive layer 504c functions as a second capacitor electrode of the storage capacitor in the display circuit.

The conductive layer 504d is electrically connected to the conductive layer 501c in an opening that penetrates the insulating layer 502. The conductive layer 504d functions as one of a first current terminal and a second current terminal of a first photoelectric conversion element in the light detection circuit.

The conductive layer 504e is electrically connected to the conductive layer 501d in an opening that penetrates the insulating layer 502. The conductive layer 504e functions as one of a first current terminal and a second current terminal of a second photoelectric conversion element in the photodetector circuit.

The conductive layer 504f is electrically connected to the semiconductor layer 503b. The conductive layer 504f functions as one of a source and a drain of the first charge accumulation control transistor in the photodetector circuit.

The conductive layer 504g is electrically connected to the semiconductor layer 503c. The conductive layer 504g functions as one of a source and a drain of the second photodetection control transistor in the photodetector circuit.

The conductive layer 504h is electrically connected to the conductive layer 501e and the conductive layer 501g in an opening that penetrates the insulating layer 502. The conductive layer 504h functions as a signal line through which the first charge accumulation control signal is input.

The conductive layer 504i is electrically connected to the conductive layer 501f and the conductive layer 501h in openings that penetrate the insulating layer 502. The conductive layer 504i functions as a signal line through which the second charge accumulation control signal is input.

The conductive layer 504j is electrically connected to the semiconductor layer 503b and the semiconductor layer 503c and is electrically connected to the conductive layer 501j in an opening portion that penetrates the insulating layer 502. The conductive layer 504j has a function of the other of the source and the drain of each of the first charge accumulation control transistor and the second charge accumulation control transistor in the photodetector circuit.

The conductive layer 504k is electrically connected to the semiconductor layer 503d. The conductive layer 504k serves as one of a source and a drain of the output selection transistor in the photodetector circuit.

The conductive layer 504l is electrically connected to the semiconductor layer 503d and the semiconductor layer 503e. The conductive layer 504l functions as the other of the source and the drain of the output selection transistor in the photodetector circuit and one of a source and a drain of the amplifying transistor in the photodetector circuit.

The conductive layer 504m is electrically connected to the semiconductor layer 503e and is electrically connected to the conductive layer 501k in an opening passing through in the insulating layer 502. The conductive layer 504m serves as the other of the source and the drain of the amplifying transistor in the photodetector circuit.

The conductive layer 504n is electrically connected to the conductive layer 501k through an opening that penetrates the insulating layer 502. The conductive layer 504n functions as a wiring through which the voltage $V_O$ is input.

The insulating layer 505 is in contact with the semiconductor layers 503a to 503d with the conductive layers 504a to 504k interposed therebetween.

The semiconductor layer 506a is electrically connected to the conductive layer 504d in an opening that penetrates the insulating layer 505.

The semiconductor layer 506b is electrically connected to the conductive layer 504e in an opening that penetrates the insulating layer 505.

The semiconductor layer 507a is in contact with the semiconductor layer 506a.

The semiconductor layer 507b is in contact with the semiconductor layer 506b.

The semiconductor layer 508a is in contact with the semiconductor layer 507a.

The semiconductor layer 508b is in contact with the semiconductor layer 507b.

The insulating layer 509 overlaps with the insulating layer 505, the semiconductor layer 506a, the semiconductor layer 506b, the semiconductor layer 507a, the semiconductor layer 507b, the semiconductor layer 508a, and the semiconductor layer 508b. The insulating layer 509 functions as a planarization insulating layer in the display circuit and the photodetector circuit. Note that the insulating layer 509 is not necessarily provided.

The conductive layer 510a is electrically connected to the conductive layer 504b in an opening that penetrates the insulating layers 505 and 509. Further, by providing the conductive layer 510a so as to overlap with the conductive layer 501a, light leakage can be prevented. The conductive layer 510a functions as a pixel electrode of a display element in the display circuit. Note that a layer that functions as a pixel electrode is also referred to as a pixel electrode.

The conductive layer 510b is electrically connected to the conductive layer 504f in an opening that penetrates the insulating layers 505 and 509 and is electrically connected to the semiconductor layer 508a in an opening that penetrates the insulating layers 505 and 509.

The conductive layer 510c is electrically connected to the conductive layer 504g through an opening that penetrates the insulating layers 505 and 509 and is electrically connected to the semiconductor layer 508b through an opening that penetrates the insulating layers 505 and 509.

Figure 15A:
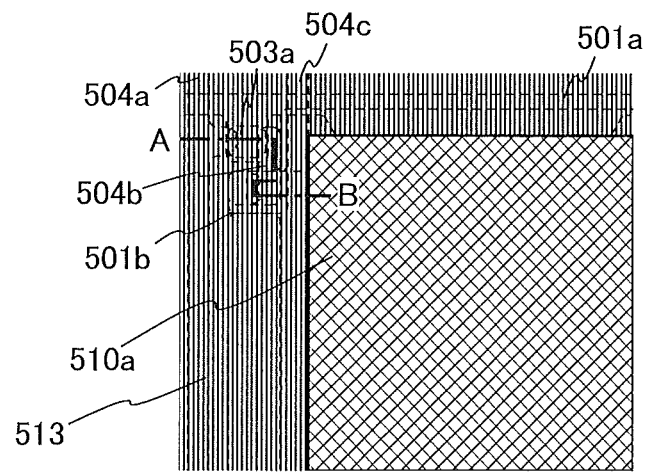
FIGS. 15A and 15B illustrate a structure example of the input/output device in Embodiment 6.
Figure 15B:
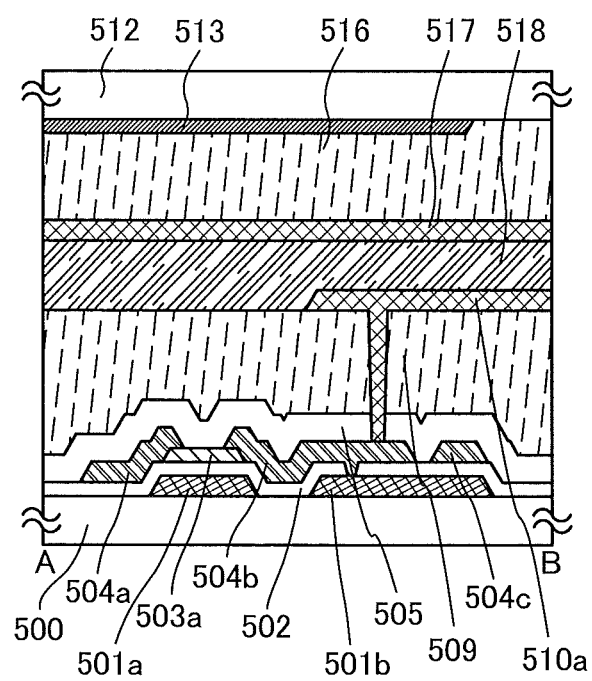
Figure 16A:
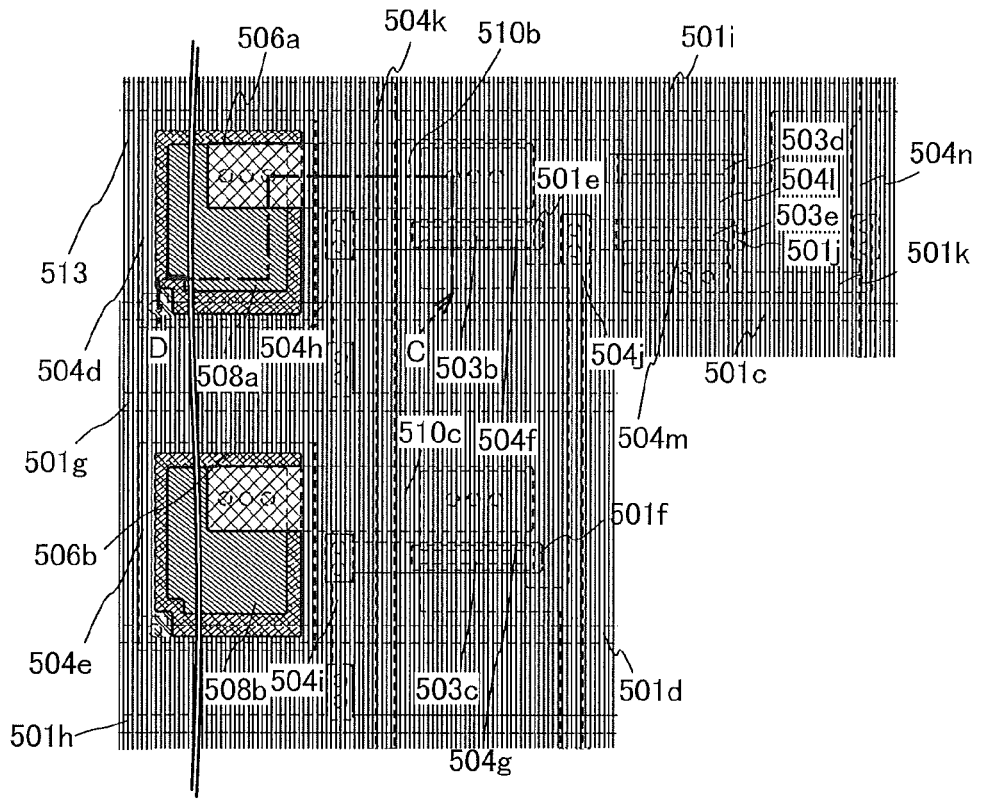
FIGS. 16A and 16B illustrate a structural example of the input/output device in Embodiment 6.
Figure 16B:
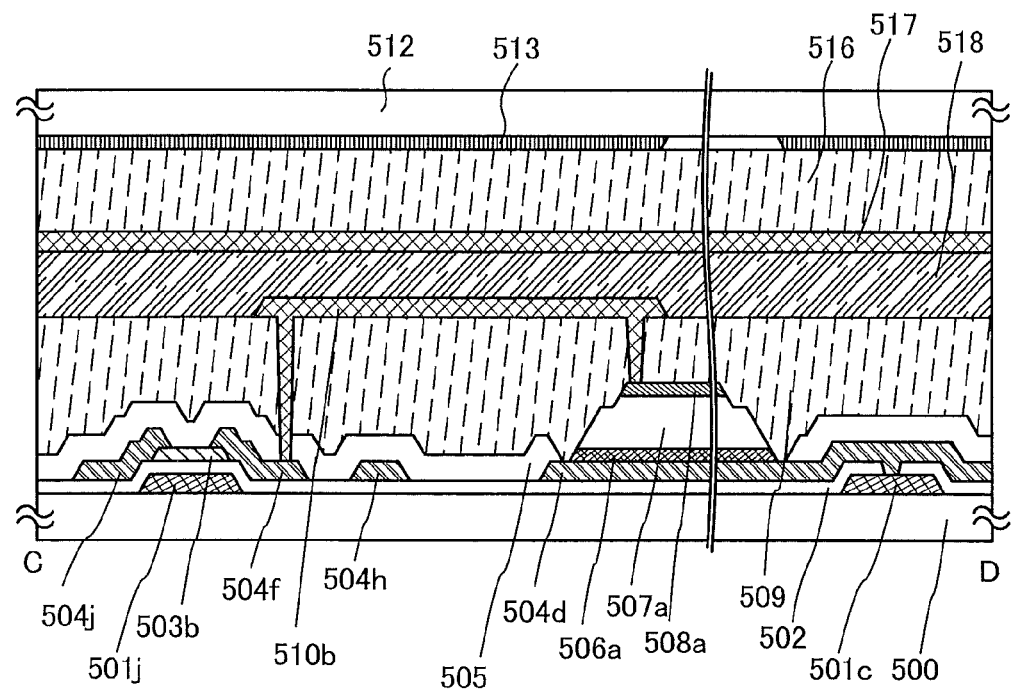

Next, a structural example of the input/output device of this embodiment will be described with reference to FIGS. 15A and 15B and FIGS. 16A and 16B. FIGS. 15A and 15B and FIGS. 16A and 16B show a structural example of an input/output device using the active matrix substrate in FIGS. 13A and 13B and FIGS. 14A and 14B. FIG. 15A is a schematic plane view, FIG. 15B is a schematic cross-sectional view taken along line A-B in FIG. 15A, FIG. 16A is a schematic plane view, and FIG. 16B is a schematic cross-sectional view taken along line C-D in FIG. 16A. Note that as an example, a photoelectric conversion element is a photodiode, and a display element is a liquid crystal element.

The input/output devices illustrated in FIGS. 15A and 15B and FIGS. 16A and 16B each include a substrate 512, a light-blocking layer 513, an insulating layer 516, a conductive layer 517, and a liquid crystal layer 518 in addition to the active matrix substrate illustrated in FIGS. 13A and 13B and FIGS. 14A and 14B. Note that in FIG. 15A and FIG. 16A, the conductive layer 517 is omitted for convenience sake.

The light-blocking layer 513 is provided over a part of a surface of the substrate 512. For example, the light-blocking layer 513 is provided over a part of a surface of the substrate 512 where the photoelectric conversion element is not provided.

The insulating layer 516 is provided over a surface of the substrate 512 with the light-blocking layer 513 interposed therebetween.

The conductive layer 517 is provided on a surface of the substrate 512. The conductive layer 517 functions as a common electrode in the display circuit. Note that in the photodetector circuit, the conductive layer 517 is not necessarily provided.

The liquid crystal layer 518 is provided between the conductive layer 510a and the conductive layer 517 and overlaps with the semiconductor layer 508 with the insulating layer 509 interposed therebetween.

Note that the conductive layer 510a, the liquid crystal layer 518, and the conductive layer 517 function as a display element in the display circuit.

Further, the components of the input/output device illustrated in FIGS. 15A and 15B and FIGS. 16A and 16B will be described.

As each of the substrate 500 and the substrate 512, it is possible to use a substrate that can be used as the substrate 400a in FIG. 5A.

As the conductive layers 501a to 501k, it is possible to use a layer of a material that can be used for the conductive layer 401a in FIG. 5A. Alternatively, each of the conductive layers 501a to 501k may be a stack of layers of materials that can be used for the conductive layer 401a.

As the insulating layer 502, it is possible to use a layer of a material that can be used for the insulating layer 402a in FIG. 5A. Alternatively, the insulating layer 502 may be formed by stacking layers whose materials are applicable to the insulating layer 402a.

As the semiconductor layers 503a to 503e, it is possible to use a layer of a material that can be used for the oxide semiconductor layer 403a in FIG. 5A.

As the conductive layers 504a to 504n, it is possible to use a layer of a material that can be used for the conductive layer 405a or the conductive layer 406a in FIG. 5A. Alternatively, the conductive layers 504a to 504n may be formed by stacking layers of materials applicable to the conductive layer 405a or the conductive layer 406a.

As the insulating layer 505, a layer whose material is applicable to the insulating layer 407a in FIG. 5A can be used. Alternatively, the insulating layer 505 may be a stack of layers of materials that can be used for the insulating layer 407a.

The semiconductor layer 506a and the semiconductor layer 506b are each a one-conductivity-type (either p-type or n-type) semiconductor layer. As each of the semiconductor layer 506a and the semiconductor layer 506b, a semiconductor layer containing silicon can be used, for example.

The semiconductor layer 507a and the semiconductor layer 507b each have lower resistance than the semiconductor layer 506. As each of the semiconductor layer 507a and the semiconductor layer 507b, a semiconductor layer containing silicon can be used, for example.

The semiconductor layer 508a and the semiconductor layer 508b are each a semiconductor layer whose conductivity is different from the conductivity of the semiconductor layer 506 (the other of the p-type conductivity and the n-type conductivity). As each of the semiconductor layer 508a and the semiconductor layer 508b, a semiconductor layer containing silicon can be used, for example.

Each of the insulating layers 509 and 516 is, for example, a layer of an organic material such as polyimide, acrylic, or benzocyclobutene. Alternatively, as the insulating layer 509, a layer of a low-dielectric constant material (also referred to as a low-k material) can be used.

As the conductive layers 510a to 510c and the conductive layer 517, for example, a layer of a light-transmitting conductive material such as indium tin oxide, a metal oxide in which zinc oxide is mixed in indium oxide (such a metal oxide is also referred to as indium zinc oxide (IZO)), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, or indium tin oxide containing titanium oxide can be used.

In addition, the conductive layers 510a to 510c and the conductive layer 517 can each be formed using a conductive composition including a conductive macromolecule (also referred to as a conductive polymer). A conductive layer formed using the conductive composition preferably has a sheet resistance of 10000 ohms or less per square and a transmittance of 70% or more at a wavelength of 550 nm Furthermore, the resistivity of the conductive high molecule contained in the conductive composition is preferably 0.1 Ω·cm or less.

As the conductive macromolecule, a so-called π-electron conjugated conductive polymer can be used. As the π-electron conjugated conductive polymer, polyaniline or a derivative thereof, polypyrrole or a derivative thereof, polythiophene or a derivative thereof, or a copolymer of two or more of aniline, pyrrole, and thiophene or a derivative thereof can be given.

Alternatively, the conductive layers 510a to 510c and the conductive layer 517 can each be formed using graphene.

As the light-blocking layer 513, a layer of a metal material can be used, for example.

The liquid crystal layer 518 can be, for example, a layer containing a TN liquid crystal, an OCB liquid crystal, an STN liquid crystal, a VA liquid crystal, an ECB liquid crystal, a GH liquid crystal, a polymer dispersed liquid crystal, or a discotic liquid crystal can be used. Note that for the liquid crystal layer 518, a liquid crystal that transmits light when voltage applied to the conductive layer 510c and the conductive layer 517 is 0 V is preferably used.

As described with FIGS. 13A and 13B, FIGS. 14A and 14B, FIGS. 15A and 15B, and FIGS. 16A and 16B, the structural example of the input/output device in this embodiment includes an active matrix substrate provided with a transistor, a pixel electrode, and a photoelectric conversion element; a counter substrate; and a liquid crystal layer including liquid crystal, placed between the active matrix substrate and the counter substrate. With such a structure, the display circuit and the photodetector circuit can be manufactured over one substrate in the same steps; thus, manufacturing cost can be reduced.

In addition, as described with reference to FIGS. 13A and 13B, FIGS. 14A and 14B, FIGS. 15A and 15B, and FIGS. 16A and 16B, the structural example of the input/output device of this embodiment includes the light-blocking layer in a portion except a portion through which light needs to pass. This structure can suppress entrance of light into transistors disposed in the active matrix substrate, for example, thereby suppressing variations in the electrical characteristics of the transistors caused by light (e.g., threshold voltage).

In addition, in the input/output device of this embodiment, a circuit such as a display driver circuit and a photodetection driver circuit may be provided over the same substrate as the display circuit and the photodetector circuit. At that time, a transistor in a circuit such as the display driver circuit and the photodetection driver circuit may have the same structure as the transistor in the display circuit and the photodetector circuit.

(Embodiment 7)

In this embodiment, described are examples of electronic devices each provided with the input/output device of the above embodiment.

Structural examples of the electronic devices of this embodiment will be described with reference to FIGS. 17A to 17D. FIGS. 17A to 17D are schematic views each illustrating a structural example of an electronic device of this embodiment.

Figure 17A:
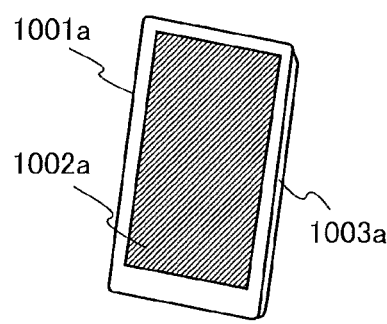
FIGS. 17A to 17D are schematic views each illustrating an example of an electronic device in Embodiment 7.

An electronic device in FIG. 17A is an example of a mobile information terminal. The mobile information terminal in FIG. 17A includes a housing 1001a and a display portion 1002a provided in the housing 1001a.

Note that a side surface 1003a of the housing 1001a may be provided with a connection terminal for connecting the mobile information terminal to an external device and one or more buttons used to operate the mobile information terminal in FIG. 17A.

The mobile information terminal in FIG. 17A includes a CPU, a main memory, an interface transmitting/receiving a signal traveling between the external device and each of the CPU and the main memory, and an antenna transmitting/receiving a signal to/from the external device, in the housing 1001a. Note that one or more integrated circuit(s) with a specific function may be provided in the housing 1001a.

The mobile information terminal in FIG. 17A has one or more functions of, for example, a telephone, an electronic book, a personal computer, and a game machine.

Figure 17C:
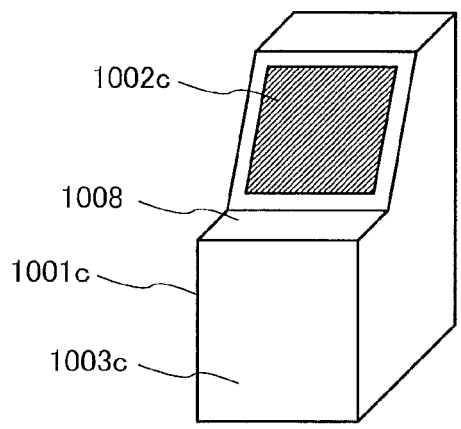
Figure 17B:
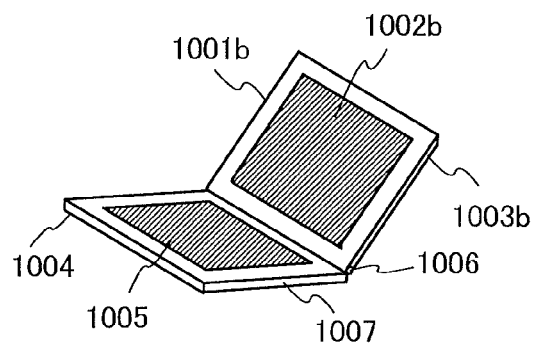

An electronic device in FIG. 17B is an example of a folding mobile information terminal. The mobile information terminal in FIG. 17B includes a housing 1001b, a display portion 1002b provided in the housing 1001b, a housing 1004, a display portion 1005 provided in the housing 1004, and a hinge 1006 for connecting the housing 1001b and the housing 1004.

In the mobile information terminal in FIG. 17B, the housing 1001b can be stacked on the housing 1004 by moving the housing 1001b or the housing 1004 with the hinge 1006.

Note that a side surface 1003b of the housing 1001b or a side surface 1007 of the housing 1004 may be provided with a connection terminal for connecting the mobile information terminal to an external device and one or more buttons used to operate the mobile information terminal in FIG. 17B.

The display portion 1002b and the display portion 1005 may display different images or one continuous image. Note that the display portion 1005 is not necessarily provided; a keyboard which is an input device may be provided instead of the display portion 1005.

The mobile information terminal in FIG. 17B includes a CPU, a main memory, and an interface transmitting/receiving a signal traveling between the external device and each of the CPU and the main memory, in the housing 1001b or the housing 1004. Note that one or more integrated circuit(s) with a specific function may be provided in the housing 1001b or the housing 1004. In addition, the mobile information terminal in FIG. 17B may include an antenna transmitting/receiving a signal to/from the external device.

The mobile information terminal in FIG. 17B has one or more functions of, for example, a telephone, an electronic book, a personal computer, and a game machine.

The electronic device in FIG. 17C is an example of a stationary information terminal. The installed information terminal in FIG. 17C includes a housing 1001c and a display portion 1002c provided in the housing 1001c.

Note that the display portion 1002c can be provided in a top board 1008 of the housing 1001c.

The stationary information terminal in FIG. 17C includes a CPU, a main memory, and an interface transmitting/receiving a signal traveling between the external device and each of the CPU and the main memory, in the housing 1001c. Note that one or more integrated circuit(s) with a specific function may be provided in the housing 1001c. In addition, the stationary information terminal in FIG. 17C may include an antenna transmitting/receiving a signal to/from the external device.

Further, a side surface 1003c of the housing 1001c in the stationary information terminal in FIG. 17C may be provided with one or more portions selected from a ticket ejection portion that ejects a ticket or the like, a coin slot portion, and a bill slot portion.

The stationary information terminal in FIG. 17C serves, for examples, as an automated teller machine, an information communication terminal for ticketing or the like (also referred to as a multi-media station), or a game machine.

Figure 17D:
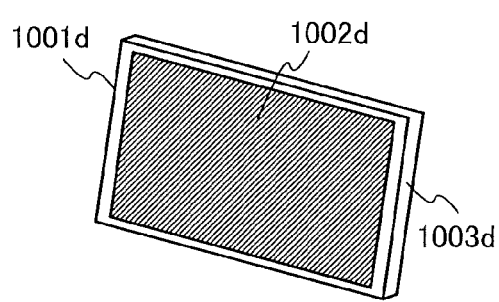

FIG. 17D shows an example of a stationary information terminal. The stationary information terminal in FIG. 17D includes a housing 1001d and a display portion 1002d provided in the housing 1001d. Note that a support for supporting the housing 1001d may also be provided.

Note that on a side surface 1003d of the housing 1001d, a connection terminal to which an external device is connected and one or plural buttons for operating the stationary information terminal in FIG. 17D may be provided.

In the housing 1001d of the stationary information terminal illustrated in FIG. 17D, a CPU, a main memory, and an interface with which signals are transmitted/received between the external device and the CPU and the main memory may be provided. Further, in the housing 1001d, one or more integrated circuits having a specific function may be provided. Furthermore, an antenna which sends and receives the signals to/from the external device may be provided in the stationary information terminal illustrated in FIG. 17D.

The stationary information terminal illustrated in FIG. 17D has a function of, for example, a digital photo frame, an output monitor, or a television set.

The input/output device described in the above embodiment is used for a display portion of an electronic device, and for example, used for the display portions 1002a to 1002d illustrated in FIGS. 17A to 17D. In addition, the input/output device of any of the above embodiments may be used as the display portion 1005 in FIG. 17B.

As described with reference to FIGS. 17A to 17D, examples of electronic devices of this embodiment each include an input/output portion for which the input/output device of the above embodiment is used. With such a structure, it is possible to operate the electronic device or input data to the electronic device with a finger or a pen.

In addition, the housings of examples of electronic devices of this embodiment may be each provided with one or more of components selected from an input/output unit, a photoelectric conversion element generating power source voltage in accordance with the illuminance of incident light, and an operating unit for operating the input/output device. Providing a photoelectric conversion element, for example, eliminates necessity of an external power source, allowing the above electronic device to be used for a long period of time even in a place without an external power source.

This application is based on Japanese Patent Application serial no. 2010-190239 filed with Japan Patent Office on Aug. 27, 2010, and Japanese Patent Application serial no. 2011-107813 filed with Japan Patent Office on May 13, 2011, the entire contents of which are hereby incorporated by reference.

What is claimed is:

1. A semiconductor device comprising:
a pixel portion configured to display an image, the pixel portion comprising:
a first photoelectric conversion element;
a second photoelectric conversion element;
a first transistor;
a second transistor; and
a third transistor; and
a fourth transistor,
wherein the first photoelectric conversion element is electrically connected to one of a source and a drain of the first transistor,
wherein the second photoelectric conversion element is electrically connected to one of a source and a drain of the second transistor,
wherein the other of the source and the drain of the first transistor is electrically connected to a gate of the third transistor,
wherein the other of the source and the drain of the second transistor is electrically connected to the gate of the third transistor,
wherein one of a source and a drain of the third transistor is electrically connected to one of a source and a drain of the fourth transistor,
wherein the third transistor and the fourth transistor are electrically connected in series, and
wherein each of the first transistor and the second transistor comprises an oxide semiconductor layer comprising a channel formation region.

2. The semiconductor device according to claim 1,
wherein the first transistor is a first charge accumulation control transistor,
wherein the second transistor is a second charge accumulation control transistor, and
wherein the third transistor is an amplifying transistor.

3. The semiconductor device according to claim 1, wherein a carrier concentration of the oxide semiconductor layer is lower than $1\times10^{14}/cm^3$.

4. The semiconductor device according to claim 1, wherein the third transistor comprises a semiconductor layer comprising a channel formation region comprising a semiconductor element belonging to Group 14 in the periodic table.

5. The semiconductor device according to claim 1, wherein the pixel portion comprises a liquid crystal element.

6. A semiconductor device comprising:
a pixel portion configured to display an image, the pixel portion comprising:
  a first photoelectric conversion element;
  a second photoelectric conversion element;
  a first transistor;
  a second transistor;
  a third transistor; and
  a fourth transistor,
wherein the first photoelectric conversion element is electrically connected to one of a source and a drain of the first transistor,
wherein the second photoelectric conversion element is electrically connected to one of a source and a drain of the second transistor,
wherein the other of the source and the drain of the first transistor is electrically connected to a gate of the third transistor,
wherein the other of the source and the drain of the second transistor is electrically connected to the gate of the third transistor,
wherein one of a source and a drain of the third transistor is electrically connected to one of a source and a drain of the fourth transistor,
wherein the third transistor and the fourth transistor are electrically connected in series,
wherein an optical data signal is output from the other of the source and the drain of the fourth transistor when the fourth transistor is turned on, and
wherein each of the first transistor and the second transistor comprises an oxide semiconductor layer comprising a channel formation region.

7. The semiconductor device according to claim 6,
wherein the first transistor is a first charge accumulation control transistor,
wherein the second transistor is a second charge accumulation control transistor,
wherein the third transistor is an amplifying transistor, and
wherein the fourth transistor is an output selection transistor.

8. The semiconductor device according to claim 6, wherein a carrier concentration of the oxide semiconductor layer is lower than $1 \times 10^{14}/cm^3$.

9. The semiconductor device according to claim 6, wherein the third transistor comprises a semiconductor layer comprising a channel formation region comprising a semiconductor element belonging to Group 14 in the periodic table.

10. The semiconductor device according to claim 6, wherein the pixel portion comprises a liquid crystal element.

11. A semiconductor device comprising:
a pixel portion configured to display an image, the pixel portion comprising:
  a first photoelectric conversion element;
  a second photoelectric conversion element;
  a first transistor;
  a second transistor;
  a third transistor;
  a fourth transistor; and
  a fifth transistor,
wherein the first photoelectric conversion element is electrically connected to one of a source and a drain of the first transistor,
wherein the second photoelectric conversion element is electrically connected to one of a source and a drain of the second transistor,
wherein the other of the source and the drain of the first transistor is electrically connected to a gate of the third transistor,
wherein the other of the source and the drain of the second transistor is electrically connected to the gate of the third transistor,
wherein one of a source and a drain of the third transistor is electrically connected to one of a source and a drain of the fourth transistor,
wherein the third transistor and the fourth transistor are electrically connected in series,
wherein one of a source and a drain of the fifth transistor is electrically connected to the gate of the third transistor, and
wherein each of the first transistor and the second transistor comprises an oxide semiconductor layer comprising a channel formation region.

12. The semiconductor device according to claim 11,
wherein the first transistor is a first charge accumulation control transistor,
wherein the second transistor is a second charge accumulation control transistor,
wherein the third transistor is an amplifying transistor,
wherein the fourth transistor is an output selection transistor, and
wherein the fifth transistor is a photodetection reset transistor.

13. The semiconductor device according to claim 11, wherein a carrier concentration of the oxide semiconductor layer is lower than $1 \times 10^{14}/cm^3$.

14. The semiconductor device according to claim 11, wherein the third transistor comprises a semiconductor layer comprising a channel formation region comprising a semiconductor element belonging to Group 14 in the periodic table.

15. The semiconductor device according to claim 11, wherein the pixel portion comprises a liquid crystal element.

16. A semiconductor device comprising:
a pixel portion configured to display an image, the pixel portion comprising:
  a first photoelectric conversion element;
  a second photoelectric conversion element;
  a first transistor;
  a second transistor;
  a third transistor;
  a fourth transistor; and
  a fifth transistor,
wherein the first photoelectric conversion element is electrically connected to one of a source and a drain of the first transistor,
wherein the second photoelectric conversion element is electrically connected to one of a source and a drain of the second transistor,
wherein the other of the source and the drain of the first transistor is electrically connected to a gate of the third transistor,
wherein the other of the source and the drain of the second transistor is electrically connected to the gate of the third transistor, and
wherein one of a source and a drain of the third transistor is electrically connected to one of a source and a drain of the fourth transistor,
wherein the third transistor and the fourth transistor are electrically connected in series,
wherein one of a source and a drain of the fifth transistor is electrically connected to the gate of the third transistor, wherein an optical data signal is output from the other of the source and the drain of the fourth transistor when the fourth transistor is turned on, and wherein each of the first transistor and the second transistor comprises an oxide semiconductor layer comprising a channel formation region.

17. The semiconductor device according to claim 16, wherein the first transistor is a first charge accumulation control transistor, wherein the second transistor is a second charge accumulation control transistor, wherein the third transistor is an amplifying transistor, and wherein the fourth transistor is a photodetection reset transistor.

18. The semiconductor device according to claim 16, wherein a carrier concentration of the oxide semiconductor layer is lower than $1 \times 10^{14}/cm^3$.

19. The semiconductor device according to claim 16, wherein the third transistor comprises a semiconductor layer comprising a channel formation region comprising a semiconductor element belonging to Group 14 in the periodic table.

20. The semiconductor device according to claim 16, wherein the pixel portion comprises a liquid crystal element.

* * * * *

UNITED STATES PATENT AND TRADEMARK OFFICE
CERTIFICATE OF CORRECTION

PATENT NO. : 8,928,053 B2  
APPLICATION NO. : 13/217553  
DATED : January 6, 2015  
INVENTOR(S) : Yoshiyuki Kurokawa It is certified that error appears in the above-identified patent and that said Letters Patent is hereby corrected as shown below:

IN THE SPECIFICATION

Column 7, line 8, replace "134Z" with --134_Z--;

Column 7, line 62, replace "134Z" with --134_Z--;

Column 8, line 8, replace "1344" with --134_Z--;

Column 13, line 48, replace "134Z" with --134_Z--;

Column 21, line 19, replace "coining" with --coming--;

Column 22, line 11, replace "hi" with --In--;

Column 22, line 25, replace "(nm" with --(m--;

Column 32, line 62, after "manner" insert --:--;

Column 34, line 39, replace "diffreaction" with --diffraction--;

Column 34, line 66, replace "20" with --2θ--;

Column 43, line 64, replace "seem" with --sccm--; and

Column 51, line 37, after "nm" insert --.--.

Signed and Sealed this
Twenty-seventh Day of October, 2015

Michelle K. Lee
*Director of the United States Patent and Trademark Office*